Jan. 6, 1970          F. N. JAMES, SR          3,487,905
DOCUMENT VERIFICATION AND BANKING MACHINE
Filed March 1, 1967                      23 Sheets-Sheet 1
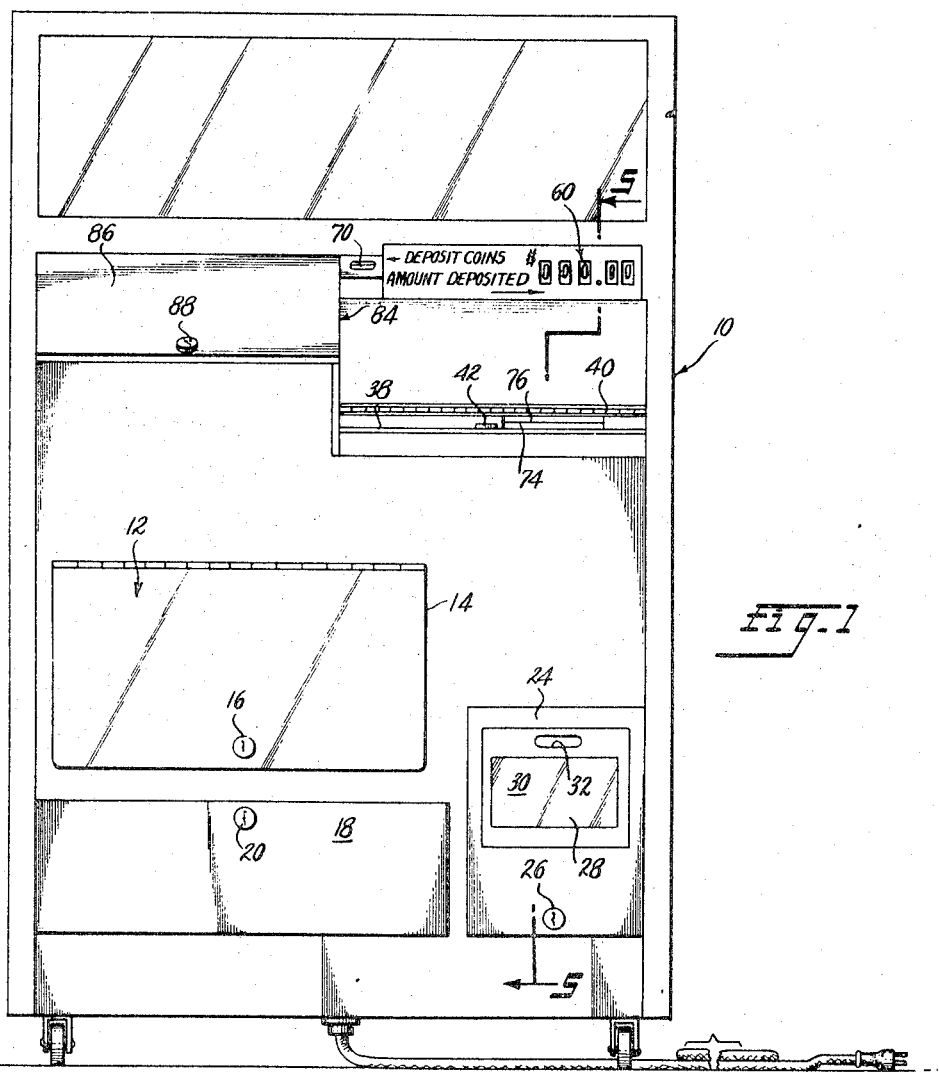
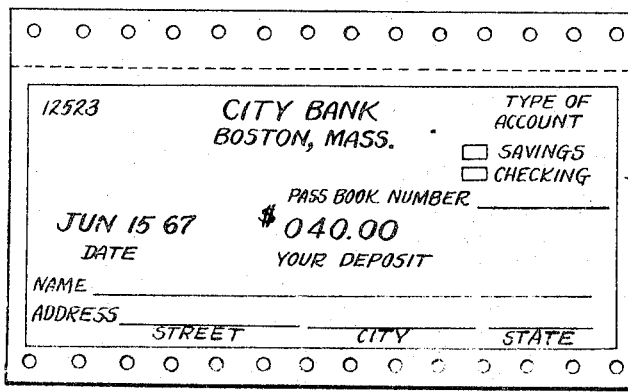
INVENTOR
FRAZIER N. JAMES, SR.
BY
Bowyer & Witherspoon
ATTORNEYS

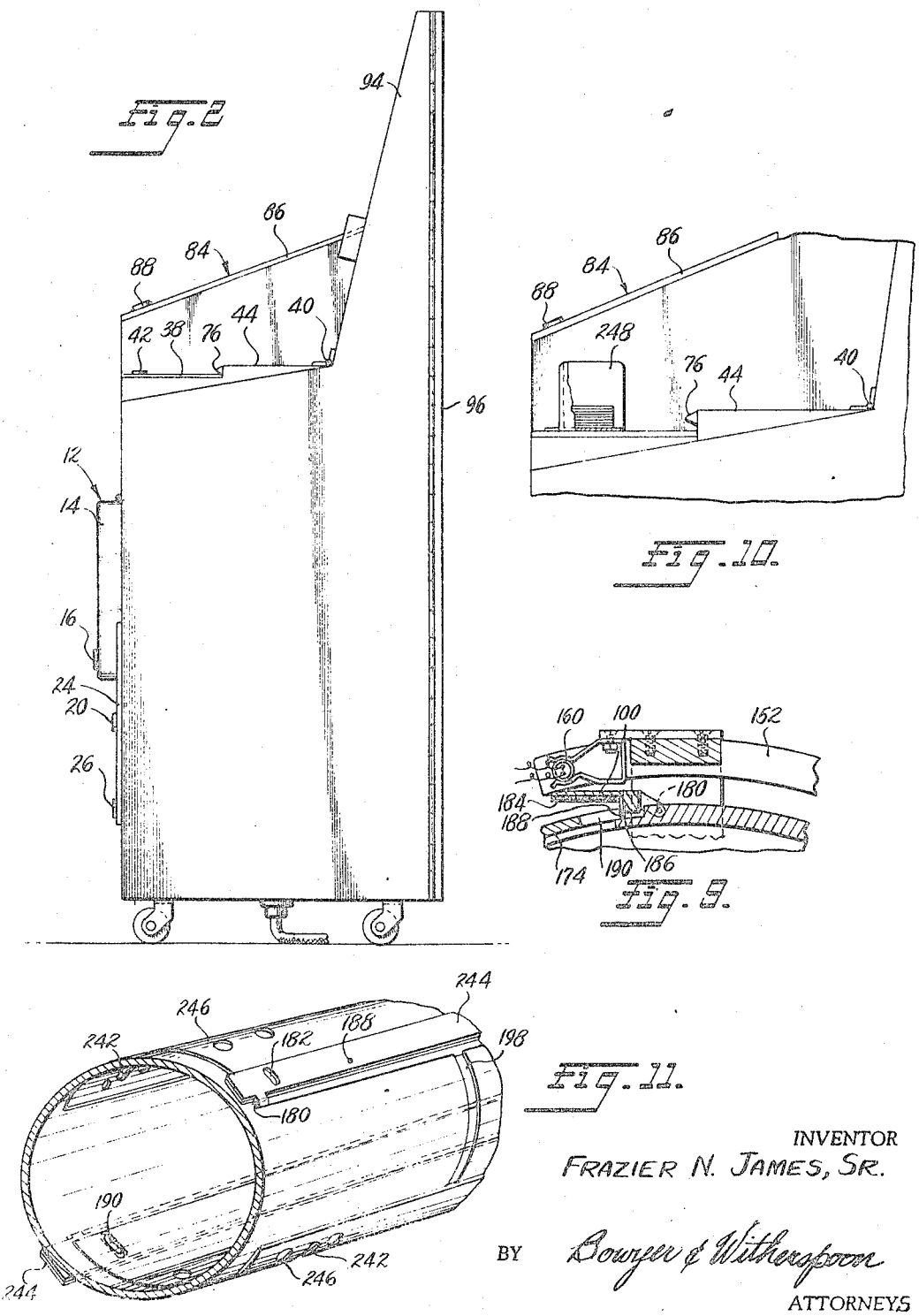

Jan. 6, 1970  F. N. JAMES, SR  3,487,905
DOCUMENT VERIFICATION AND BANKING MACHINE
Filed March 1, 1967  23 Sheets-Sheet 3

INVENTOR
FRAZIER N. JAMES, SR.

BY Bowyer & Witherspoon
ATTORNEYS

INVENTOR
FRAZIER N. JAMES, SR.

BY Bowyer & Witherspoon
ATTORNEYS

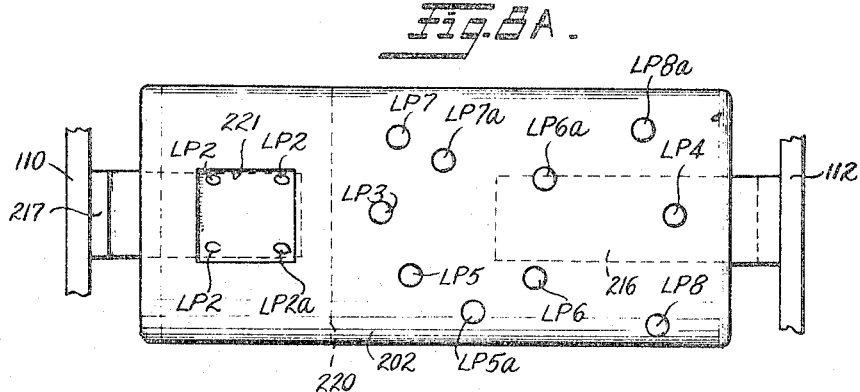
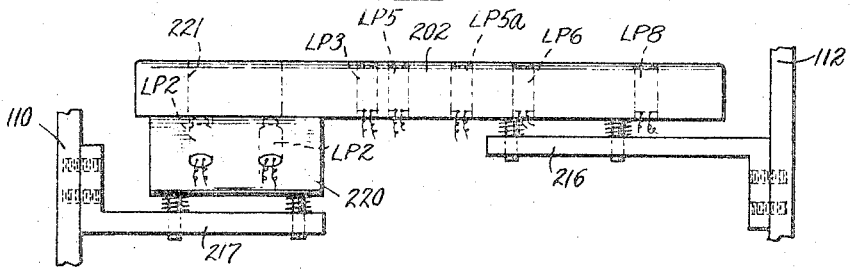
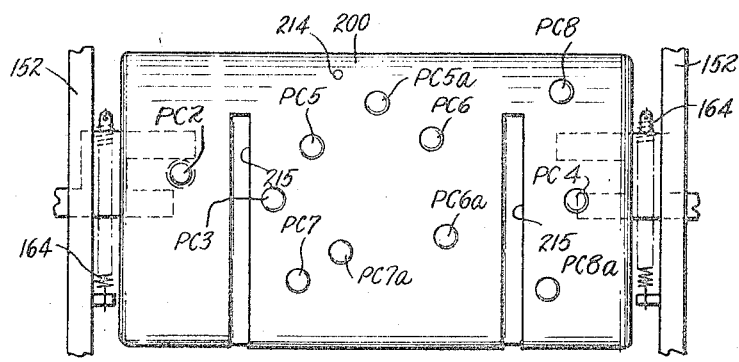

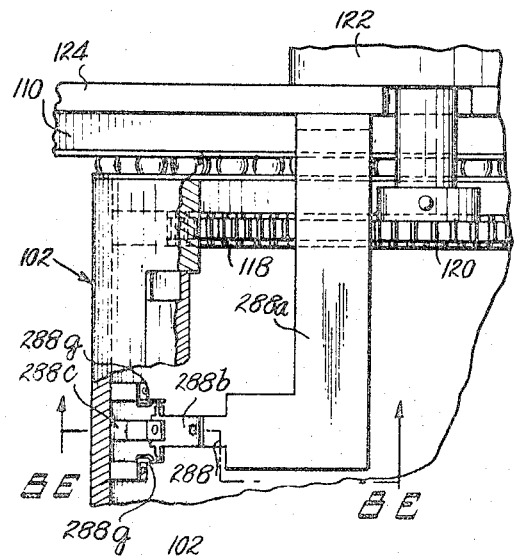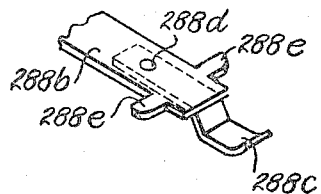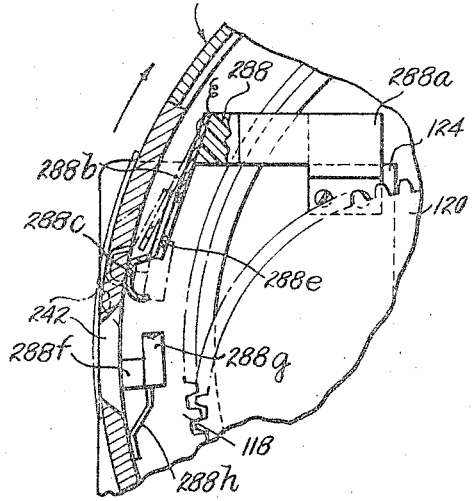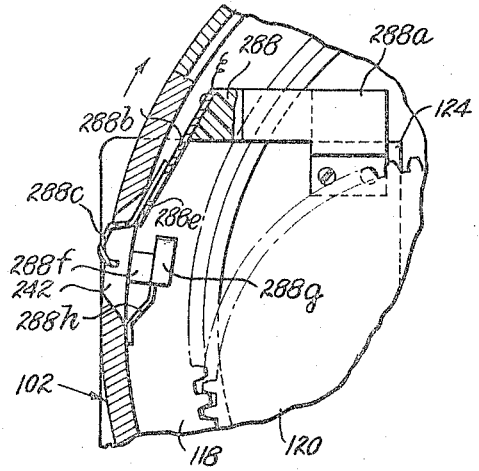

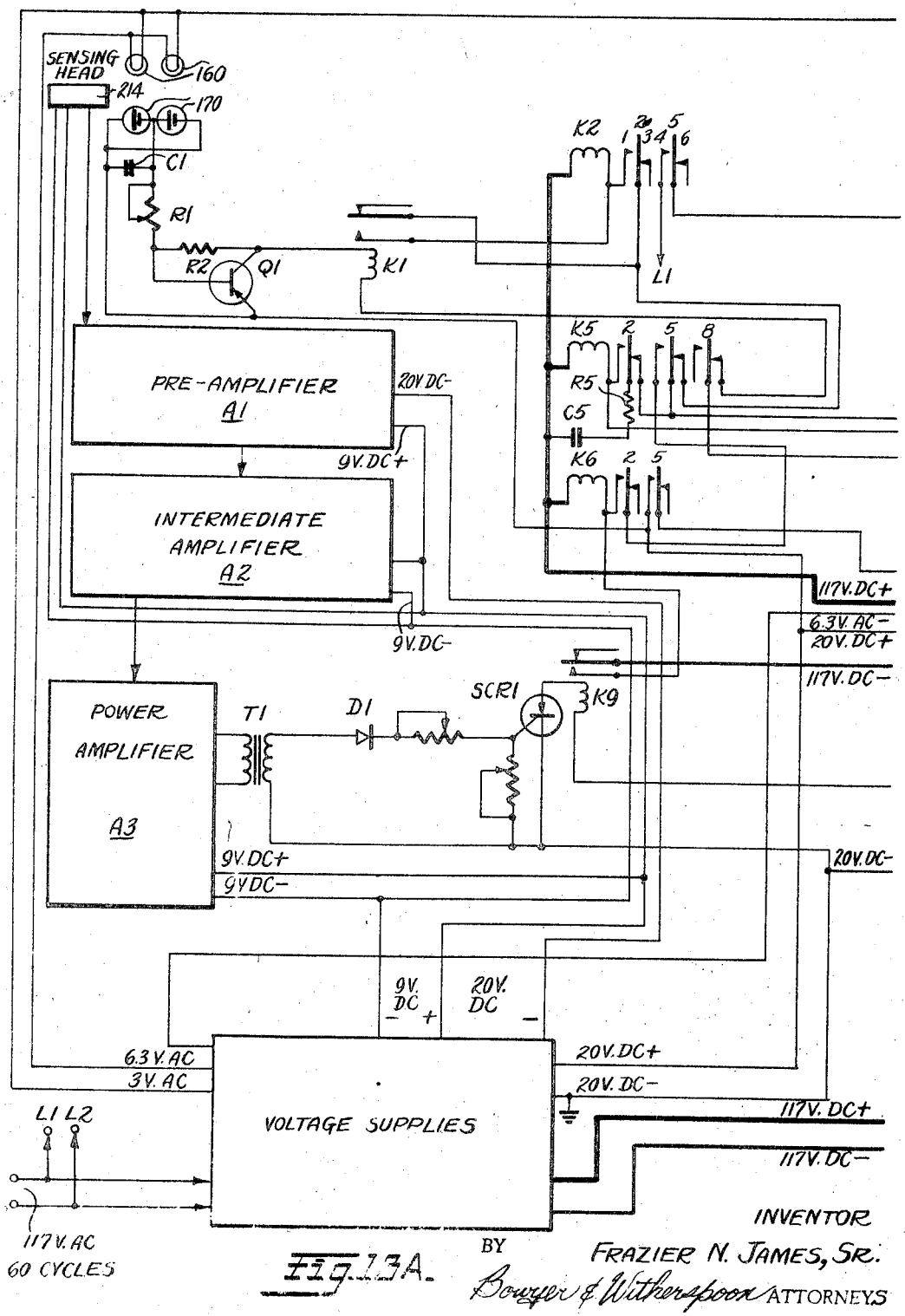

Jan. 6, 1970  F. N. JAMES, SR  3,487,905
DOCUMENT VERIFICATION AND BANKING MACHINE
Filed March 1, 1967  23 Sheets-Sheet 12

LEGEND
DC+ ———
DC- — — —
AC L1 - - - - -
AC L2 -·-·-·-

INVENTOR
FRAZIER N. JAMES, SR.
BY Bowyer & Witherspoon
ATTORNEYS

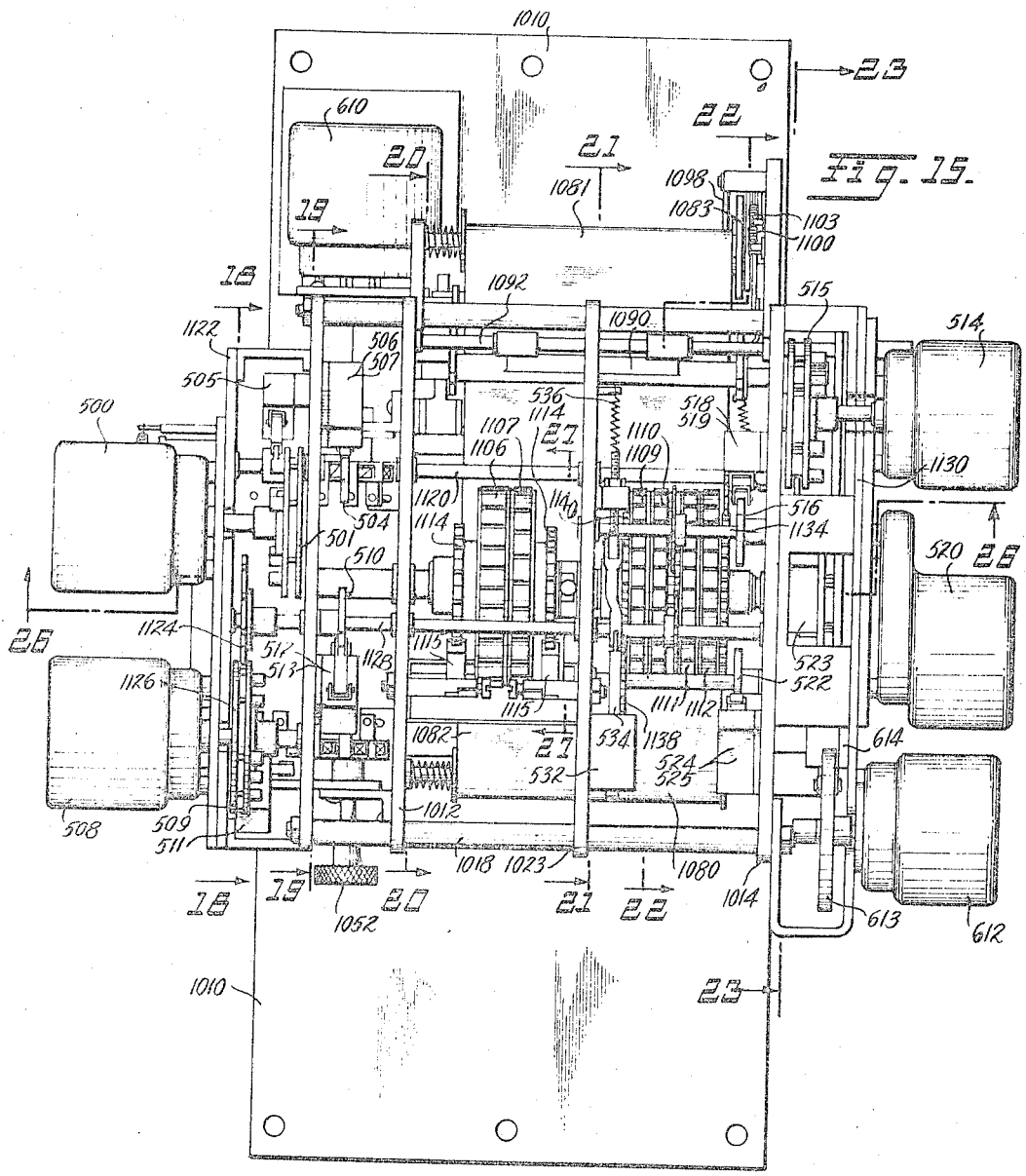

Jan. 6, 1970
F. N. JAMES, SR
3,487,905
DOCUMENT VERIFICATION AND BANKING MACHINE
Filed March 1, 1967
23 Sheets-Sheet 17
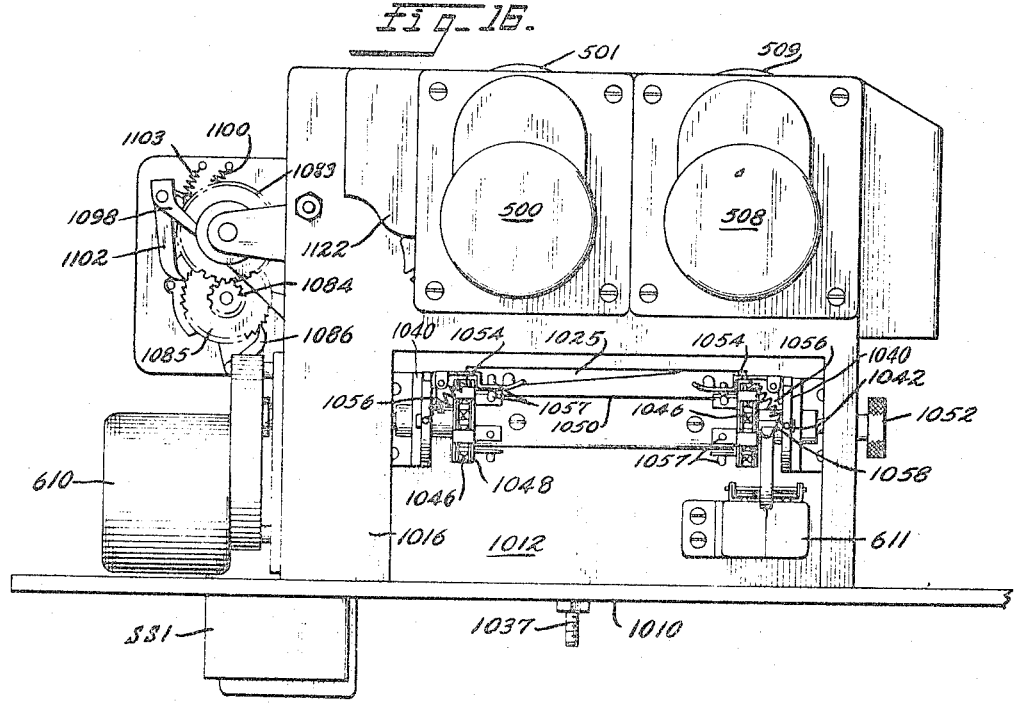
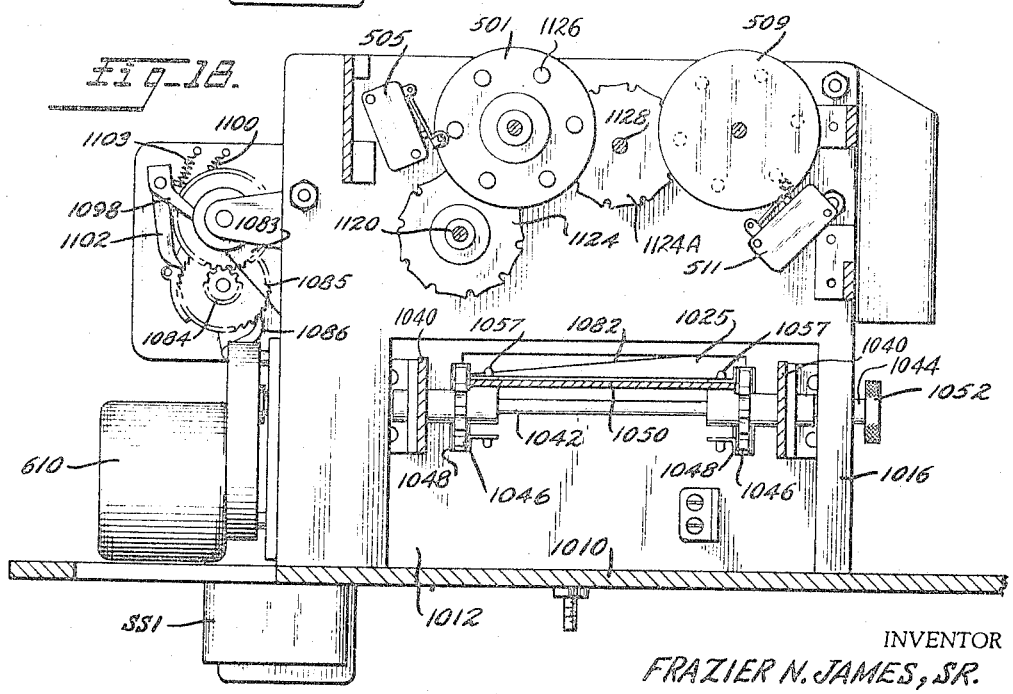
INVENTOR
FRAZIER N. JAMES, SR.
BY *Bowyer & Witherspoon*
ATTORNEYS

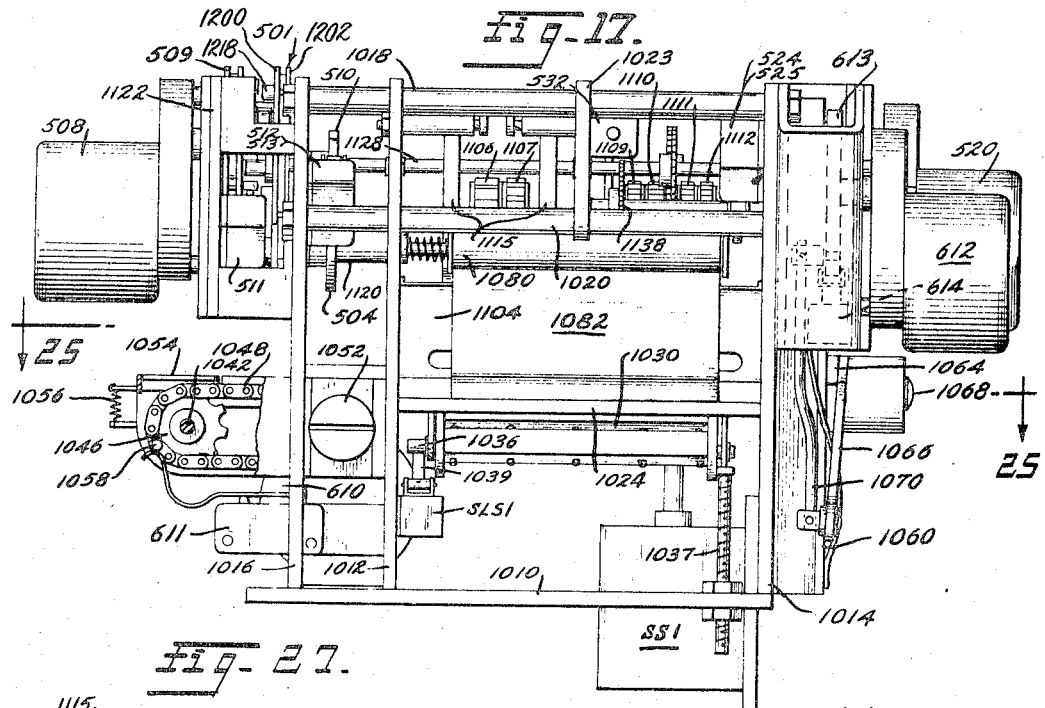
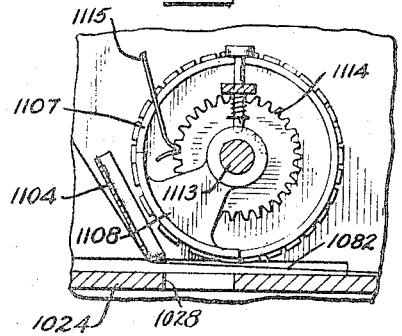
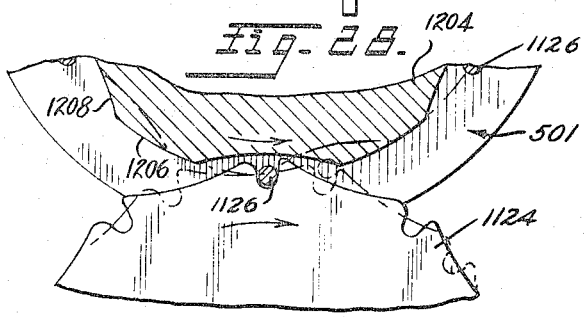
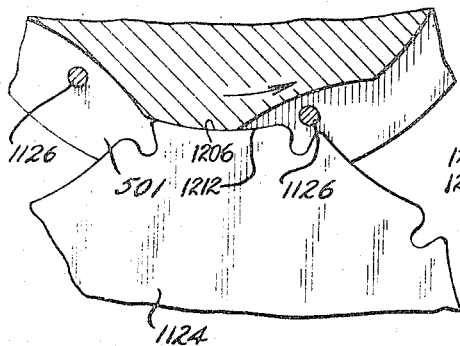
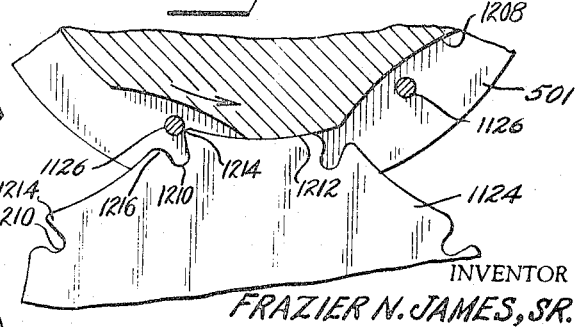
INVENTOR
FRAZIER N. JAMES, SR.
BY Bowyer & Witherspoon
ATTORNEYS

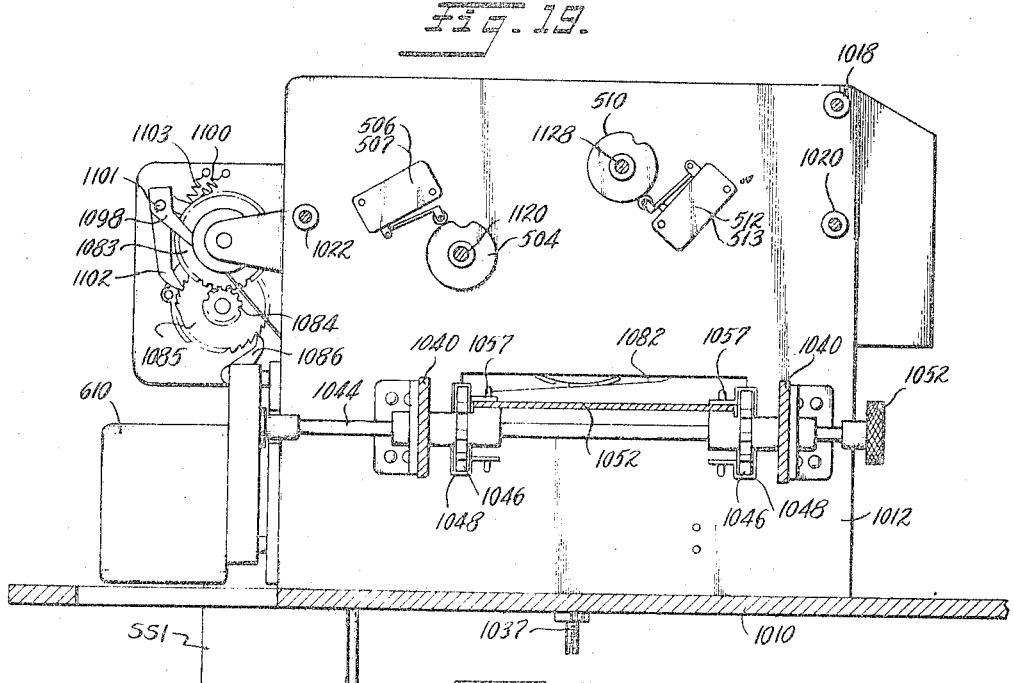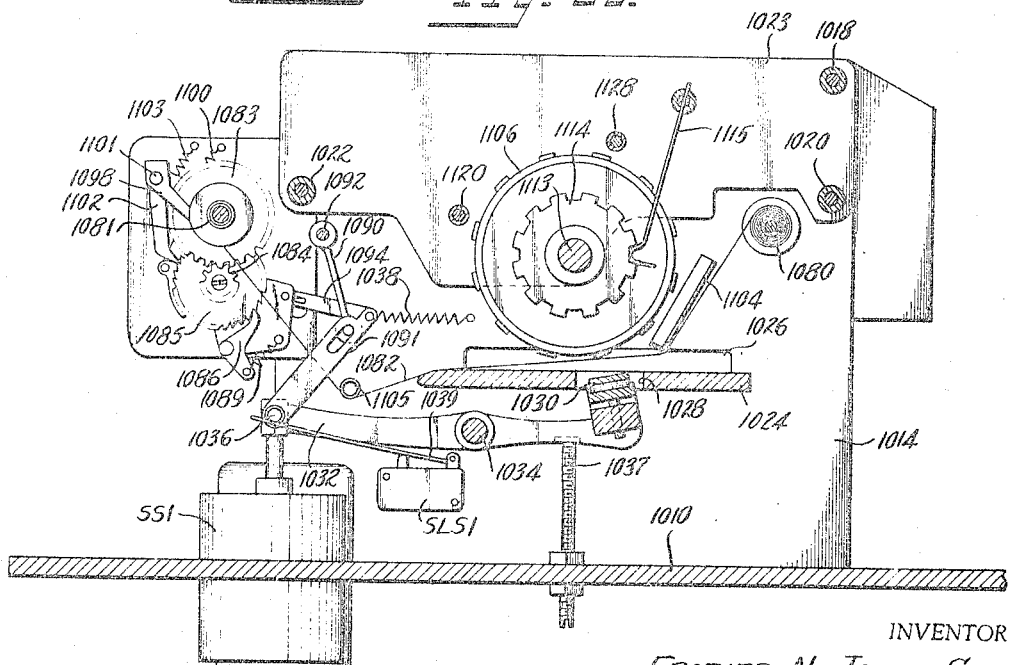

INVENTOR
FRAZIER N. JAMES, SR.

Jan. 6, 1970  F. N. JAMES, SR  3,487,905
DOCUMENT VERIFICATION AND BANKING MACHINE
Filed March 1, 1967  25 Sheets-Sheet 21

INVENTOR
FRAZIER N. JAMES, SR.

BY Bowyer & Witherspoon
ATTORNEYS

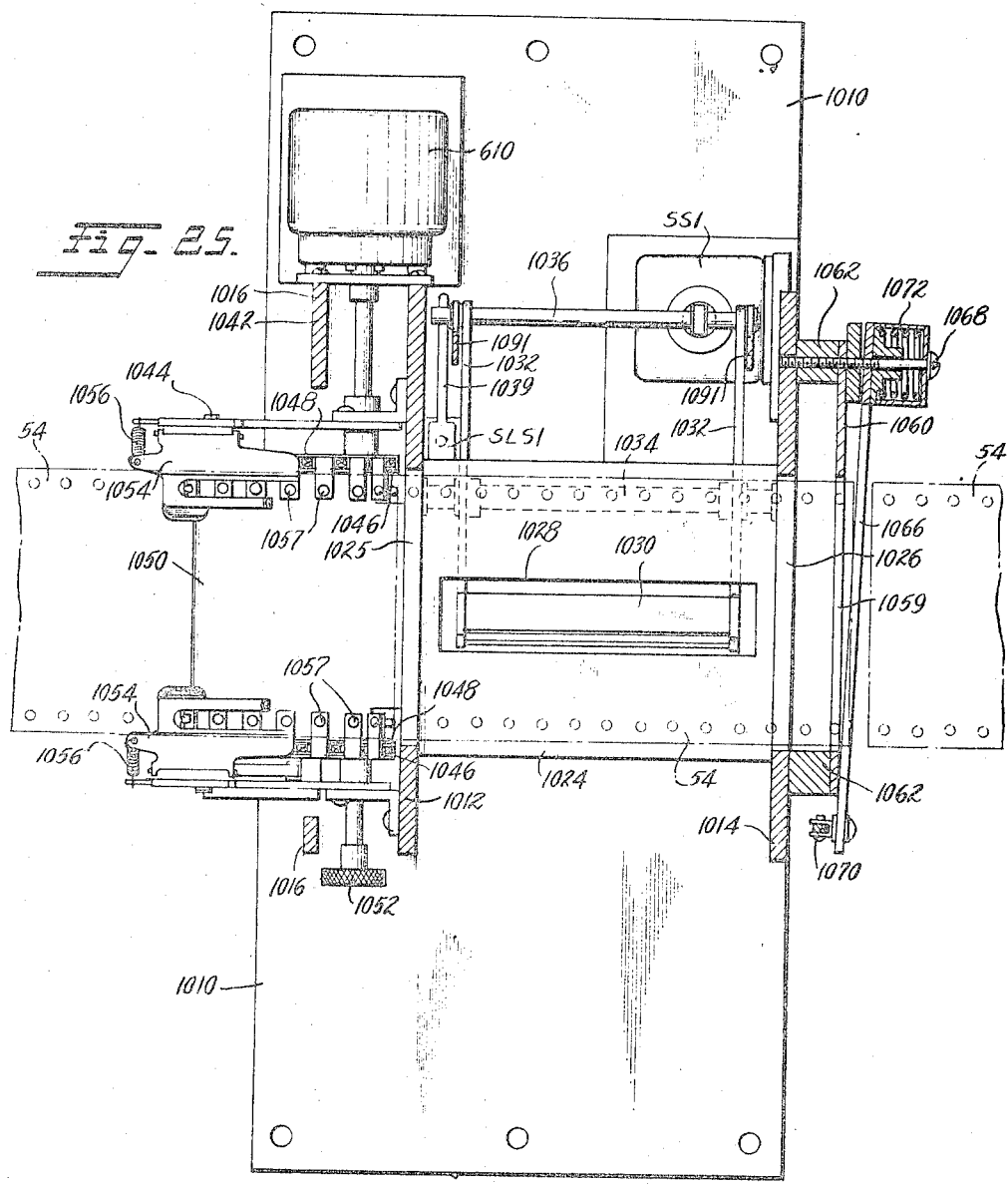

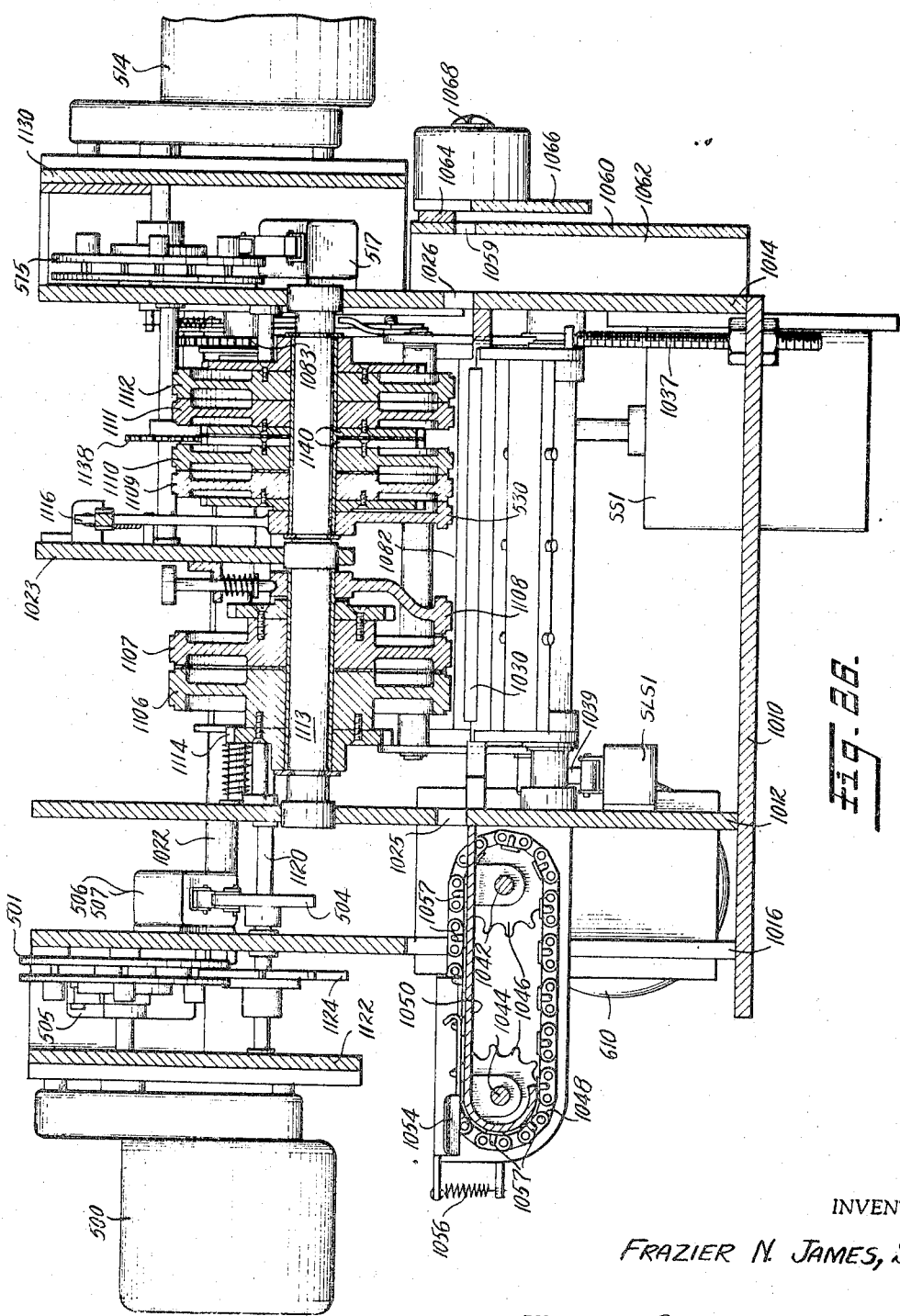

United States Patent Office 3,487,905
Patented Jan. 6, 1970

3,487,905
DOCUMENT VERIFICATION AND BANKING MACHINE
Frazier N. James, Sr., Alexandria, Va., assignor to Allied Automation, Inc., Alexandria, Va., a corporation of Delaware
Filed Mar. 1, 1967, Ser. No. 619,642
Int. Cl. G07d 7/00; G07f 3/02
U.S. Cl. 194—4                                                 60 Claims

ABSTRACT OF THE DISCLOSURE

This invention relates to a document verifying machine and, in examples, relates specifically to such a machine adapted for use with a banking depository machine, wherein tokens such as coins of various denominations and documents, such as paper currency of various denominations, may be inserted into the banking machine in any order desired. These are tested for their genuineness.

In the case of currency, the sensings of currencies of various denominations are sensed in one area, and the monetary values of the currencies deposited in the machine are incrementally shown on an indicator and are set up on printing wheels.

If it is desired that the currencies be returned to the operator, a switch is operated, as a result of which the indicator and the printing wheels are automatically restored to zero, and an escrow device in the machine is actuated to refund the deposit of currency.

It it be desired that the currencies are to be accepted by the machine, then another switch is operated. As a result the escrow device transfers the deposited currency to a deposit receptacle.

Following this, duplicate receipt tickets are preferably imprinted with the amount accepted by the machine and are issued to the depositor, and the indicator and printing wheels are zeroized.

Should the machine refuse to accept currency or other documents deposited therein by reason of failure to be genuine, or otherwise, the currencies are not deposited in the escrow device but are refunded directly, and no charge occurs in the indicator or printing wheels.

BACKGROUND OF THE INVENTION

This invention relates generally to a machine for testing the genuineness of a document and, more particularly, to a machine for accepting currencies of various kinds and denominations including foreign or domestic currencies in any order and totalizing the amount inserted into the machine.

In the prior art machines have been provided for accepting coins of various denominations in any order and totalizing the amount, such as are shown and described in the patent to James et al., 3,191,737, and machines have been provided for the testing and acceptance of paper currency of more than one denomination, such as are disclosed in the patent to Adams, 3,186,531. No machine is, however, known for receiving both coins and varied paper currencies or other documents, testing all of the denominations of currencies at one location and totalizing the amount; nor for receiving both coins and paper currencies in any order and totalizing the amount. Other patents relating to, but not anticipative of the invention are extant, among which are the following: Zworykin et al., 2,616,983; Sontheimer, 2,731,621; Simjian, 2,941,187; Patzer, 2,967,452; Etzrodt, 3,081,403; Gecewicz, 3,109,100; Steiner, 3,114,445; Gecewicz, 3,131,798; and Danko, 3,180,491.

SUMMARY OF THE INVENTION

It is among the objects of the invention to provide a document verification machine which is capable of accepting or rejecting paper currency or other documents in accordance with the genuineness and denomination thereof; the overall testing of all denominations of the currencies or other documents being effected at the same location.

Another object of the invention is to provide a novel totalizer, relay controlled, transfer mechanism for transferring an input of one denominational order to the next higher denominational order.

Yet another object of the invention is to provide a novel arrangement for effecting printing of receipts and delivery thereof.

Other specific objects and objectives of the present invention include the provision of a machine which is of convenience to customers, banks, warehouses, and the like. Still a further object is to provide such a machine having adjustable adapability to various currencies, documents, coins, or similar tokens. The invention has as its further object: provision of a machine which may, in slightly altered form, issue stamps, postal receipts, documentary depositary receipts, or such other receipts as are required in normal commerce.

The present invention has as a further object the elimination of the sorting of currency by banking employees, the sorting or issuance of postal stamps, postal receipts, or the like, by postal employees and similar objectives. Yet another object of the present invention is to provide a machine, which, if on an initial test finds that an inserted article, be it a coin or paper currency or a document, is spurious, or improperly inserted, the machine is conditioned, so that it does not function to perform any further tests of the articles.

The machine of the present invention is also specifically adapted to form, in cooperative association, in a single assembly all of a plurality of tests for the genuineness of currencies, or other documents to eliminate, or reduce to a minimal factor the errors involved in previously known tests.

In order to accomplish this purpose the machine further has as its objectives provision of a structure which will allow simplicity both as to its operation and maintenance and also as to its supervision. The machine, in the illustrated embodiment described in detail hereafter, has, as a further object, the ability to combine any or all numbers and combinations thereof for any selected type of currencies, foreign or domestic.

Since the machine is about to sort and totalize by denominations and is capable of operation with a minimal amount of supervision by authorized personnel, yet another object of the invention is to provide a machine which may substitute satisfactorily for what are presently designated as night documentary deposits. Among the additional objects of the invention are: to provide a novel totalizing mechanism, a novel printer mechanism coacting therewith, and a novel drive system for the printer mechanism.

Further objects of the invention will become apparent after a consideration of the specification and accompanying drawings in which:

FIG. 2 is a side view of the same machine.

FIG. 5A is a fragmentary view showing the motor drive and switch control for the escrow drum.

FIG. 6 is a side elevational view of a preferred form of test drum within the machine cabinet and of most of its associated mechanism.

FIG. 7 is a top plan view of the same test drum and its associated mechanism.

FIG. 8 is a vertical section through the preferred embodiment of the test drum taken substantially midway of its length.

FIG. 8A is a top plan view of a preferred lower sandwich plate with its adjacent parts.

FIG. 8B is an end view of the parts shown in FIG. 8A.

FIG. 8C is a bottom view of a preferred upper sandwich plate.

FIG. 8D is a fragmentary sectional view on the line 8D—8D of FIG. 8.

FIG. 8E is an enlarged sectional view on the line 8E—8E of FIG. 8D, showing a contact finger in an inoperative position.

FIG. 8F is a view similar to FIG. 8E but showing the contact finger in an operative position.

FIG. 8G is a fragmentary perspective view of the lower end of the contact finger.

FIG. 9 is an enlarged fragmentary vertical sectional view of a preferred hold down bar and associated parts used with the document receiving drum.

FIG. 10 is a side view of the upper portion of the machine, showing a modification wherein documents to be fed to the machine are stacked in a pile in a holder, the holder being shown as broken away to expose the documents.

FIG. 11 is a view showing how a test drum may be modified to receive two or any other desired plurality of documents to be brought to the test area.

FIG. 12 is a view of a typical form of receipt which may be issued by the machine.

Figure 13B:
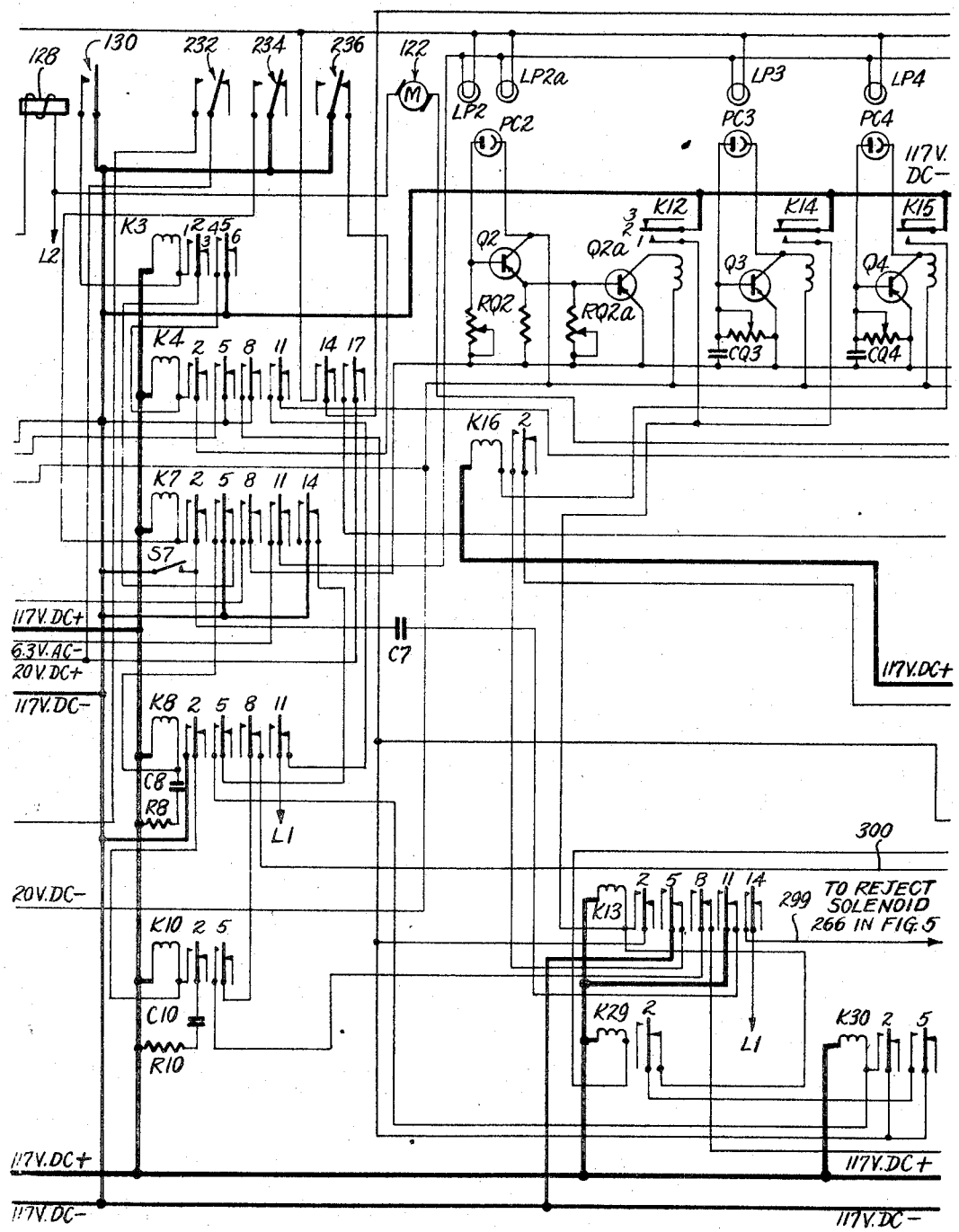
Figure 13C:
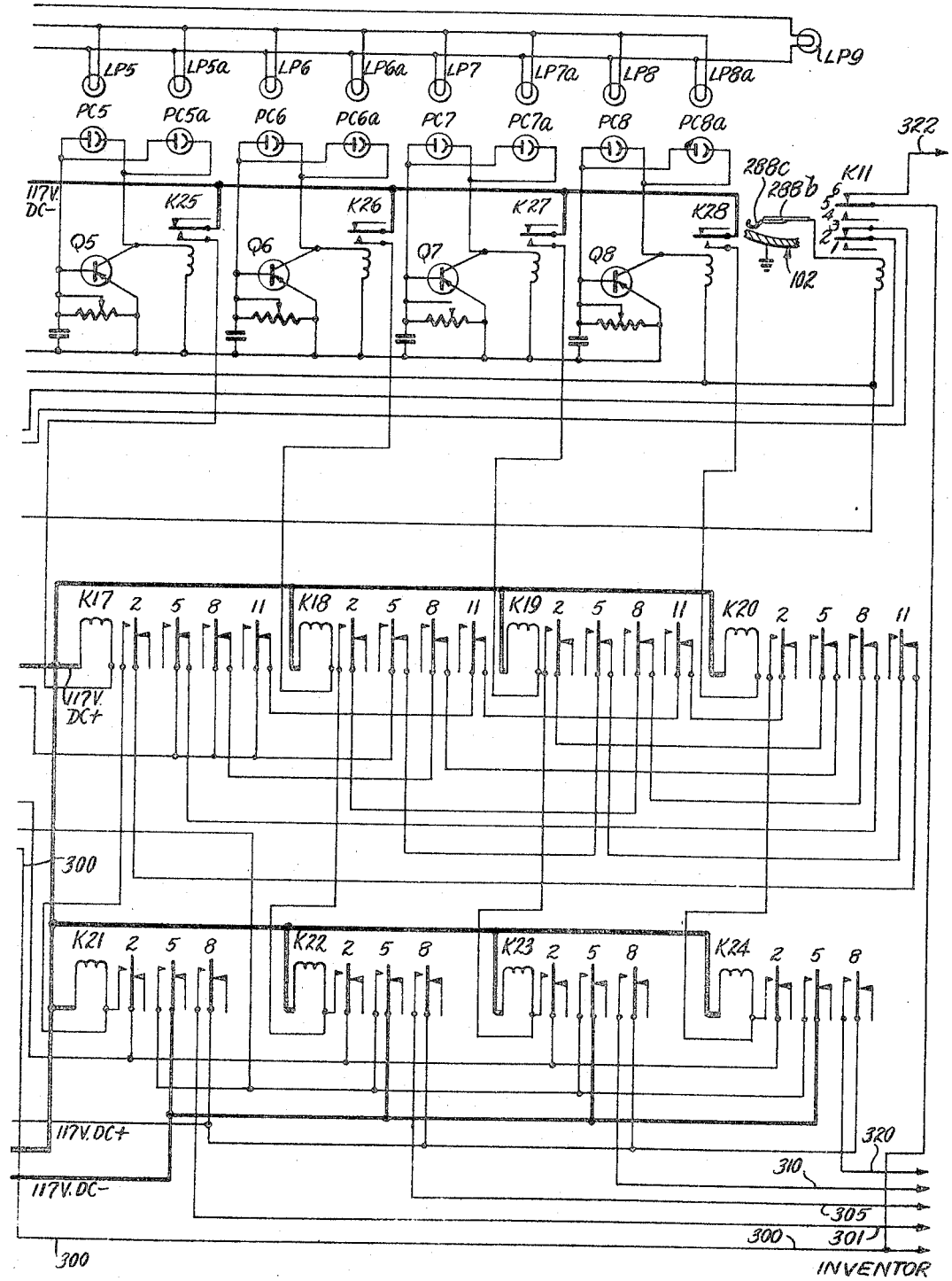

FIGS. 13A, 13B and 13C constitute a wiring diagram pertaining to the document testing and verifying portion of the apparatus.

Figure 14A:
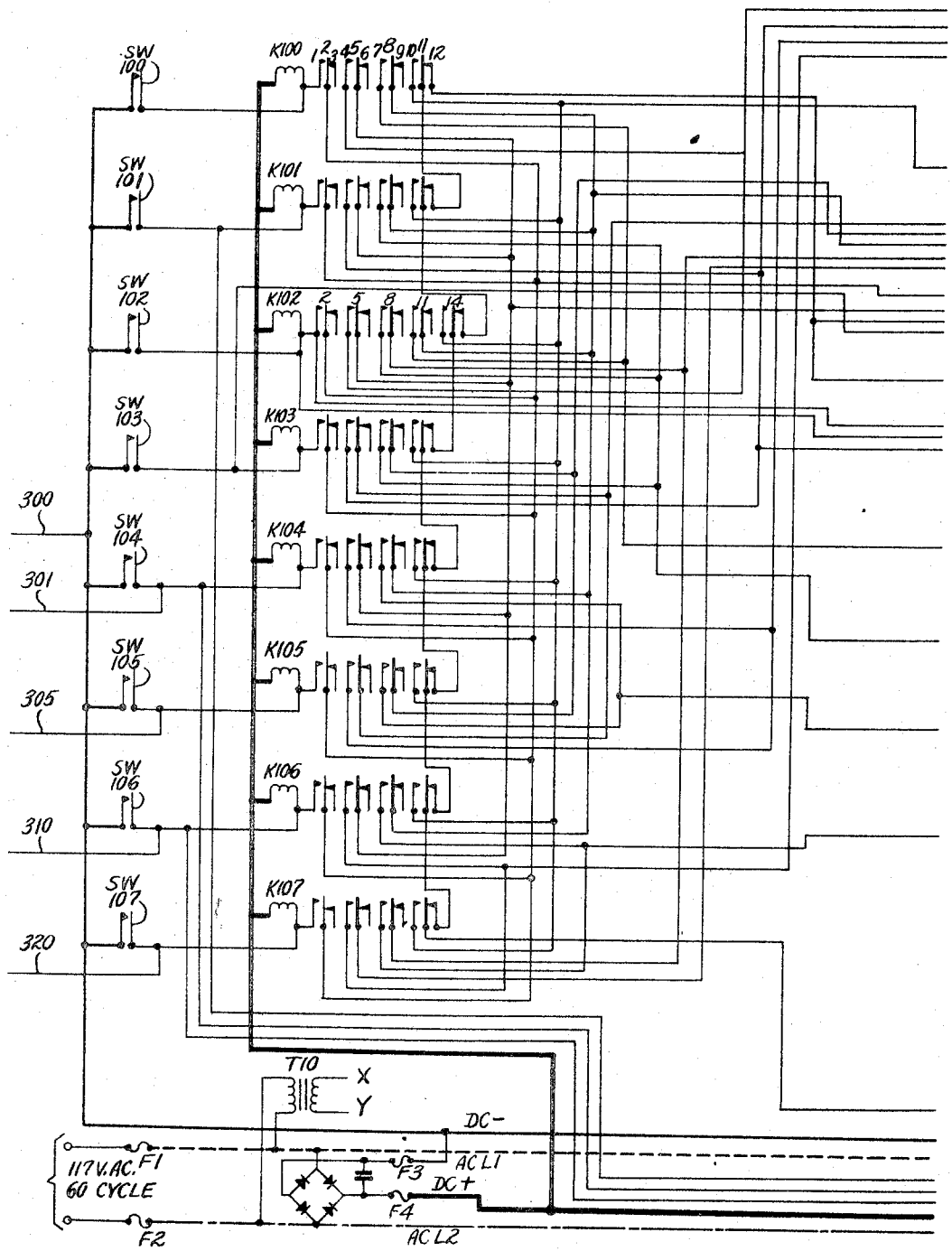
Figure 14B:
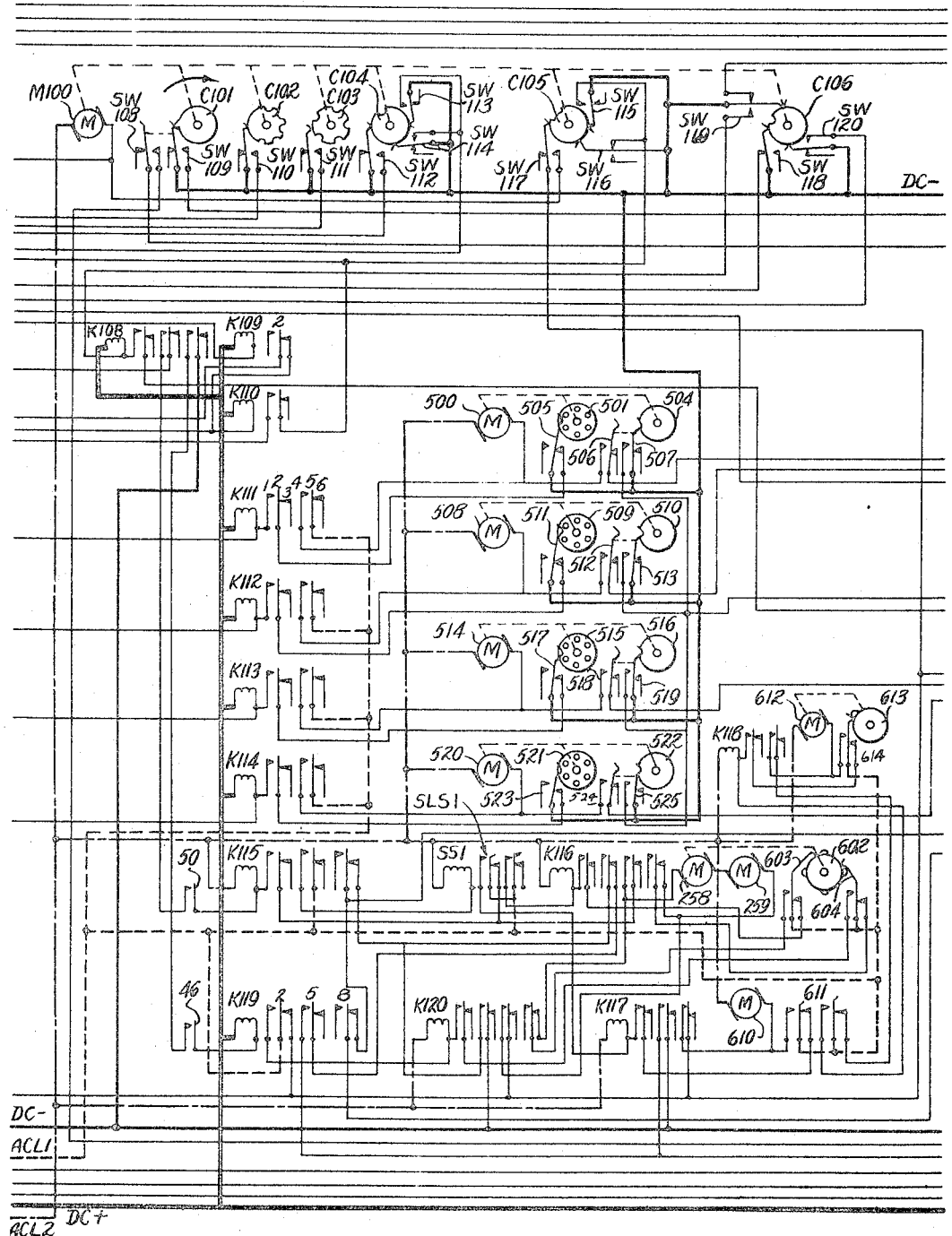
Figure 14C:
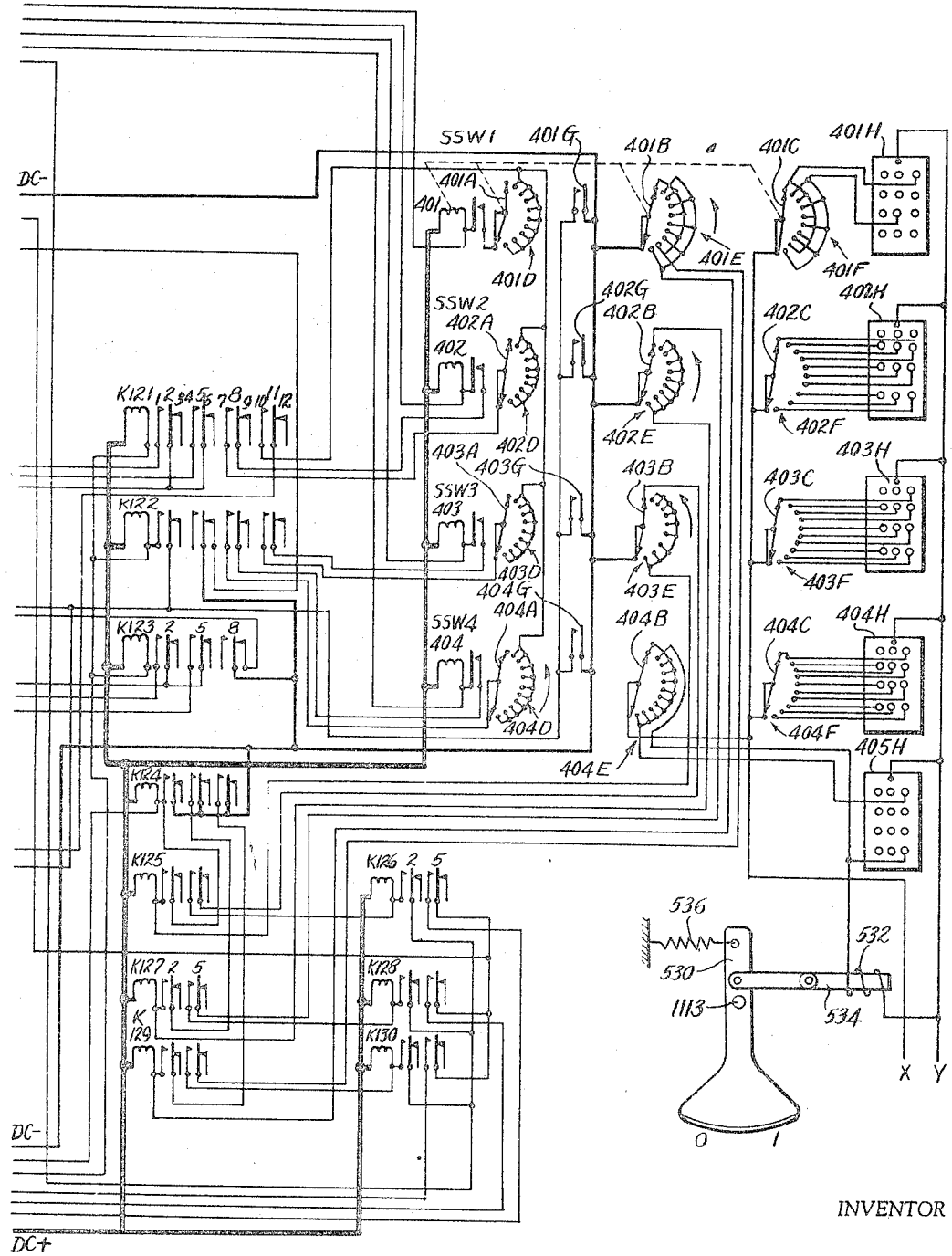

FIGS. 14A, 14B and 14C constitute a preferred form of wiring diagram pertaining to the totalizing portion of the apparatus, which apparatus functions in response to the verification portion of the machine.

Figure 14D:
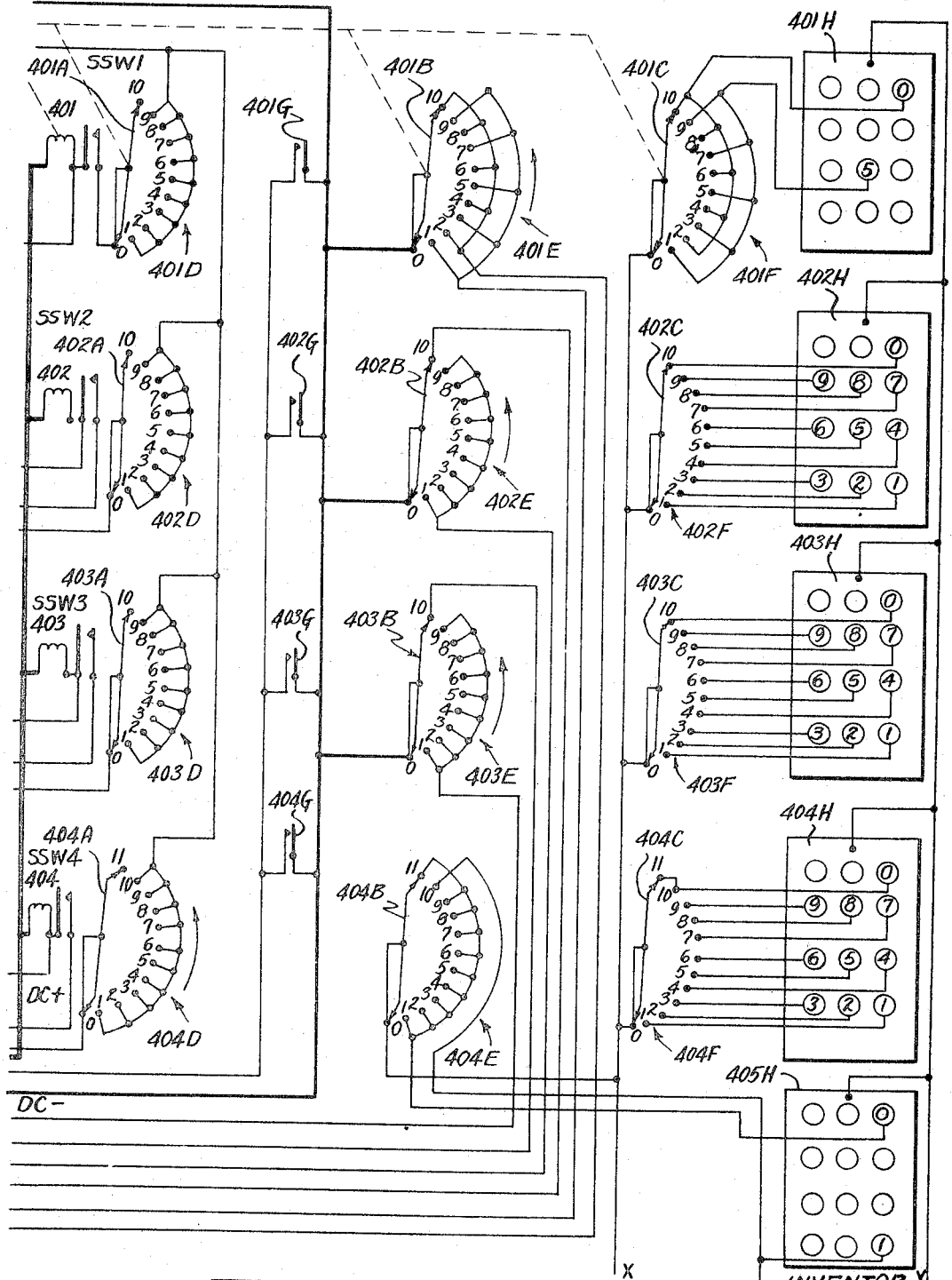

FIG. 14D is an enlarged view of the banks of switches and indicators at the right of FIG. 14C.

FIG. 15 is a plan view of the printer mechanism.

FIG. 16 is a side elevational view of the printer mechanism.

FIG. 17 is a front elevational view of the printer mechanism, parts being shown as broken away.

FIGS. 18 and 19 are vertical sectional views on the lines 18—18 and 19—19, respectively, of FIG. 15.

FIG. 20 is a vertical section on the line 20—20 of FIG. 15 with an outer plate removed.

Figure 21:
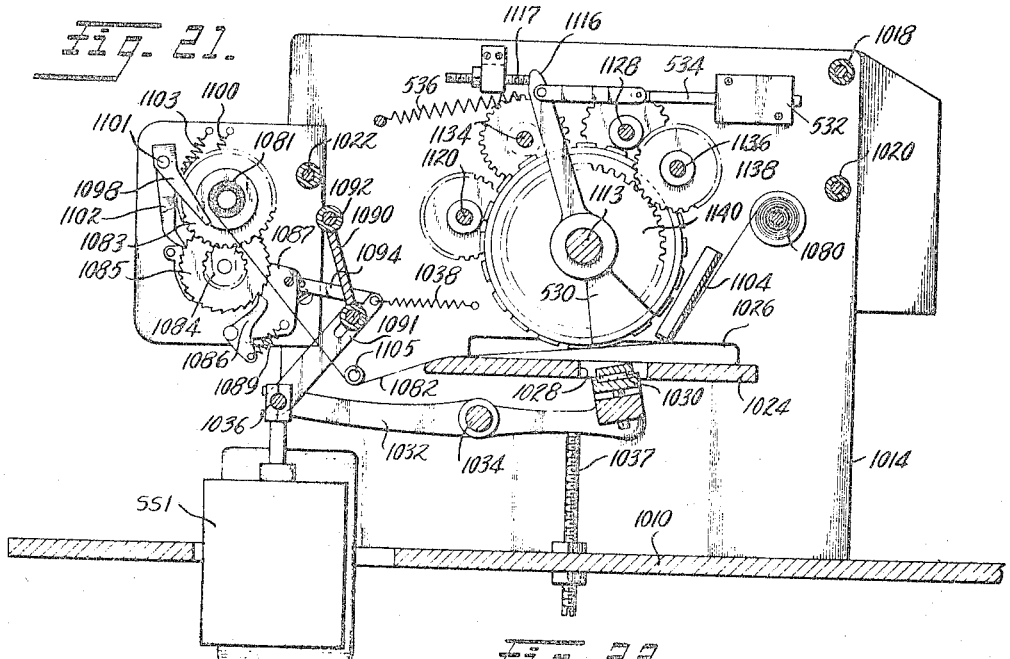
Figure 22:
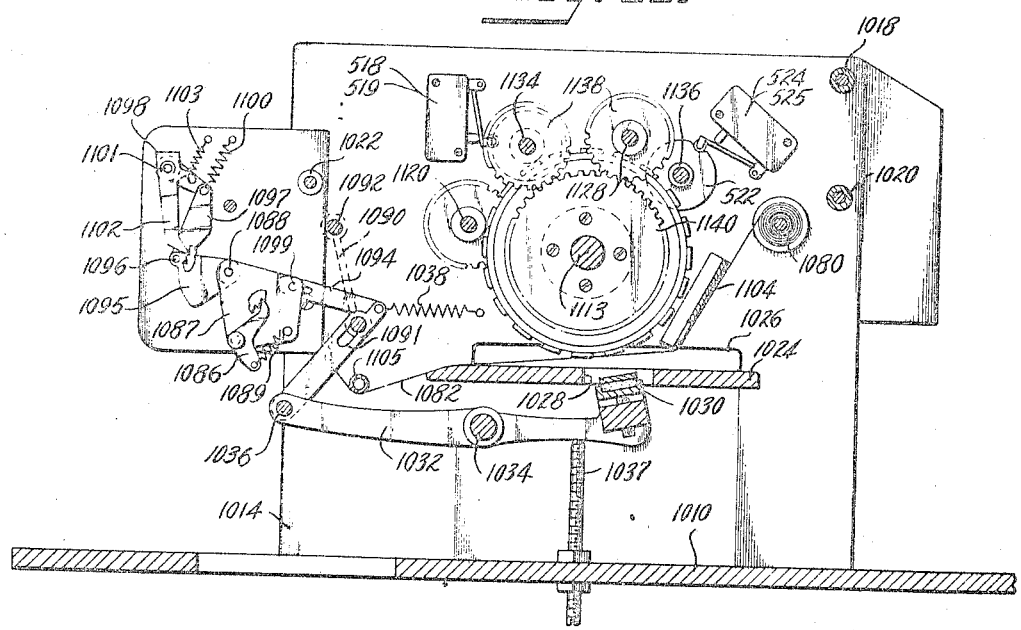
Figure 23:
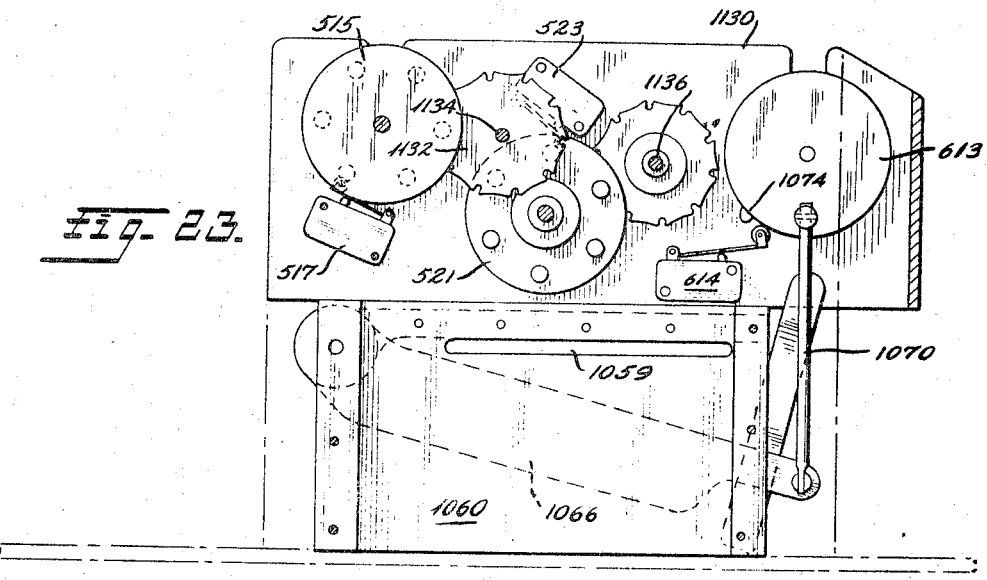

FIGS. 21, 22 and 23 are vertical sectional views on the lines 21—21, 22—22 and 23—23, respectively, of FIG. 15.

Figure 24:
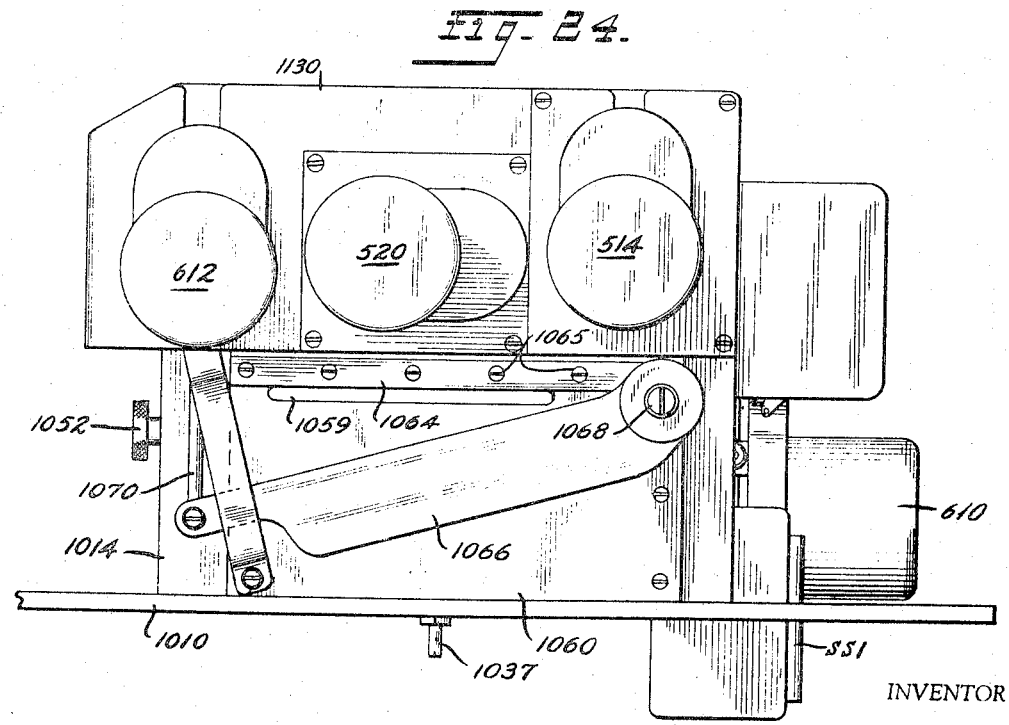

FIG. 24 is a side end elevational view of the printer mechanism, this end shown as opposite to that shown in FIG. 16.

FIG. 25 is a horizontal transverse section on line 25—25 of FIG. 17.

FIG. 26 is a vertical section on the line 26—26 of FIG. 15.

FIG. 27 is a fragmentary sectional view taken on the line 27—27 of FIG. 15 and shows, in part, a segment bearing year or other desirable designations thereon.

FIGS. 28, 29 and 30 are enlarged fragmentary views of a novel Geneva movement preferably used in the printer mechanism.

GENERAL DESCRIPTION

The illustrated mechanism is preferably housed within a cabinet 10 at its front portion provided with an advertising display box 12 or the like which is shown as having a transparent door 14, or the equivalent, hinged at the top and provided with a keylock 16. Beneath the box 12 is a drawer 18 provided with a similar keylock 20, said latter drawer containing relays and totalizer switching mechanism 22 which will be described, hereinafter, in detail.

To the right of the display box and drawer is another money and receipt retention or accept drawer 24 which may be locked against withdrawal from the cabinet by a keylock 26. In the front panel of this drawer 24 is a door 28 provided with a transparent opening 30, which is further provided with a finger aperture 32 above the transparent opening, whereby an operator may pivot the door about horizontal hinge 34, FIG. 5, at the lower edge of the door to obtain access to what is herein defined as a reject receptacle or bin 36 affixed to the pivoted door. Reject bin 36 receives documents or monies which have been rejected by the machine as unacceptable, or which, by change of purpose on the part of the individual depositing the documents or monies in the machine, the individual wishes to have refunded.

Figure 3:
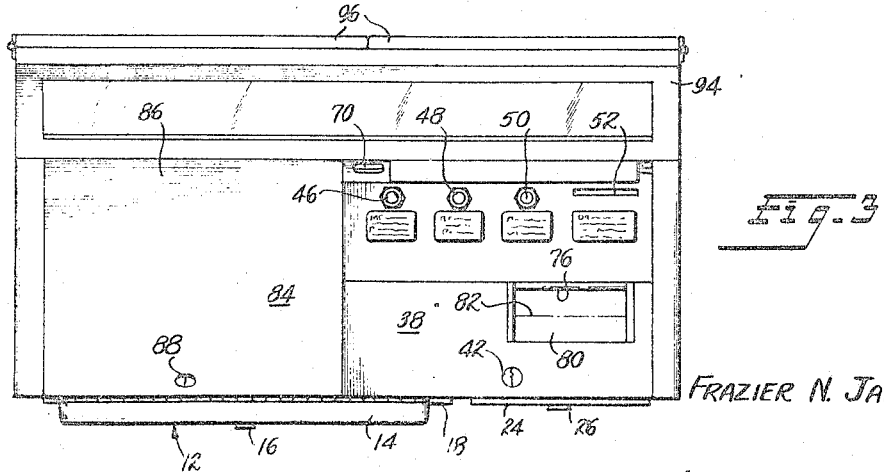
FIG. 3 is a top plan view of the same machine.

An upper wall 38, FIG. 2, of the casing is hinged by a horizontal hinge 40 to the rear of the casing and is provided with a keylock 42 at the front thereof, see FIGS. 2 and 10. The wall at its rear half is formed into a shelf 44 and is provided with three horizontally aligned buttons 46, 48 and 50, FIG. 3, each operating a switch device.

Operation of button 46 closes a circuit to return the document or monies deposited in the machine, prior to acceptance by the machine. Operation of button 48 will effect a return of a bent token or coin deposited in the machine, and operation of button 50 will control, hereinafter described mechanism to effect retention within the machine of non-spurious documents or monies deposited in the machine and the issuance of super-imposed duplicate receipts therefor and also will cause acceptance of documents.

To the right of these buttons is a slot 52 for deposit of one of the duplicate receipts, to be used after the depositer has identified himself on the receipt, the receipt bearing designations as to the serial number of the receipt, the date of deposit, the amount deposited and including thereon space for the depositor's signature and address, as well as such other printed matter as may be found desirable. Such a receipt is illustrated at 54 in FIG. 12.

It is understood that similar functions are performed as to other forms of documents. It is further understood that similar alterations may be made to the machine in order to perform the thus described functions.

Figure 1:
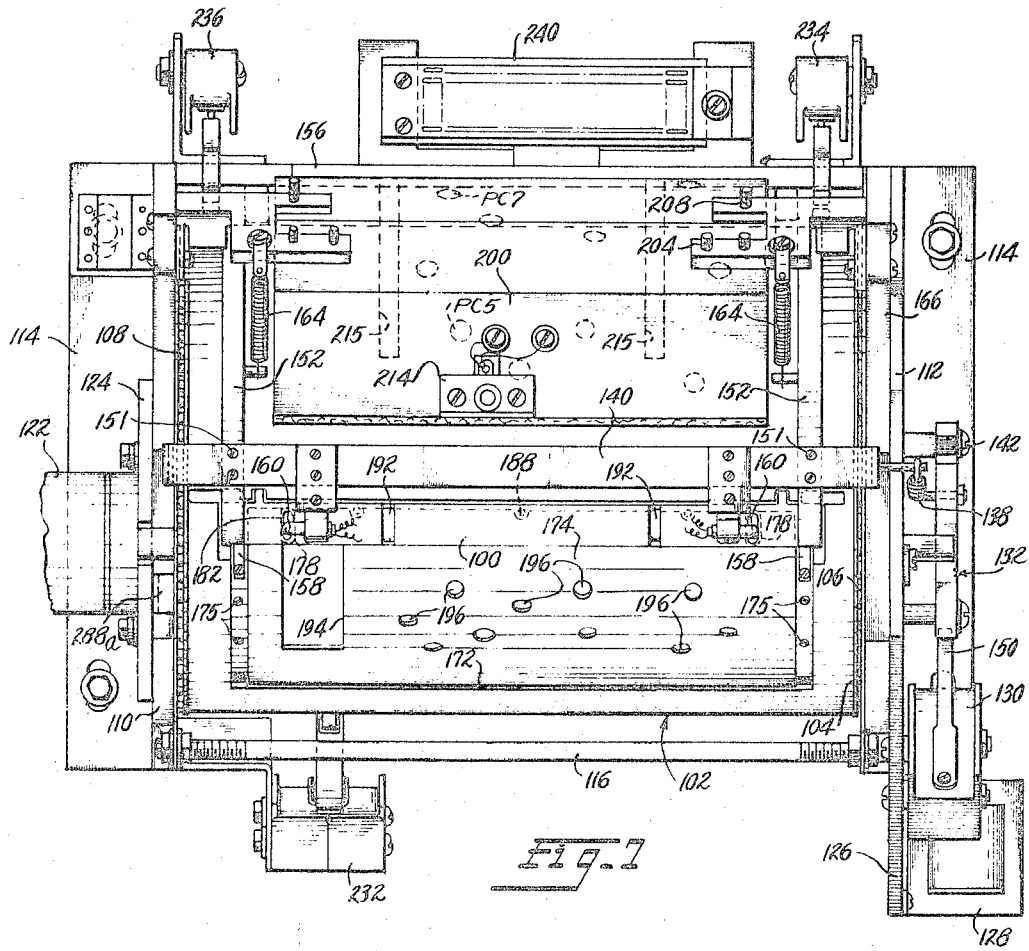
FIG. 1 is a front elevation of one preferred embodiment of the machine.

In the illustrated and described embodiment showing the machine of the present invention in use as a banking depositing machine, above the shelf and on an upward extension of the back portion of the machine is an indicator 60, FIG. 1, indicating thereon the total of the amounts of monies or currencies deposited in the machine before refund thereof or before acceptance by the machine. To the left of the indicator is a slot 70 for reception of nickels, dimes, quarters or half dollars, or other currencies in the form of tokens, coins or the like, the total of which coupled with the amount of the paper currencies deposited shows in the indicator of the preferred described embodiment.

Figure 5:
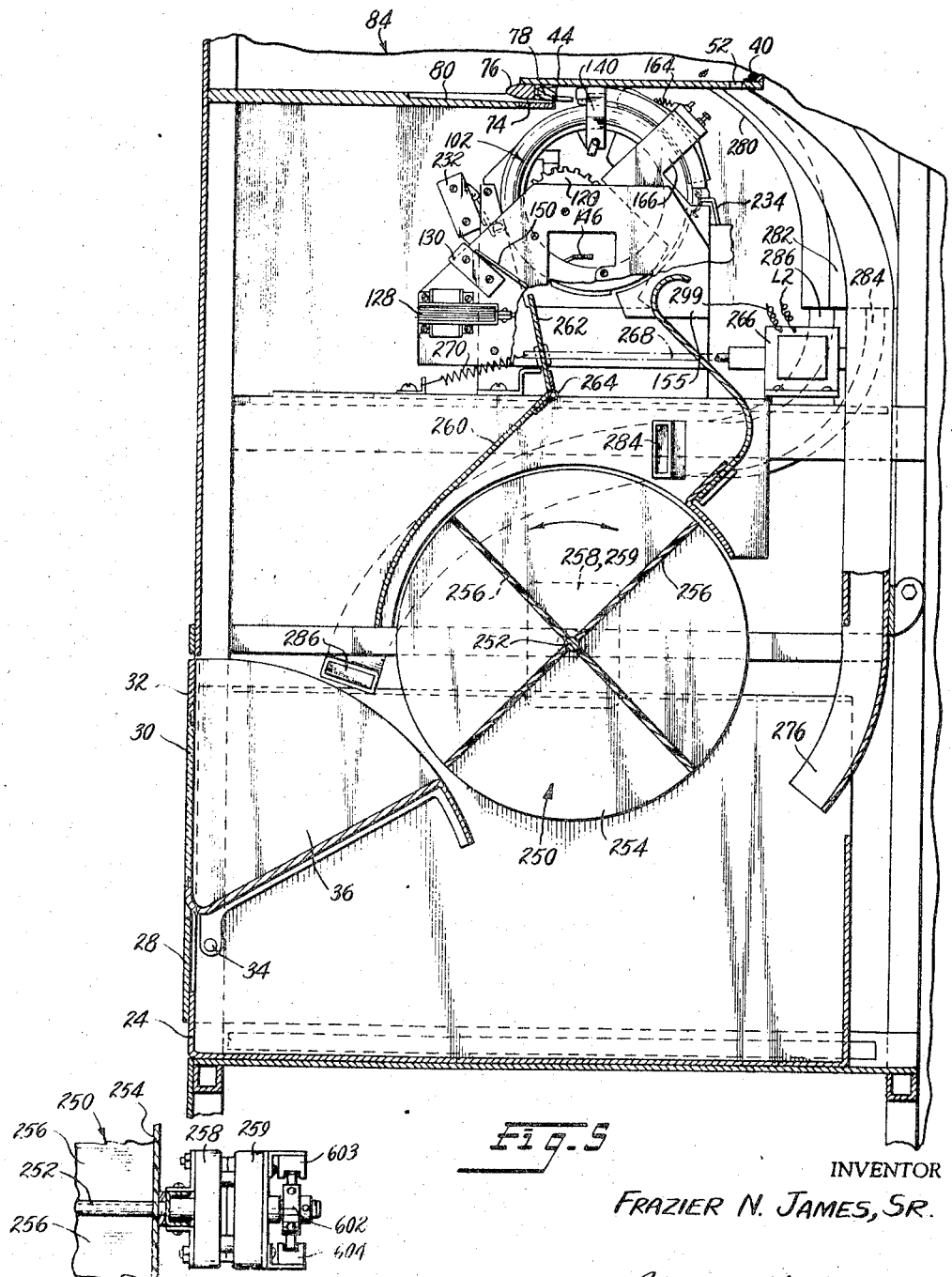
FIG. 5 is a vertical sectional view of a lower portion of the machine taken substantially on the line 5—5 of FIG. 1.

In the riser of the shelf 44, at the rigth-hand end thereof, is a slit 74, see FIG. 5, for the reception, for example, of documents or paper currencies, such as, in the preferred embodiment, 1, 5, 10 and 20 dollar bills, in the case of U.S. currency, or other denominations in the case of foreign currencies, the insertion into the slit of a bill or document being facilitated by reason of the bill guiding nosing 76, best seen in FIG. 5, affixed to the riser above the slit. Extending downwardly from the shelf 44 at the front edge thereof and behind the nosing 76, and toward the left of center of the slit 74, there is preferably a permanent magnet 78, shown in FIG. 5, to magnetize or otherwise change the magnetic ink on the paper currencies, or the like as it is introduced into the machine. United States paper currencies to be verified are conventionally printed with magnetic ink on one black ink face of the currencies or other documents; as may other similar documents. In front of the slit and on the wall 38 is a guideway 80, FIGS. 3 and 5, whose sidewalls increase in height as the guideway approaches the slit. Across the guideway is a fiduciary line 82, indicating how far a depositor should thrust the bill or document, so that it may be properly processed by the machine.

To the left of the wall 38 is a portion 84, see FIGS. 1 and 10, showing the casing rising above the level of wall 38 and also showing the housing of the mechanism for imprinting the receipts. Among other functions performed by this portion of the mechanism are those including the retention of the bottommost one of three superimposed triplicate receipts and the issuance of one or more of the other receipts. Portion 84 of the casing is provided with a sloping cover 86 hinged at the rear which is provided with a keylock 88 at the front end.

Figure 4:
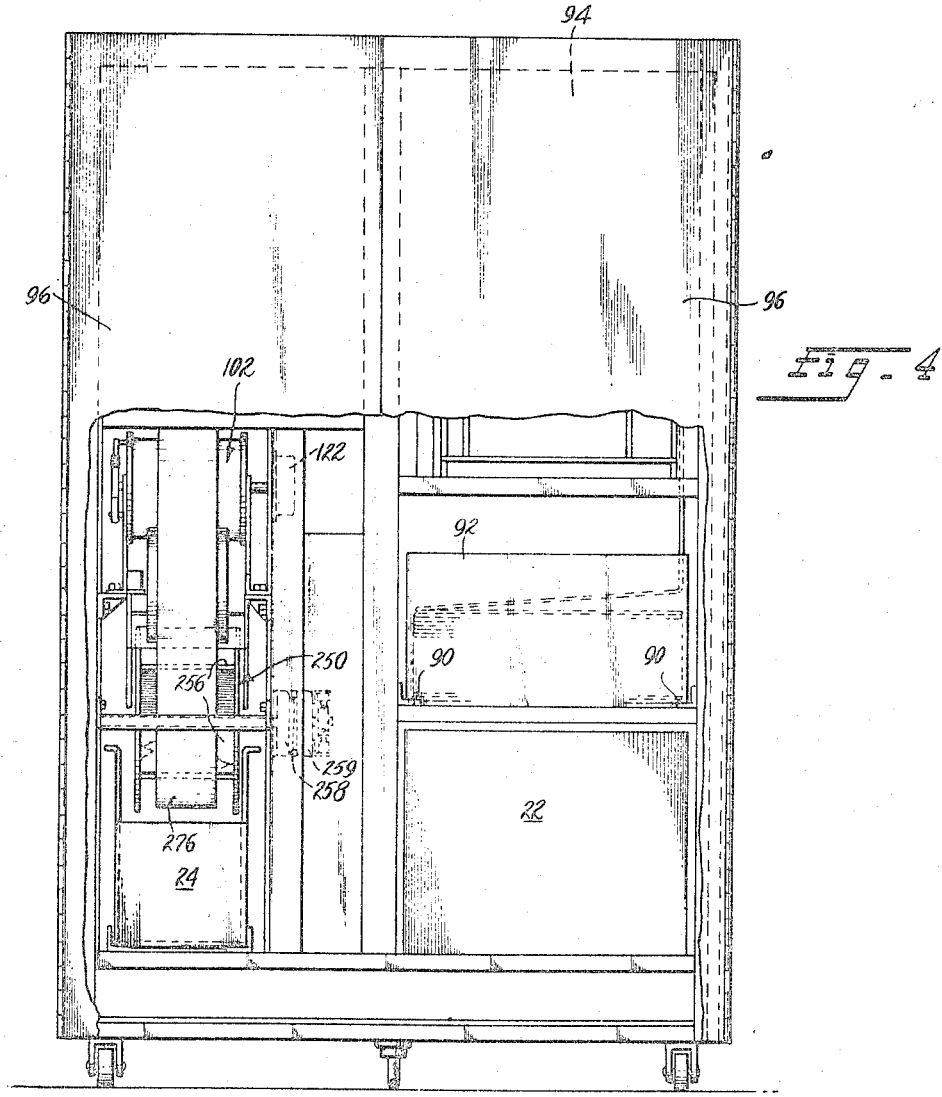
FIG. 4 is a rear view of the same machine with parts broken away to expose portions of the interior mechanism.

Beneath this casing portion and above the drawer 18 is a support 90, FIG. 4, as shown, for example, as angle irons, for a box 92 to receive the said one triplicate copy of the receipt, with serial number, date and amount printed thereon.

At the rear of the cabinet and above the indicator and casing extension 84 is a housing 94, see FIG. 2, for receiving advertising or other desired information, such as operational instructions for the machine.

The back of the casing is provided with a pair of lockable vertically hinged doors 96, see FIGS. 2 and 4, for gaining access to the mechanism within the cabinet.

As is now apparent, the machine in the preferred described embodiment is designed to process both coins and paper currencies or other similar documents or tokens.

PAPER CURRENCY PROCESSING—TESTING

How paper currencies and the like are processed is hereinafter now described.

For acceptance of paper currencies by the machine and the issuance of receipts therefor, it is necessary that the paper currencies be inserted in the slit 74, portrait side uppermost, and with the portrait in correct position, there being proper instructions on the machine for potential customers to adequately use the machine.

When the paper currencies, hereafter identified as a bill or bills, are inserted into the slit 74, FIG. 5, they come into abutment with a hold down bar 100, best shown in FIGS. 6 to 9, on a test drum 102, see FIG. 5, within the cabinet. This drum is preferably a cylinder with open ends fastened at each end to a ring 104, FIG. 7, secured to one raceway 106 of a ball bearing, the other raceway of which, 108, is fastened to an end support plate such as are illustrated as 110 or 112, see FIG. 7, each end plate being secured by an angular foot 114 to a fixed part within the casing. Bridge rods, as rod 116, shown in FIG. 6, may be used to maintain proper spacing of the support plates 110, 112.

The left-hand end of the drum, as the operator faces the machine, is provided with a ring gear 118, see FIG. 8, in engagement with a pinion 120 of an electric motor assembly 122, see FIGS. 4, 7, hereinafter termed a motor, mounted on a plate 124, in turn secured to support plate 110, it being understood that this particular embodiment of the parts thus far described is for illustration of one preferred embodiment of the invention.

Figures 6, 8:
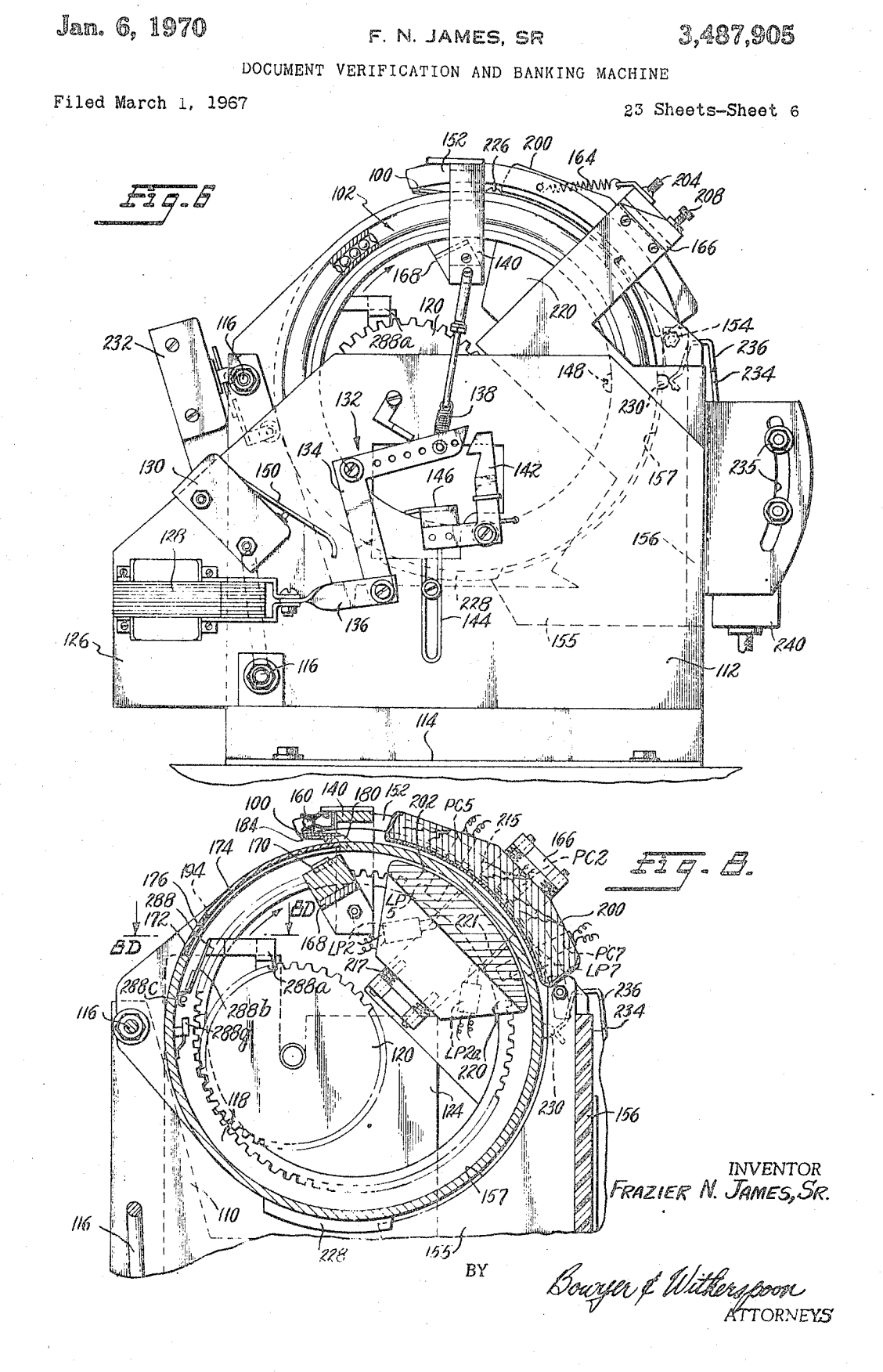

Mounted on the right-hand support plate 112, FIG. 7, is a base plate 126, FIG. 6, mounting a solenoid 128, a microswitch 130 momentarily closed by a momentary energization of the solenoid, and an operating mechanism 132 for operating the hold down bar 100. The operating mechanism consists in part of a right angled lever 134 pivoted at its angle. Said lever is connected at its lower end by a pitman 136 with the plunger of the solenoid, and is connected at its other end, through the intermediary of a tension spring 138, to the lower end of a downwardly directed leg of a U-bar 140. When the solenoid is momentarily energized, the U-bar is pulled down, closing, through the intermediary of pivoted arms to be described, the the hold down bar 100 against a bill so that the lever 134 is locked in operating position by a spring operated latch 142 which normally engages an adjustable stop 144 on the base plate 126.

The latch has a projection 146 extending into the drum in position such as to be engaged by a pin 148 mounted on the interior surface of the drum, so as to release the lever and U-bar 140 and the arms at a desired angular position of the drum. During energization of the solenoid, its plunger is drawn fully into the core of the coil of the coil of the solenoid, and the vertical arm of the lever 134 engages a microswitch operating lever 150 to close the contacts of switch 130. When the momentarily energized solenoid is de-energized, the core is pulled out slightly by spring pull on the lever, as herein described, and the vertical arm of the lever 134 rotates slightly counterclockwise to allow the switch operating lever 150 to move, so that the microswitch can open. The horizontal lever arm is simultaneously rotated to its latching position in engagement with the latch 142.

The U-bar 140 is affixed, as by screws 151, to a pair of arms 152, see FIGS. 6 and 7 extending circumferentially of the drum, each arm being pivoted at its rear end, as at 154, see FIG. 6, to the upper end of a fixed track extension 155, the extensions being perpendicular to, and secured to, a back wall 156, see FIG. 8, bridging and fastened to the end support plates. As these arms are pulled against the drum by the bar 140 and the drum rotates, the hold down bar is pivoted to bill holding position.

The track portions 157 of the fixed track extensions pass beneath the drum and terminate substantially in the vertical diametrical plane of the drum. The functions of the track extensions are to maintain the hold down bar 100 down against a bill and against the action of leaf springs 158, see FIG. 7, mounted on the drum and pressing against the under side of the bar, in order to securely clamp the bill to the drum during a partial cycle of rotation of the drum. On the bight of the U-bar 140, FIGS. 6 and 7, and between the arms 152, are mounted two lamps 160, see FIG. 7, one near one end of the bar and the other near the other end thereof. The U-bar and the free ends of the arms 152 are held in elevated position by a pair of springs 164, FIG. 6, tensioned between the arms and cantilever supports 166 fastened to the support plates 110 and 112. The springs 164 function, through the arms 152, U-bar 140, and spring 138, see FIG. 6, to rotate the lever 134, so as to pull the plunger of the solenoid to microswitch open position. The downturned legs of the U-bar support a cross bar 168, see FIGS. 6 and 8, within the drum. This cross bar supports a pair or more of photo-voltaic cells 170, in registration with the lamps 160.

Mounted in a rectangular opening 172, FIG. 7, of the drum is an arcuate plate 174, which may be fastened, as by screws 175 to side flanges 176 shown as extending from the drum and which may extend into the said opening. This plate, in the normal rest position of the drum, has two openings 178 which register with the lamps 160 and the photo-voltaic cells 170.

When a bill is inserted through the slit 74, as previously described, it comes into abutment with the hold down bar and occludes the light from the lamps 160. This, as will be explained, initiates clamp down action of the hold down bar and initiates drum rotation. The hold down bar as shown in FIG. 8 is pivotally mounted on the drum by a pair of pintles 180, one close to each end of the bar and is provided with apertures 182 in registration with the aperture 178 in the arcuate plate 174. In cross section, see FIG. 9, the hold down bar is preferably L-shaped with a roughened surface 184, such as sandpaper, on the under surface of the bar and with a vertical leg 186. In order to insure against the possibility of a ball being thrust back of, and beyond the rear of, the hold down bar, despite the presence of the vertical leg, shown as a number of pins 188, these being illustrated as three pins spaced along the length of the bar, are projected through the bar and extend slightly down below the lower level of the hold down bar, and, in raised position of the hold down bar 100, extend just below the level of the top of the arcuate plate 174 and into openings 190 therein. The top of the hold down bar 100 is provided with cams 192, see FIG. 7, for a purpose hereinafter described.

The arcuate plate is further provided with a large rectangular opening 194, see FIGS. 7 and 8, in order to enable light from stationary sources LP2 and LP2a within the drum, in a rotated position of the drum from its normal rest position, to flood a substantial area of the underside of a bill on the drum, which light, if it be transmitted through the bill will be picked up by a stationary photocell PC2 within an upper sandwich plate to be described. While the light transmission test offered at the flooded area is indicated as preferred, if other light transmission tests are to be performed, in order to determine the denomination and genuineness of a document, such a test could obviously be performed before or after such other tests. Furthermore, if desired, light could be transmitted to the bill from one or more sources of light by means of a bundle or bundles of light conducting fibers, such as are described in the patent to Dunn, 3,043,179. The arcuate plate is provided with test openings 196, see FIG. 7, located at desired areas, selected in accordance with the denominations of paper currencies or characters on a document through which light from lamps fixed within the drum may pass, the light passing through selected areas on the document or bill placed on the drum, in said rotated position of the drum, and impinging on photocells, preferably in said sandwich plate exterior of the drum. Typical photocells as LP5 and LP7 are indicated in FIGS. 7, 8, 8A, 8B and 8C. The positions of the lamps and the photocells may be interchanged.

The test drum to which the arcuate plate is fastened is provided a little to one side of the mid-length of the drum with a groove 198 circumferentially of the drum, for a purpose hereinafter described. FIG. 11 shows this groove 198. FIG. 11 also shows other parts, such as 182, 188 and 190 which find their counterpart in drum 102 and their associated bar 100. The grooves on the drum, however, are continuous around the drum, except in the area occupied by the plate 174.

Displaced approximately 60°, angularly, from the normal rest position of the drum is a pair of arcuate sandwich forming plates 200 and 202, see FIGS. 6, 8 and 8A to 8C, plate 200 being shown as exterior of the drum and plate 202 being shown as interior of the drum.

The exterior plate is supported at one side thereof by one of the cantilever supports 166, see FIG. 7, previously referred to, said support having freely movable therethrough a number of dowels 204, FIG. 7, fastened to the plate, springs 206 being interposed between the cantilever support and the plate for urging the plate down against the drum. The cantilever support is further provided with an adjustable stop screw 208, FIG. 7, to limit the upward swinging motion of the arms 152. The cantilever support at the opposite side of the exterior plate similarly supports the plate and is provided with a similar stop screw. The exterior plate supports a number of photocells PC2 to PC8a, or any desired number thereof, some of which have already been described, one for the large opening 194, in the arcuate plate 174, and one for each of the test openings 196 in the plate, and to be used for purposes described hereinafter.

Also mounted in an opening adjacent to the front edge of the exterior plate toward one side of the center is a magnetic pick-up head 214, see FIG. 7, this being in alignment with the magnet 78 and adapted to be opposed to the engraving lines on a bill or the like surrounding a portrait or the like thereon. This head is spring pressed onto the bill. The underside of plate 200 is provided with grooves 215, extending from a little beyond the front edge of the plate to the rear edge thereof to accommodate the cams 192. Although the magnetization of the magnetic ink on the bill or document has been described as being effected by positioning the magnet 78 at the upper edge of slit 74, the magnet could be elsewhere such as in advance of the pick-up head 214, and could, in fact, be positioned below the under face of the bill. Likewise, in view of the hereinafter described amplification of signals possible with pre-amplifiers and additional amplifiers, the pick-up head 214 may be positioned beneath the face of the bill or document, picking up magnetic pulses through the bill or document.

The sandwich forming plate 202 positioned preferably interiorly of the drum, is supported at one end by a cantilever arm 216, preferably supported by one of the support plates in a manner similar to the exterior sandwich forming plate and supports lamps LP3 to LP8a in registration with the photocells in the exterior plate 200. In addition, the interior sandwich plate has abutting thereagainst a box 220 below a rectangular cut out 221 in the plate 202. A second cantilever arm 217 as shown supported by the other support plate 10, supports the box. At each end of the box there is shown a pair of lamps LP2 and LP2a, two lamps on each side of the box, adapted to flood an area on the bill when the drum is brought with its opening 194 into registration with the opening 221 in the plate 202, the light transmission through the bill impinging on the photocell opposite the center of the box, positioned in the exterior plate 200.

The cylindrical surface of the drum 102 is further provided with a short cam 226, see FIG. 6, which may be the head of a screw, close to the right-hand edge of the drum and somewhat in advance of the hold down bar, an elongated cam 228, see FIG. 6, in back of the lower edge of the opening 172 and a short third cam 230, see FIG. 6, which may also be the head of a screw, adjacent the left-hand edge of the drum between the elongated cam and the hold down bar. The elongated cam 228 cooperates with a second microswitch 232, FIGS. 5, 6, mounted on one of the cross bars in front of the drum; short cam 226 cooperates with a third microswitch 234, see FIG. 7, arcuately adjustable by means of slot and bolt connections 235 about the axis of the drum at the rear of the drum, and short cam 230 cooperates with a fourth microswitch 236, see FIG. 7, likewise arcuately adjustable and similarly positioned at the rear of the drum in back of switch 234 in FIG. 6. On the back wall 156, see FIGS. 6, 8, of the drum support structure is mounted a terminal block 240, see FIG. 7, which contains the leads to all of the electrical elements directly associated with the drum.

In the operation of the device thus far described, when a bill is thrust through the slit 74, the magnetic ink or other markings on the bill are magnetized by the magnet 78. The bill is thrust against the downturned leg of the hold down bar 100 or the pins thereof, at which time the light rays from lamps 160 are diminished substantially in their illumination of the photo-voltaic cells 170, shown as mounted beneath the drum or the like.

As a result, due to circuitry hereinafter described, the solenoid 128 is energized, and the hold down bar is moved to bill or other document clamping position and the drum is set into rotation by means to be described hereinafter. As the drum rotates, the cams 192 on the upper surface of the hold down bar engage the under surface of the exterior sandwich plate 200 and lift the same upward so that the magnetic pick-up head 214 will not be injured by reason of hold down bar edge engagement therewith. On passage of the hold down bar past the forward edge of the plate 200 the cams 192 ride in the grooves 215 in the under side of plate 200, so that the spring pressed head 214 can ride directly on the bill, or the like, and pick up magnetic pulses from the magnetized lines on the bill.

Thus, a test is made to determine whether or not the ink on the bill or the like is magnetic. It is immaterial that the spacing of the printing lines may be. A variable magnetic flux is sensed by the head 214 during the motion of the bill to sandwiched position between the plates 200 and 202, because the ink lines are spaced apart.

The drum is maintained in rotary motion until the third switch 234 is momentarily operated by cam 226. Cam 226 is very short, and the drum rotates to carry the cam beyond the switch operating arm of the third microswitch 234, by reason of delay of relay operations.

In the meantime and previous to the stoppage of the drum in sandwich position of the bill, the magnetic head has been primed for magnetic readout by reason of the second microswitch 232 being kept closed by elongated cam 228. However, the momentary closing of the third switch 234, through a relay operation, described hereinafter, causes the motor to be de-energized for a short time, designated herein as a dwell period. Thereafter the motor again is automatically energized to complete the rotation cycle of the drum. At the time that the drum is momentarily halted, several tests other than the previously completed magnetic test are performed on the bill.

One of these is of the flood light transmission characteristic of the bill, as determined by pairs of lamps LP2 and LP2a in the box below the cut out 192, and the photocell PC2 in the plate 200, and another is the light transmission characteristics of the bill to determine its orientation as determined by lamps LP3 and LP4 and photocells PC3 and PC4. Other light transmission tests performed by lamps LP5 to LP8a in conjunction with photocells PC5 and PC8a are performed to determine both the genuineness and denomination of the bill. Thus, a bill in its passage from the entrance slit to that point where it is released from the drum to one or more escrow drums, is subjected first to a magnetic test, then to an orientation test, then to a flood transmission test and then to subsequent types of light transmission tests, one for example, for orientation and another for denomination.

There are still other tests which should be performed to determine whether or not a bill has actually been released from the test drum, such a test involving the use of a sensing or contact finger. This is performed in order to detect accidental or fraudulent adhesion of the bill to the test drum, which could cause improper registration of the amounts deposited. When the drum rotates from the bill sandwiching position, pin 146 in the drum engages projection 146 and releases the latch. However, the bar 100 is held in clamping position by the track portions 157. When the drum rotates further to a position where the hold down bar is no longer held closed by the track portions 157 of cam extensions 155, the springs 158 force the hold down bar open and the bill drops into the escrow drum. Should the bill not be released, its presence on the drum will be detected by reason of the contact finger extending through an aperture 242 in the plate 174 of the drum into contact with the bill, thereby causing the closing of a circuit to a self-latching release relay K11 as will be described. Appropriate circuitry, to be described, then will effect stoppage of the drum drive and, preferably energization of an alarm.

In a modification of the drum structure, the drum may be provided with two or any number in excess of two hold down clamps and one or more perforated plate areas spaced about the periphery of the drum. An example of such an arrangement is illustrated diagrammatically in FIG. 11 wherein two hold down clamps or bars 244 and associated perforated areas 246 on the drum are depicted.

Where more than one test area on the drum is provided, duplicate sets of control cams to operate the switches 130, etc. are necessary, so that a fraction of the revolution of the drum will constitute a cycle of operation of testing the document and its release. The drawings illustrate such other parts, as, for example, 180, 182, 184, 190, 198, which exist on the previously preferred structure, but which may not be seen therein. To facilitate feeding of the paper currency or documents to the drum, the cabinet is provided with a stack holder 248, see FIG. 10, from which bills or documents removed by hand or by an automatic feeder, one at a time, are fed to the drum, it being understood that the bills need not be in any prearranged denominational order, any known bottom stack automaitc feeder being suitable.

PAPER CURRENCY PROCESSING—REJECTION OR ACCEPTANCE OF PAPER CURRENCY

Preferably positioned beneath the test drum 102 is the escrow drum 250, FIG. 5. The escrow drum is shown as mounted on a horizontally disposed axle 252, in turn mounted in the framework of the machine, and comprises two vertical side discs 254 and two or more diametric partitions 256, arranged at right angles to each other to form four or any desired other number of compartments. The shaft is driven by reversible motor means 258, 259, actually two reversely driven motors driving a common shaft, and the escrow drum rotates a quarter revolution or other desired segmental amount for each operation.

Above the escrow drum is a chute 260, so that when a document or a bill on the test drum has been determined to be genuine and the denomination of the bill has been determined, it will drop through the chute into an escrow compartment.

If the document or bill has been rejected by any of the various hereinbefore described tests within the machine, and oscillatable plate 262 will have moved to a position, such that when the document or bill is released from the drum, it will not drop through the chute but will slide down the plate to the reject bin 36. For this purpose the plate is hinged, as at 264, on its lower edge to the framework and is operated by the energization of a reject solenoid 266 which through a rod 268 pulls the plate to the reject position. A spring 270, tension between the rod and a fixed part of the machine, serves to normally maintain the plate in document or bill acceptance position.

When the currency is deposited in an escrow compartment, the escrow drum can be rotated a desired segmental amount, so as to refund the currencies or other documents therein, should the operator so desire, by operation of button 46. The desired revolution of the escrow drum is in a direction such as to dump the currency into the reject bin 36. Or, if desired, the escrow drum may be rotated a quarter revolution or other desired segmental amount in the opposite direction by operation of button 50, whereupon the currencies or the like drop into the currencies and receipt retention or accept drawer, which is a part of drawer 24.

When currencies are accepted by the machine duplicate receipts therefor, stored in zigzag fashion in an end portion of box 92, FIG. 4, are issued from the machine and, one, imprinted by the above described machine, is retained in another end portion of the box.

It will be noted that, after a deposit has been made and accepted by the machine, and a duplicate set of receipts has been issued, a second one of the duplicate issued receipts, after the name of the depositor has been written thereon, is redeposited in the machine, via slot 52, so that this receipt falls on the paper currencies or documents last collected by the machine. A receipt chute 276 is provided, leading from the slot 52 to a position above the retention drawer 24, so as to deposit a signed receipt on the paper currencies deposited.

It will be understood that a plurality of oscillatable plates 262 may be utilized in the machine. Alternatively, or in combination therewith, a plurality of control mechanisms for determining a plurality of different position settings may be used for controlling plate 262. Additionally, it will be understood that more than one escrow drum 250 may be utilized in conjunction with such an alternative embodiment. This alternative embodiment is of particular desirability where the machine is to be utilized as a sorting mechanism for currency or the like, it being understood that the currency may be fed either manually or mechanically as shown in FIG. 10, without the necessity of a bank teller or similar personnel sorting the bills by denomination.

As is described fully herein, the denominational character of a currency bill or the like will actuate the release and other electrical circuitry to produce pulses which are indicative of the denominational character of the bill. Such pulses, in addition to their herein described operation, may also be utilized to operate either the position of plate 262 or the position or actuation of additional plates 262 and/or additional escrow drums 250.

In the hereinafter described specific embodiment of the machine there is given a detailed explanation and other description of the manner in which the machine functions to imprint and issue receipts for currencies deposition. It will be understood, however, that, for example, the machine can be utilized in a different embodiment thereof for the issuance of postal stamps or postal receipts by postal employees. In the event of the issuance of postal stamps, the hereinafter described printer mechanism will only function so as to form a record sent to it from the totalizer portion of the apparatus to indicate the total of the stamps issued.

In an embodiment in which the machine is utilized for issuance of postal receipts, the functioning of the hereinafter described totalizer and printing mechanism will be substantially similar to that utilized in the banking currency embodiment, except that a lesser or, if desired, greater number of receipts will be imprinted and issued by the machine.

COIN PROCESSING

Coins deposited in the machine via slot 70, see FIG. 5, pass down into a chute 280 leading to a conventional coin testing and value determining device 282; acceptable coins are assorted, as is known in the art, as to denomination and operate switches to close circuits herein described to totalize their amounts and to pass down an acceptance chute 284 so as to fall into the escrow drum, whereas rejected coins, and coins released after having been stuck in the coin testing gate by reason of being bent or for other reasons, will be returned to bin 36 via a reject chute 286.

PAPER CURRENCY PROCESSING CIRCUITRY

FIGS. 13A, 13B and 13C disclose the circuitry involved in the testing and evaluation of the paper currencies or the like offered to the said machine and in accepting or rejecting the currencies.

While the description following is specifically applicable to the use of United States currencies, it should be understood that, by suitable adaptation, within the teachings of this invention, other currencies may be tested and evaluated by the machine.

In the descriptive example set forth herein wherein United States currencies are utilized, there are shown at the lower left-hand corner of FIG. 13A the various sources of supply for the electrical components in the machine. It will be noted that the machine may be supplied with conventional house current such as 117 volt AC, 60 cycle current. A branch line from this supply feed electrical power to certain parts. By conventional transformers and rectifiers the following additional voltages are obtained from the source of supply; a 20 volt regulated DC supply independent of other converted voltages fed to the pre-amplifier A1 of the magnetic testing system, a regulated 9 volt DC fed to the intermediate amplifier A2 and to the power amplifier A3 of the magnetic testing system, a second 20 volt regulated DC supply fed to certain hereinafter designated other components of the system; 117 volt DC fed to still other described components and 3 volt and 6.3 volt AC fed to the lamps utilized in this portion of the machine.

There will now be described a preferred embodiment of an electrical circuitry complex suitable for performing the desired functions of the present invention, the contacts of the relays being shown in their normally biased positions prior to initiation of the machine.

At the upper left-hand corner of the FIGURE 13A there are indicated two lamps 160 located at the entrance to the machine, as previously explained, the light from which normally impinges on the solar or photo-voltaic cells 170 within the drum, see FIG. 8, said cells being in parallel with one another and being utilized for applying control voltages to the base of biased transistor Q1.

When the light from the lamps striking the cells is obfuscated, this transistor is rendered conductive sufficiently to energize relay K1, so as to close its contacts. A capacitor C1 removes spikes from the potential applied to the transistor, and potentiometer R1 is utilized to adjust the voltage applied to the base of the transistor. Bias resistor R2 interconnects the collector and base of the transistor. As explained heretofore, the cutting off of the light initiates clamping of the bill to the drum by operation of solenoid 128 and its associated parts and controls initial rotation of the drum.

In the interest with respect to clarity of the drawings, while reference will be made to contacts 1, 2, 3, etc. of a switch or relay, only the movable contact of the relay or switch in most instances will be indicated, such as the contacts 2, 5, 8, 11, etc. The other counters are not numbered because of space requirements, and in order to avoid confusion, but the number of the contacts is determined by counting backward or forward from the contact bearing a number. In a few instances, to aid in the understanding of the patent, all of the contacts of a relay or a switch are indicated.

Closure of the contacts of relay K1 energizes adjacent solenoid control relay K2, closing its holding contacts 1 and 2, via normally closed contacts 5 and 6 of relay K5 and closing its own contacts 4 and 5, thereby completing a 117 volt AC circuit through solenoid 128. When solenoid 128 is first energized, first switch 130 is energized momentarily, in the manner previously described. Momentary closure of switch 130 causes 117 volt DC current to flow through the winding of relay K3, energizing the same and causing it to lock up via its contacts 1 and 2 and through normally closed contacts 5, 6 of distributing relay K7. Also, contacts 4 and 5 of relay K3 close, energizing the winding of main control relay K4, which locks up via its locking contacts 1 and 2 and normally closed fourth switch 236. Now that the main control relay K4 is energized, the circuit for test drum driving motor 122 is completed from line L1, via contacts 11 and 12 of relay K8, via contacts 10 and 11 of relay K4, and via contacts 3 and 2 of a latch relay K11 and normally closed contacts 11, 12 of relay K8 to the motor, the opposite side of which is connected to line L2.

This initial actuation of the motor operates to bring a bill or like object under test to the sandwich position and then the motor comes to rest for a dwell period, arbitrarily selected herein, of approximately seven and one-half seconds. During this initial rotation of the motor, the bill is being tested for its magnetic properties. During its dwell period the bill is tested for its light transmitting qualities and denomination. After the last test the motor resumes roation of the test drum to bring it to its initial posiion, during which resumed roation a test is performed to determine whether the bill has been released from the drum, and, normally, subsequently thereto, the drum stops after having made a complete revolution.

The energization of relay K4, FIG. 13B, which is indicated by a lamp LP9 located for test purposes at any convenient location within the cabinet, via its contacts 4. 5 effects energization of slow release relay K5, which has locking-in contacts 1, 2 timed to hold for a short time only by reason of action of an RC network consisting of a capacitor C5 and resistor R5 shunting the coil of relay K5. The capacitor C5 is initially charged through the contacts 2 and 3 of relay K5. Relay K5 by opening of its contacts 8, 9, effects release of relay K1 and breaks the supply circuit to transistor Q1 and the solar or voltaic cells 170, preventing a repeat operation of the machine and allowing the cells to return to their original condition.

The timing of the RC circuit is designed so as to maintain relay K5 closed until after the bill on the drum starts to move out of the sandwich plates 200 and 202.

The energization of relay K5 opens, at its contacts 5 and 6, the holding circuit for relay K2; relay K2 then releases, opening its contacts 4 and 5 and thereby de-energizes solenoid 128. However, the clamping hold down bar 100 is still in operating position because of the action of latch 142. The first switch 130, as described in other portions of this specification, is maintained in an open position.

This initial rotation of the drum to its dwell position drags the bill or other document beneath the magnetizing permanent magnet 78, past the readout head 214 and in between the sandwich plates 200 and 202. During this rotation, cam 228 engages switch 232 and closes the same, priming a 20 volt DC circuit through the coil of relay K9, and applying potential to the anode of silicon controlled rectifier SCR1.

Should the gate of the rectifier be open by reason of the existence of magnetized ink on the bill, SCR1 will cause conduction so as to energize relay K9. This relay will close its contacts, thereby energizing the winding of relay K6, which, by closure of its contacts 4 and 5, will apply a 20 volt DC+ voltage to contact 7 of relay K7, which last relay serves to control the operations of transistors Q2 to Q8. Transistor Q1 is permanently secured to the 20 volt source. Relay K6 is held locked via its holding contacts 1, 2 and contacts 4 and 5 of still held energized relay K5.

Relay K6 will not be energized if the magnetic test fails, and, thus, no further tests will be effective on the bill since the transistors Q2 to Q8 will be held inoperative, and the bill or other document will be rejected.

The magnetic test is effected by the coil in the head 214 sensing the passage of magnetic lines on the document or bill and via the pre-amplifiers A1 and intermediate amplifier A2 and power amplifier A3, transmitting a pulse to the transformer T1 which, via diode D1 and associated potentiometers, applies a pulse to the gate of the silicon controlled rectifier SCR1.

As the drum continues its rotation to the bill sandwiching position, the cam 228 will allow the second microswitch 232 to open, thereby causing relay K9 to be de-energized and terminating the magnetic test. At this time the bill is substantially well within the sandwich.

As the drum continues to revolve, cam 226 on the drum momentarily closes the third microswitch 234, thereby energizing the coil of relay K7, which, by closing its contacts 4, 5 causes energization of relay K8. The opening of contacts 5 and 6 of relay K7 allows relay K3 to be de-energized. This coil of relay K7 may, if desired, be kept energized for test purposes by closure of manually-operated switch S7, which closes a holding circuit for relay K7 through its contacts 2 and 1. When relay K8 is energized, which is after a slight delay due to the series actions of relays K7 and K8 and the charging of capacitor C8 through resistance R8, the contacts 11, 12 of relay K8 open, temporarily de-energizing motor 122, at which time the motor has driven cam 226 past the third switch 234, so that it also opens and is no longer effective to complete the circuit to relay K7.

However, the coil of relay K7 is still maintained energized for a period of about 4 seconds, or other desired time, by reason of a large capacitor C7, charged via contacts 11 and 12 of a relay K13 and switch 234, when contacts 1, 2 of relay K7 first close. During the time the motor is thus de-energized there is a dwell period while the bill is undergoing its flood light transmission and other light transmission tests.

During the time the motor is at its dwell condition, i.e., with the bill sandwiched in between plates 200 and 202, and just prior to release of relays K7 and K8, the following relays are released: K1, K2, K3, K5 and K9. Relays K4 and K6 are energized, as are not relays K7 and K8. Also, during the period of dwell, value transmission relay K10 is energized, initial energization having been effected via closure of contacts 1 and 2 of relay K8, opening being under control of its own holding circuit involving capacitor C10 and resistor R10, this opening in the given example occurring one and one-half second subsequent to the seriatim opening of relays K7 and K8.

The motor is, therefore, set into operation again after relay K7 releases, opening K7's contacts 4, 5 and thereby allowing relay K8 to release under control of its holding RC circuit consisting of capacitor C8 and resistor R8. When relay K8 releases, its contacts 11, 12 again close, completing the circuit to the motor 122 via still closed contacts 10, 11 of relay K4 and normally closed contacts 2 and 3 of latch relay K11. Relay K4, as described herein, will not be released until the test drum has completed its normal cycle of operation.

The motor will continue to revolve to bring the document or bill first to release position from the hold down bar, and then, under normal conditions, the drum will be driven to its initial position, when cam 230 will engage the fourth switch 236. Momentary opening of switch 236 opens the holding circuit for relay K4 which allows its contacts 10, 11 to open to break the motor circuit to the motor 122, so that it stops.

Due to delay of release of this relay K4 and to the shortness of cam 230, the fourth switch 236 will have been reclosed by the time the contacts of 10, 11 of relay K4 open. When relay K4 is released, not only does the motor drive stop, but all relays are restored to their normal conditions, as will become apparent after further reading. The holding circuit for relay K6 will have been broken by release of relay K5 and opening of its contacts 4 and 5, and relay K6 will also have been released and has become restored to its preset condition.

The closure of relay K7, besides effecting energization of relay K8, also applies 20 volt DC+ to the emitters of transistors Q2 to Q8, via closed contacts 4, 5 of relay K6 and contacts 7, 8 of relay K8. Pairs of lamps LP2 and LP2a cooperate with photocell PC2 in effecting the flood lighting, light transmission test on a bill. Lamp LP3 tests one longitudinal end portion of the bill, and the machine will accept a bill only if companion photocell PC3 is not well illuminated. Lamp LP4 tests the opposite longitudinal end portion of the bill, and the machine will accept a bill only if there is sufficient light transmission through the bill so as to sufficiently illuminate photocell PC4.

Pairs of lamps LP5, LP5a; LP6, LP6a; LP7, LP7a and LP8, LP8a, or any other desired number of such lamps, are strategically located in inner plate 202 to attempt to transmit light through selected areas of a bill, or the like, the perforations in the arcuate plate 174 and the photocells numbered correspondingly to the lamps being then in optical alignment. The bill or the like will then be accepted or rejected by the machine. Also the denomination of the bill will be determined under control of certain of these lamps and photocells, as is herein described.

The collector of transistor Q2 is directly connected with the negative leg of the 20 volt DC line. The base of the transistor is tapped between one terminal of the photocell Q2 and a potentiometer RQ2, the series connected photocell and potentiometer being across the 20 volt DC line. A series connected limiting resistor to limit the current flow to the emitter of transistor Q2 and potentiometer RQ2a to vary the bias on the base of cascaded transistor AQ2 is provided, as shown.

In the collector circuit of transistor Q2a there is provided relay K12 which, when energized, will establish a circuit for the energizing coil of reject relay K12, current then flowing from the negative terminal of a 117 volt DC line via now the closed contacts of K12 to the negative terminal of the energizing coil of the master reject relay K13, and thence to the positive terminal of the coil to the positive terminal of the 117 volt DC supply.

Thus, if too much light be transmitted through the bill, indicating a spurious document, the relay K13, normally in an unenergized condition, is operated to close its contacts 13, 14, so that the bill or other document is automatically rejected by reject solenoid 266, see FIG. 5, the opposite connection of which is to line L2, the solenoid operating on the oscillatable plate 262. The relay K13 is held locked in by closure of its contacts 1 and 2, current flowing via contacts 8 and 7 of relay K4. This solenoid is fed with 117 volt AC current, when K13 is energized via contacts 14 and 15 of K13 and line 299.

Also, as previously discussed, during the dwell period of the test drum and motor, a test is made of the end to end positioning of a bill on the drum. A bill to be accepted by the machine as being genuine must transmit little light onto photocell PC3 and much light onto photocell PC4. A wrong amount of light is indicative either of a spurious bill, or other document, or of a bill with its portrait placed in the machine with the portrait inverted or of other possible errors.

If very little light strikes PC3, the base of transistor Q3 is insufficiently negative, and the relay K14 associated with it does not close its contacts.

The base of transistor Q3, as well as the bases of transistors Q4 to Q8, are fed by voltages from a tap in a voltage divider, for each one part there being an associated photocell and for another part there being a potentiometer. As a further precaution capacitors such as CQ3, CQ4, etc. are provided to bypass spurious signals or spikes which might cause improper conduction of the transistors.

For a document or a bill to be accepted, therefore, PC3 must not be well illuminated, wherefore K14 will not close its contacts. Thus, no current is transmitted to reject relay K13. On the other hand, if PC4 is not well illuminated, relay K15 does not operate and a relay K16, whose function will be described, is not operated.

If there is sufficient illumination on photocell PC4, relay K15 is operated, sending current via its relay contacts to the negative coil terminal of relay K16, the positive terminal of that coil being connected to the plus bus of the 117 volt DC line. When relay K16 is energized, 117 volt DC negative potential is applied via contacts 5 and 6 of relay K13 and the contacts of relay K16 to terminals 5, 8 and 11 of relay K17 of the group of non-coincidence relays K17 to K20 and to terminal 5 of non-coincidence relay K18.

The purpose of this organization of parts is to selectively permit closure of only one relay of a group of pulse transmitting relays K21 to K24 when a bill or the like is sensed according to the value determinative circuits involving photocells PC5 to PC8a.

When, for example, a one dollar bill is at the dwell or sandwiched position of the test drum, a number of lamps and companion photocells, such as LP5 and PC5 and PC5a located in plates 200 and 202, opposite strategic areas of the bill and apertures in plate 174, determine the conductivity of the associated transistor Q5.

If relay K25 is energized as a result of this test, the one dollar non-coincidence relay K17 is energized, closing its contacts 1 and 2, thus establishing the following circuit to energize pulse transmitting relay K21: from the negative bus of the 117 volt DC line at contact 5 of non-operated reject relay K13 to contact 6 thereof, to contacts 1 and 2 of now operated relay K16 to contact 5 of the non-operated five dollar relay K18, thence to contact 6 thereof, thence to contacts 5 and 6 of the ten dollar non-operated relay K19, contacts 11 and 12 of non-operated twenty dollar relay K20 to contacts 2 and 1 of now operated relay K17 and to the negative terminal of the coil of relay K21, the positive terminal of which is connected to the positive bus of the 117 volt DC supply, it being understood that the values and documents are selected solely to provide a preferred operative embodiment of the invention.

Thus, relay K21 is energized. Since the path to the coil of relay K21 is through contacts of unenergized relays K18, K19 and K20, it will be realized that overlapping sensing, such as erroneous determination that the bill is of two or more denominations, breaks the circuit at one or more of those relays to the pulsing relay K21.

Likewise, by tracing the circuits from relay K26 associated with the five dollar testing lamps and photocells LP6 and LP6a and PC6 and PC6a and associated transistor Q6, it will be found that upon proper illumination of these cells and energization of relay K26, non-coincidence five dollar relay K18 is energized establishing a circuit to the coil of five dollar pulse transmitting relay K22; the circuit being established via closed contacts 5 and 6 of unenergized reject relay K13, the contacts of energized relay K16, contacts 5 and 6 of unenergized relay K17, contacts 9 and 8 of unenergized twenty dollar relay K20, contacts 9 and 8 of ten dollar relay K19 and thence to contacts 2 and 1 of now energized five dollar relay K18 and thence to the negative terminal of the coil of pulse transmitting relay K22 of which the positive terminal is connected to the 117 volt DC positive bus.

Thus, if any of relays K17, K19 or K20 are operated, while relay K18 is operated, it is not possible to energize pulse transmitting relay K22. It will be seen in tracing the above described circuitry that no one of relays K21 to K24 can be operated if more than one of relays K17 to K20 are simultaneously energized. Relays K27 and K28 control relays K19 and K20, respectively. While the system of lamps, photocells and relays are described in conjunction with units of 1, 5, 10 and 20, it is obvious that the system can be extended to embrace other denominations of units, as well as other currencies.

Now, after release of relays K8 and K9 and if the reject relay K13 has not been operated, and upon an energization of one of the value pulse transmitting relays K21 to K24, a circuit is completed from a totalizer, to be described in detail hereinafter, along a common lead 300 to contacts 9 and 8 of relay K8, contacts 5 and 4 of pulse transmitting relay K10, contacts 8 and 9 of non-energized reject relay K13 and thence to the contacts 8 and 7 of the one particular value pulse transmitting relay of the relays K21 to K24 which is energized, and, also, via one of lines 301, 305, 310 or 320 to the totalizer.

Whenever anyone of the value pulse transmitting relays K21 to K24 is energized, a pulse is also transmitted via the 4, 5 contacts of these relays to accept relay K29, energizing the same. When the accept relay is energized, its contacts open, breaking the circuit to the coil of reject relay K13, which circuit was established through contacts 4, 5 of energized relay K30 and contacts 7, 8 of relay K4. Relay K30 has been initially energized via contacts 14 and 15 of relay K7 and contacts 5 and 4 of relay K8, after relay K7 has been energized and released, and while relay K8 was still held closed by its associated RC circuit. Relay K30 is held closed for the entire cycle of operation of the test drum by reason of its holding contacts 1, 2 being in series relation with contacts 7, 8 of relay K4, relay K4 being energized for the complete cycle of operation of the test drum.

Thus, when the accept relay K29 is operated, the reject relay operating circuit is disrupted. If no operation of the value pulse transmitting relays K21 to K24 occurs, the accept relay K29 is not operated, the circuit to reject relay K30 is completed, and is energized, effecting rejection of the document or bill under test. It will be noted that the selected relay of relays K21 to K24 is held locked in for a complete cycle of the test drum, and therefore relay K29 is held energized for the same period, by reason of the number 2 contacts of relays K21 to K24 being connected to contact 7 of relay K4.

In order to take care of the event that a bill should inadvertently or by fraudulent manipulation adhere to the test drum and not be released from the drum by release of the hold down bar, a further test is made on the bill. At about a three-quarter revolution of the drum from its normal rest position there is provided another bill controlled, electric contact member.

For illustrative purposes there is shown an insulative block 288, fixed within the drum to a generally L-shaped support member 288a, fixed to plate 124.

The block supports, in cantilever fashion, a light, resilient metallic spring finger 288b, on the forward end of which finger is a non-conductive shoe 288c, being formed of fiber or a phenolic condensation product, secured to the finger, as by rivets 288d, which are blind on the underside of the finger, or by molding the same thereon.

The finger at its forward end is provided with a pair of laterally extending ears 288e with forwardly presented cam surfaces. The finger is connected by a conductor (not shown) to one end of the energizing coil of the relay K11, the other end of the coil being connected to the positive pole of the 20 volt DC source, the negative pole of which is grounded. Mounted on each side of the aperture 242 in the test drum 102, by means of non-conductive springy fiber supports 288f, is a contact strip 288g, grounded to the drum, as by a strap 288h. The shoe 288c and finger 288b are in alignment with the circle of the drum in which the aperture is located, so that as the drum rotates about three quarters of a revolution, the spring finger will cause the shoe to be forced into the aperture.

In the event of a bill or document adhering to the drum, the light, spring pressed finger comes to a stop with the level of the ears 288e, at a level to make contact with the conductive strips 288g, and completes a circuit to ground, whereby relay K11 is energized. In the absence of a bill on the drum, when the aperture 242 is opposite the finger, the finger moves the shoe further through the aperture, and the contact ears engage the fiber portions 288f, and the relay K11 is not energized. As the drum revolves, the insulating shoe 288b prevents contact of the finger with the drum and cams the shoe, so that the shoe bears against the interior surface of the drum, ready for another test. The inner plate 202 of the sandwich plate is suitably recessed to permit passage of the ears 288e.

When and if the relay K11 is energized, its contacts 5 and 6 separate. Upon separation of these contacts, the remote relay (not shown), connected to line 322, is de-energized, allowing the contacts of the remote relay to move to closed position and close an alarm circuit. Since contacts 2 and 3 of relay K11 are in series in the motor line, the separation of these contacts, effected upon energization of relay K11, causes the disruption of current flow to the motor 122, and the motor stops. After investigation and required adjustment, as by removal of the adhering bill or document, the manual latch of relay K11 may be released by an attendant, allowing the drum to resume its rotation to its normal bill or document receiving position.

When the test drum reaches the position where the fourth switch 236 is operated by cam 230, the lock-in circuit for relay K4 is opened, releasing relay K4. Therefore, the holding circuit contacts 1 and 2 separate. Contacts 4 and 5 separate, allowing relay K5 to release; contacts 7 and 8 separate, releasing that value pulse transmitting relay of relays K21 to K24 which may have been operated, and contacts 10, 11 open to break the circuit to the motor 122. The opening of contacts 7 and 8 also releases the hold circuit of reject relay K13, and it opens, since the other holding circuit for the reject relay, if it had been made, is also through contacts 7 and 8 of relay K4. By chain reaction, opening of contacts 3, 4 of relay K5 breaks the holding circuit of relay K6, the other relays having already been previously opened.

It should be understood that although the description herein is specifically applied to the testing of United States currency, variations may be made in the positioning of the lamps and photocells in the sandwich plates 200 and 202 and the holes in the plate 174, so that testing of currencies of other United States denominations than those disclosed herein and of selected foreign currencies may be made. Obviously, instead of varying the positions of the testing devices in the sandwich plates and aperture plate 174, there may be utilized substitute sandwich plates and aperture plate 174, one set for each for any selected denomination of currency or other document.

Also, it should be obvious that though the photocells and lamps are located as shown and described, the photocells and associated lamps may be placed in pairs in either of the sandwich plates 200 and 202, and the photocells and lamps may be heterogeneously mixed as between the two plates.

THE TOTALIZER

The functions of this electro-mechanical device, forming an integral part of the apparatus, particularly if used for currency deposition, and designated herein as the totalizer, are: to accept or receive units or digits in the form of electrical impulses; to maintain a sum or count of these units as they are received; to provide an indicating register for displaying this sum or total; and, desirably, to electrically control a printing register.

The printing mechanism, to be described hereinafter, of the said printing register is so designed as to follow the input pulses of the totalizer and upon activation of the proper circuit to print out the total units on a preprinted form assembly, so as to provide a permanent record of the total units received by the totalizer and, at will, to reset the totalizer and indicator to zero without the imprinting and/or issuing of the preprinted form assembly.

With the totalizer is associated a money receiving unit. The monies or other documents deposited in the machine, and accepted by the machine as being genuine, are deposited in an escrow drum, which is rotated in one direction to accept the monies, the printing mechanism operating to imprint and advance a number of receipts, and both the printing mechanism and the register being reset to zero.

The drum can be rotated in the opposite direction to refund the money, the printing mechanism then being inoperative to imprint and advance the receipts, and the indicating register and printing wheels being reset to zero.

The totalizer illustrated, while it could be adapted to any monetary or other counting system, is here specifically shown as having eight input circuits:

The No. 1 circuit, when activated, counts out five units.
The No. 2 circuit counts out ten units.
The No. 3 circuit counts twenty-five units.
The No. 4 circuit counts fifty units.
The No. 5 circuit counts one-hundred units.
The No. 6 circuit counts five-hundred units.
The No. 7 circuit counts one-thousand units.
The No. 8 circuit counts two-thousand units.

The input circuits may be activated in any order desired. For example: if the No. 1 circuit is activated, the read-out indicator displays five units, and the printing mechanism is set up for five units. Then the No. 3 circuit may be activated and the read-out indicator changes from five units to thirty units. The printing mechanism is then also changed from five units to thirty units.

Next the No. 6 circuit may be activated and the read-out indicator and printing mechanism will then change from thirty units to five-hundred-thirty units. While eight input circuits are disclosed, it is obvious that by providing more circuits as the circuits for inputs of units, threes, sevens and nines, any value can be indicated on the register and on the printing wheels, the units order printing wheels then having designations of 0 to 9 thereon instead of 0 and 5, as will be described.

After these activations any one or more or none of three operations may take place:

(1) An additional input circuit 1 through 8 may be activated, indicating a greater value on both read-out and printing mechanism . . . or;

(2) A circuit may be activated, so that the printing mechanism will print out the accumulated total, the read-out indicator will return to zero and the printing mechanism will also return to zero, or;

(3) A circuit may be activated to reset or return the read-out indicator and the printing mechanism to zero without stamping the total on the preprinted form assembly.

The input circuits of the totalizer may be activated by any type of circuit closure, such as: relay contacts, mechanical switch or transistor switch. In the herein described adaptation of the totalizer to a banking machine, the first four circuits are operated by coins of various denominations and the others by paper currencies of various denominations, these coins and paper currencies being generically called tokens. While the tokens or the like may be those of any chosen country, what is specifically described herein is a system emloying certain tokens of the monetary system employed in the United States.

THE TOTALIZER CIRCUITS

Now referring to FIGS. 14A, 14B and 14C, the power for the totalizer is furnished from a conventional 117 volt AC sixty cycle source, hereafter referred to as ACL1 and ACL2. ACL1 and ACL2 are connected to the input terminals of fuses F1 and F2. The output terminals of fuses F1 and F2 are connected to a conventional full wave bridge rectifier unit with diodes as the rectifying units, the output being filtered, in conventional known manner. The filtered outputs of the bridge rectifier unit through fuses F3 and F4 are the DC positive and DC negative voltages which are used for relay and stepping switch operation. The DC positive potential output from fuse F4 is connected to the terminals of all of the hereinafter described relays, except certain relays designated as K115, K116, K117, K118 and K120, which are AC operated relays. These five relays have ACL2 potential connected to one of their terminals. DC positive potential is connected to one of the terminals of four stepping switch coils, whose function and structure are described hereinafter. The potentials and character of the conductor lines leading to the various relays and to the other parts are indicated in accordance with the legend at the bottom of FIG. 14A.

5 DIGIT INPUT

As pointed out heretofore any of the inputs may be operated first and the order of inputs may be any desired. For convenience of description, the input circuits will be considered in the order of their increasing magnitude.

Therefore, as an example, consider first a five digit input. Starting with the parts in the normal inoperative position shown in the drawings, the momentary circuit closure of switch SW100, which is preferably located in the coin tester 282, and can be activated by operation of a nickel in the coin slot 70, or can be placed in operative position by key operation, a negative potential, through momentarily closed contacts 1 and 2, is placed on the negative terminal of value discriminative relay K100.

The other terminal of relay K100 is connected to the aforedescribed DC positive line, and, therefore, relay K100 operates. DC negative potential is also applied through normally closed contacts 1 and 2 of cam operated switch SW118, see FIG. 14B, to the number 2 and 1 contacts of relay K100 and thus provides a locking path for relay K100, so that when switch SW100 opens, relay K100 is operated under control of said cam operated switch SW118. ACL1 potential, as previously described, is connected through normally closed contacts 2 and 3 of motor control and reset control relay K119, see bottom FIG. 14B, contacts 11 and 12 of value discriminative relay K107, FIG. 14A, contacts 11 and 12 of value discriminative relay K106, contacts 11 and 12 of value discriminative relay K105, contact 11 and 12 of value discriminative relay K104, contacts 11 and 12 of value discriminative relay K103, contacts 14 and 15 of value discriminative relay K102, and contacts 11 and 12 of value discriminative relay K101 to contact 11 of relay K100. Contact 11 of relay K100 is now closed with contact 10 which is connected to one of the terminals of the cam driving motor M100. The other terminal of cam driving motor M100 is connected directly to ACL2. This starts cam driving motor M100, driving six cams C101 to C106 in a clockwise direction, as viewed in FIG. 14B, these cams and the armature of motor M100 all being fixed for conjoint rotation.

5 DIGIT INPUT TO INDICATOR

Upon the first two or three degrees of rotation from the normal position, cam C101 operates switches SW108 and SW109. DC negative potential is now applied through normally closed contacts 5 and 6 of a relay K122, FIG. 14C, through closed contacts 2 and 3 of switch SW108 to the negative terminal of lock up control relay K124 and operates relay K124, since the other terminal of relay K124 is connected to DC positive. Relay K124 controls the locking-up of stepping switch, controlled relays K125, K127, K129, after, and if they have been operated. Closed contacts 2 and 3 of switch SW109 place DC negative potential on contact 5 of each of the repeat operation control relays K126, K128 and K130. Relay K124 has DC negative potential connected to its movable contact 2, 5 and 8. Closing of contacts 1 and 2 of relay K124 connects DC negative potential to holding contact 2 of relay K125. Closed contacts 4 and 5 of relay K124 connect DC negative potential to holding contact 2 of relay K127. Closed contacts 7 and 8 of relay K124 connect DC negative potential to holding contact 2 of relay K129.

After the preferred 3 to 5 degress of cam rotation, cam C106 operates switch SW119. DC negative potential is applied through closed contacts 2 and 3 of switch SW119 to the negative terminal of master accept relay K108, the other terminal of which is connected to DC positive, and master accept relay K108 operates.

DC negative potential applied through now closed contacts 1 and 2 of relay K108 to the negative terminal of relay K108 from normally closed contacts 8 and 9 of resetting relay K123, FIG. 14C, provides a locking path for relay K108. Contacts 4 and 5 of relay K108 provide an operating path for accept switch 50 which switch, when actuated, operates accept relay K115. When cam wheel C106 has rotated, desirably, approximately 190 degrees, it operates switch SW120. DC negative potential is then applied through closed contacts 2 and 3 of switch SW120 and through closed contacts 5 and 4 of the 5¢ value discriminating relay K100 to the negative terminal of the coil 401 and the associated armature of stepping switch SSW1. Stepping switch SSW1 therefore steps one position.

Each of the stepping switches is of a conventional type, comprising banks of switches, including banks and associated wipers, movable step by step by energization of an electromagnetic coil and armature circuit breaker to pulse once for each energization of the coil of the electromagnet. A ratchet mechanism steps the wipers along always in one direction, and in the zero position of the wipers a switch termed an off-normal switch is opened by a cam rotating with the shaft carrying the wipers.

This stepping of the switch moves wipers 401A, 401B and 401C from contacts 10 to contacts 1 on switch banks 401D, 401E and 401F, and the cam on the shaft of the wipers allows normally biased off-normal switch 401G to close. The function of switch 401G will be described later. Contacts 1 through 9 on switch bank 401D are all strapped to a common conductor, for resetting the switch bank, which is as explained hereinafter. Switch wiper 401B moves from contact 10 to contact 1, reversed from its previous position on switch bank 401E. This directs DC negative potential through wiper 401B and contact 1 to the negative terminal of relay K129 and operates relay K129, as will be understood. Switch wiper 401C is connected to the X lead at the right of FIG. 14C, which connects to one side of the secondary winding of the transformer T10 at the bottom of FIG. 14A. Switch wiper 401C upon the initial energization of coil 401 closes with contact 1 of switch bank 401F. Contact 1 is connected to the 5 digit light on read-out indicator 401H. The opposite side of the 5 digit light is connected directly on the Y lead to the other side of the secondary winding of transformer T10. Therefore the character 5 on the units order read-out indicator will be illuminated.

5 UNIT INPUT TO PRINTING WHEEL

As the cam assembly continues to rotate, cam C104 operates switch SW112. Therefore, DC negative potential is applied through closed contacts 2 and 3 of switch SW112, through closed contacts 8 and 7 of relay K100 to the negative terminal of print wheel drive control relay K111, and relay K111 operates. DC negative potential is applied through closed contacts 2 and 3 of switch 505 through closed contacts 2 and 1 of relay K111 to the negative terminal of relay K111. This provides a locking path for relay K111. ACL1 potential, applied through closed contacts 4 and 5 of relay K111 to one of the terminals of motor 500, starts motor 500, which turns cams 501 and 504. Motor 500 and cams 501 and 504 are all parts of the printing mechanism and are located external of the totalizer control unit. Switches 506 and 507, their normal inoperative position being as shown, utilized during resetting of the printing wheels, have operated but have no function at this time.

The printing mechanism motor 500 drives cams 501 and 504 until switch 505 momentarily opens by switch arm engagement with and by coasting beyond one of the pins. This opens the locking path for relay K111, and relay K111 releases. A digit 5, therefore, appears on the stamping wheel driven by the motor 500, and which wheel is in the printing mechanism.

As cam wheel C106 continues to rotate, cam operated switch SW118 opens. The opening of switch SW118 opens the locking path for relay K100, and relay K100 releases. When relay K100 releases, contacts 10 and 11 thereof open one operating path for motor M100. However, motor M100 continues to operate, now being under control of cam operated switch SW117. ACL1 potential is applied through normally closed contacts 2 and 3 of motor and reset control relay K119 and is applied to the conductor running to the right upwardly on FIG. 14B through closed contacts 2 and 3 of cam operated switch SW117 to one of the terminals of motor M100, and the motor continues to run until the cam assembly has made one complete revolution from the initial starting point. At this point switch SW117 functions to open the ACL1 lead to motor M100 and the motor stops. Switch SW108 simultaneously opens the conductive path for lock up control relay K124 and relay K124 releases.

As of this time, on a five unit input operation, relay K100 has operated and released, cam motor M100 and the associated cam assembly has made one revolution and has stopped. Stepping switch SSW1 has moved one position, where it remains until the next operation. Off-normal or normally open switch 401G is closed. Relay K111 has operated and released. Motor 500 and associated cam and stamping wheels have moved one position and stopped. Relays K108 and K129 are still operated. Read-out indicator 401H displays 5 units. On the initial 5 unit input, cam operated switches SW110, SW113, SW114, SW115 and SW116 have no function.

10 UNIT INPUT

As stated before and as will be seen later, the inputs can be operated in any order. Considering the next operation, the 10 unit input can be actuated, as by insertion of a dime in the slot 70, and the following takes place:

DC negative potential is applied through momentarily closed contacts 1 and 2 of switch SW101, which can be in the coin tester 282, to the negative terminal relay K101, and relay K101 operates. DC negative potential is applied through contacts 1 and 2 of relay K101 to the negative terminal of relay K101 and provides a locking path for relay K101. Contacts 10 and 11 of this same relay close the path for the ACL1 lead to one of the terminals of motor M100, and the motor starts.

10 UNIT INPUT TO INDICATOR

When cam wheel C106 operates switch SW120, a DC negative pulse is transmitted through contacts 2 and 3 of switch SW120, through closed contacts 5 and 4 of relay K101, to the negative terminal of the coil 402 and to the armature associated with stepping switch SSW2. This steps switch SSW2 one position, moving wipers 402A, 402B and 402C from contacts 10 to contacts 1 on switch banks 402D, 402E and 402F. Off-normal switch 402G is closed by the switch arms moving away from their zero positions. A circuit is now complete from the X lead from transformer T10 through switch wiper 402F and contact 1 of switch bank 402F, through the No. 1 lamp on the tens order read-out indicator 402H to the Y lead of transformer T10. This causes illumination of the 1 digit lamp on the tens order read-out indicator.

10 UNIT INPUT TO PRINTER

When cam wheel C104 operates switch SW112, a DC negative pulse is transmitted through contacts 2 and 3 of switch SW112, through contacts 7 and 8 of relay K101 to the negative terminal of print wheel drive control relay K112, and relay K112 operates. Contacts 1 and 2 of relay K112 provide a locking path for relay K112 through contacts 2 and 3 of switch 511, see FIG. 18, to DC negative. ACL1, through closed contacts 4 and 5 of relay K112 to one of the terminals of motor 508, see FIGS. 15, 16, 18, 19 and 26, starts motor 508. Motor 508 drives cam wheels 509 and 510 until switch 511 opens. Upon such opening, contacts 2 and 3 of switch 511 open the locking path for relay K112, and relay K112 releases.

Resetting cam operated switches 512 and 513 are simultaneously operated during the above described cycle, but have no function at this time. As explained before in conjunction with the stepping of switch SSW1, stepping switch SSW2 has pulsed one step, placing switch wipers 402A, 402B and 402C on contact 1 of switch banks 402D, 402E and 402F, respectively. Off-normal switch 402G is closed. Switch wiper 402A, switch bank 402D and off-normal switch 402G are to be used for resetting purposes and have no function at this time. DC negative potential is applied through switch wiper 402B and contact 1 of switch 402E to the negative terminal of stepping switch controlled relay K127 and operates relay K127. Relay K127 has no function at this time.

The main cam assembly continues to rotate, while cam wheel C106 holds switch SW118 closed. Contacts 1 and 2 of switch SW118, when momentarily opened by the low point in cam wheel C106, opens the locking path to value discriminative relay K101, and relay K101 releases. The cam assembly, however, continues to rotate, as explained before, until the high part of cam C105 opens switch SW117. Contacts 2 and 3 of switch SW117 open the ACL1 path to motor M100 and the motor stops.

Up to this point there has been a 5 unit input and a 10 unit input. Discrimination relays K100 and K101 have operated and released. Motor M100 and the associated cam assembly have made two complete revolutions. Print wheel drive control relays K111 and K112 have operated and released. Motor 500 and its associated cam wheels have moved one position, placing a digit 5 on the units order stamping wheel in the stamping position. Motor 508 and its associated cam wheels have moved one position placing a digit 1 on the tens order stamping wheel in the stamping position. Stepping switch SSW1 has pulsed one time placing its associated wipers on the No. 1 contacts of their associated banks.

The 5 digit lamp is illuminated on the units order read-out indicator 401H. Stepping switch SSW2 has pulsed one time, placing its associated wipers on the No. 1 contacts of their associated banks. The 1 digit lamp is illuminated on the tens order read-out indicator 402H. Off-normal switches 401G and 402G are closed. Master accept relay K108, stepping switch controlled relay K127 and repeat operation control relay K129 have operated and are locked in. The read-out indicator displays 15 units and the printing mechanism also has been set up for printing 15 units. The totalizer unit is now ready for the next incremental input value.

25 UNIT INPUT TO INDICATOR AND PRINTER

As stated before, to this point 15 units have been stored in the totalizer. If, for example, the next operation is to be a 25 unit input, such as a 25¢ piece inserted in slot 70, the following takes place.

DC negative potential is applied through contacts 1 and 2 of switch SW102 in the testing and value determining device 282 to the negative terminal of discrimination relay K102 and operates relay K102. The negative terminal of relay K102 is connected to the negative terminal of relay K110. Therefore, relay K110 also operates. DC negative potential is applied through closed contacts 2 and 1 of cam operated switch SW118, through closed contacts 2 and 1 of relay K102, through normally closed contacts 2 and 3 of relay K109, to the negative terminals of relays K110 and K102, providing a locking path for relays K110 and K102. Relays K102, and K110 release, when, through the cycling of cam C106, switch SW118 opens. ACL1 potential applied through closed contacts 14 and 13 of relay K102 to one of the terminals of motor M100 starts motor M100.

UNITS ORDER INDICATOR AND PRINTER WHEEL ADVANCE

When relay K102 is energized, DC negative potential flows through contacts 2 and 3 of cam operated switch SW120, and through contacts 5 and 4 of relay K102 to the negative terminal of coil 401 of stepping switch SSW1, stepping it forward one step. When stepping switch SSW1 is stepping one additional position, the following take place: switch wiper 401A moves from the No. 1 contact to the No. 2 contact on switch bank 401D. As switch bank 401D is used for resetting, it still has no function at this time. Switch wiper 401B moves from contact No. 1 to contact No. 2 on switch bank 401E and current flows through closed contacts 5 and 4 of relay K129 to the negative terminal of repeat operation controlling relay K130, operating relay K130. Switch wiper 401C moves from the No. 1 contact to the No. 2 contact on switch bank 401F. This No. 2 contact is strapped to energize the zero digit on indicator 401H.

As motor M100 rotates, cam wheel C104 operates cam operated switch SW112. DC negative potential, now, as before, is applied through contacts 2 and 3 of switch SW112, through contacts 11 and 10 of discriminative relay K102 to the negative terminal of print wheel drive control relay K111, and operates relay K111. Contacts 1 and 2 of relay K111 and contacts 3 and 2 of switch 505 provide a locking path for relay K111. ACL1 potential, applied through closed contacts 5 and 4 of relay K111 to one of the terminals of motor 500, starts motor 500.

Motor 500 drives cam wheels 501 and 504 one step. Switch 505 opens its contacts 2 and 3, which in turn opens the locking path for relay K111, and it releases, and, therefore, contacts 4 and 5 of relay K111 open. This opens the line ACL1 for motor 500 and the motor stops. Since the stamping wheel only has "0" and "5" digits thereon in alternation, the last action of motor 500 has placed the zero digit on the units stamping wheel in the stamping position.

TENS ORDER INDICATOR AND PRINTING WHEEL ADVANCE

It will be remembered that when relay K102 is energized, a shunt conductor simultaneously energizes relay K110. Cam wheel C105 operates cam switches SW115 and SW116 in sequence. These switches are connected in parallel, resulting in a two pulse output. DC negative potential is applied through the contacts 2 and 3 of switch SW115 and contacts 2 and 3 of which SW116 in the form of two pulses, and through now closed contacts 2 and 1 of relay K110 directly to the negative terminal of coil 402 and the armature associated with stepping switch SSW2 and pulses stepping switch SSW2 two steps. This moves switch wipers 402A, 402B and 402C two steps. When stepping switch SSW2 pulses two times, its switch wipers move from contacts 1 to contacts 3 of switch banks 402D, 402E and 402F. Switch wiper 402A and bank 402D are for resetting and have no function at this time.

Contacts 1 through 9 on switch bank 402E are strapped to a common conductor, so that when switch wiper 402B moves two positions from contact 1 to contact 3, the DC negative potential is applied through wiper 402B and contact 3 of bank 402E and is applied to the negative terminal of stepping switch, controlled relay K127, holds relay K127 operated. Switch wiper 402C moves two positions to contact 3 on switch bank 402F, so that this will illuminate the 3 digit lamp on the tens order read-out indicator 402H.

At this time cam wheel C104 also pulses cam switches SW113 and SW114 in sequence. This also applies, through contacts 2 and 3 of switch SW113 and contacts 2 and 3 of switch SW114, a two pulse DC negative potential through closed contacts 8 and 7 of relay K102 to the negative terminal of print wheel drive control relay K112. Relay K112 operates and releases, then re-operates and releases. This repeated closing of contacts 5 and 4 of relay K112 repeatedly places ACL1 potential on one of the terminals of motor 508. This advances cam wheels 509 and 510 two positions, advancing the tens order stamping wheel two steps beyond the digit 1 position, thus placing the digit 3 on the tens order stamping wheel in the stamping position, two steps beyond the digit 1 position.

ADDED ADJUSTMENT STEP TO TENS ORDER

The total inputs to the totalizer thus far have been shown as a 5 unit input, a 10 unit input, and a 25 unit input, which makes a total of 40 units. However, to this time, the printing mechanism and the read-out indicator indicate only 30 units. In order for the printing mechanism of the printing register and the read-out indicator of the indicating register to display the proper reading of 40, the following takes place: it is noted that cam operated switches SW108 and SW109 are closed for approximately 355 degrees of cam rotation and that a DC negative potential is applied through switch SW109 so as to be placed on the number 5 contacts of repeat operation control relays K126, K128 and K130 for 355 degrees of cam rotation. Relay K124 is operated by closure of switch SW108 and through operation of relay K124, relays K125, K127 and K129 operate.

Therefore, when relay K130 operates, via contacts 5 and 4 of relay K129, which occurs only when switch wiper 401B is on an even numbered contact 2, 4, 6, 8 or 10, the DC negative potential, via switch SW109, is applied through contacts 5 and 4 of relay K130 to the negative terminal of value discriminative relay K101, so that relay K101 operates. As relay K101 operates, the same functions take place as stated under the 10 unit input operation. The tens order stamping wheel and associated cam assembly move one step; stepping switch SSW2 also steps one position. This places a digit 4 on the tens order read-out indicator, and the tens order stamping wheel. The relay K101 releases. The indicator now properly gives a total of 40 units.

As a result of these operations, relays K108 and K127 are operated. Stepping switch SSW1 is on the No. 2 position; stepping switch SSW2 is on the No. 4 position, and off-normal or normally open switches 401G and 402G are now closed.

50 UNIT INPUT TO INDICATOR AND PRINTER

Let it be assumed that the next operation is a 50 unit input. When switch SW103 is closed, as by coin insertion into the banking machine, DC negative potential is applied through closed contacts 1 and 2 of switch SW103 to the negative terminal of value discriminative relay K103, and relay K103 operates. DC negative potential is applied, through closed contacts 1 and 2 of cam operated switch SW118 and through closed contacts 1 and 2 of relay K103, to the negative terminal of relay K103; providing a locking path for relay K103. ACL1 potential applied through closed contacts 10 and 11 of relay K103 to one of the terminals of motor M100 starts motor M100.

Cam wheel C102 operates and releases switch SW110 five times during one operational revolution. Pulsating DC negative potential is applied through contacts 2 and 3 of switch SW110, through contacts 5 and 4 of relay K103, to the negative terminal of coil 402, and the armature associated with stepping switch SSW2 pulses stepping switch SSW2 five times. Cam wheel C103 also operates and releases switch SW111 five times during the one similar revolution.

Pulsating DC negative potential applied through contacts 2 and 3 of switch SW111 and through closed contacts 8 and 7 of relay K103 to the negative terminal of print wheel drive control relay K112 operates and releases relay K112 five times during the said one revolution of the cam assembly.

Relay K112 in operating and releasing under control of cam operated switches SW111 and 511 operates and releases motor 508 and its associated cam assembly, until 5 additional digits on the tens order stamping wheel are placed in the stamping position, which now indicates the digit 9. The operation of the switches SW111 and 511 are in alternation, because of the preselected location of the recesses in cam C103 and of the pins on the cam wheel 509.

When stepping switch SSW2 steps 5 additional times the following takes place: switch wiper 402A and contact bank 402D still have no function at this time. Switch wiper 402B moves from No. 4 contact to No. 9 contact on bank 402E. This insures holding relay K127 operated. Switch wiper 402C moves from contact 4 to contact 9 of bank 402F. This illuminates the 9 digit lamp on the tens order read-out indicator 402H. Cam wheel C106 then momentarily opens switch SW118, thereby effecting release of relay K103.

As before, motor M100 continues to operate until switch SW117 opens the ACL1 potential to the motor, and then the motor stops. Cam operated switches SW112, SW113, SW114, SW115, SW116 and SW120 have had no function during this operation. The printing mechanism now has a zero on the units order wheel, and a 9 on the tens order wheel in the stamping position to indicate a total of 90 digits.

The units order read-out indicator displays a zero and the tens order read-out indicator displays a 9, giving a total of 90 digits. Relays K108 and K127 are still operated. All other relays are released.

Switches SW100 to SW103 can be momentarily closed, as indicated previously, by any of various means and, as stated before, can be the switches closed by the passage of coins accepted by the banking machine.

CARRY OVER FOR INDICATOR

To illustrate how the totalizer carries over from the tens to the hundreds order, the next operation to be described is a 10 digit input.

As before, when DC negative potential is applied through contacts 1 and 2 of switch SW101 to the negative terminal of relay K101, relay K101 operates. Due to the closure of contacts 11 and 10 of energized relay K101, motor M100 and the associated cam assembly operates as before. DC negative potential is applied through contacts 2 and 3 of switch SW120 and contacts 5 and 4 of relay K101 to the coil 402 and armature associated with stepping switch SSW2. As heretofore explained, this will pulse, or step, switch SSW2 one time, moving switch wipers 402A, 402B and 402C from contacts 9 to contacts 10 of banks 402D, 402E and 402F.

As stepping switch SSW2 moves its wipers from contact 9 to 10 on banks 402D, 402E and 402F the following events take place:

As before, wiper 402A and contact bank 402D have no function at this time. DC negative potential is applied through wiper 402B and contact 10 of bank 402E and through closed contacts 5 and 4 of relay K127 to the negative terminal of repeat operation control relay K128, and relay K128 operates. DC negative potential, via switch SW109, and applied through closed contacts 5 and 4 of relay K128 to the negative terminal of value discriminative relay K104, operates relay K104, the relay being locked up and subsequently released via cam operated switch SW118 and the relay holding contacts 1 and 2. Again, ACL1 potential, applied through closed contacts 11 and 10 of relay K104 to one of the terminals of motor M100, starts motor M100 and its associated cam assembly for an additional revolution.

DC negative potential is applied through contacts 2 and 3 of cam operated switch SW120, and through closed contacts 5 and 4 of relay K104 to the negative terminal of coil 403 and armature associated with stepping switch SSW3, pulsing SSW3 one time. When stepping switch SSW3 pulses once, switch wipers 403A, 403B and 403C move from contacts 10 to contacts 1 on switch contact banks 403D, 403E and 403F. Off-normal switch 403G closes, but has no function at this time. Switch wiper 403A and bank 403D are used for resetting and have no function at this time.

DC negative potential is applied through switch wiper 403B and contact 1 on bank 403E to the negative terminal of stepping switch controlled relay K125 and relay K125 operates. Potential from one side of transformer T10 on the X lead, as shown on FIG. 14A at the lower left-hand corner of FIG. 14A and at the lower right-hand corner of FIG. 14C, through switch wiper 403C and contact 1 on bank 403F through the 1 digit lamp on the hundreds order read-out indicator 403H to the other side of transformer T10 via the Y lead, illuminates the 1 digit lamp. The read-out indicator 403H now displays 100 units.

PRINTING CARRY OVER

At the time that the motor M100 makes its first revolution, rotation of cam C104 causes negative potential through contacts 2 and 3 of switch SW112, and through contacts 8 and 7 of relay K101 to be applied to the negative terminal of print wheel drive control relay K112, and relay K112 operates. As relay K112 operates, it again operates motor 508. This advances the cam wheels 509 and 510 one position, and places the zero on the tens order stamping wheel in stamping position.

The stepping of switch wiper 402B to contact 10 of bank 402E has energized relay K128, via closed contacts 5 and 4 of relay K127. The closure of contacts 5 and 4 of relay K128 energizes the next higher order responsive relay K104 (here illustrated as the $1.00 relay). Now that the relay K104 is energized, DC negative potential is applied through contacts 2 and 3 of cam operated switch SW112 and through closed contacts 8 and 7 of relay K104 to the negative terminal of print wheel drive control relay K113 to operate relay K113. DC negative potential is applied through contacts 2 and 3 of switch SW112 and through contacts 2 and 1 and the negative terminal of relay K113, and provides a locking path for relay K113.

ACL1 potential is applied through closed contacts 5 and 4 of relay K113 to one of the terminals of motor 514, which operates motor 514. Motor 514 drives cams 515 and 516 one position, and a digit 1 on the hundreds order stamping wheel is placed in the stamping position. As before, after motor M100 and the associated cam assembly have made one revolution, they will stop due to the release of relay K104, controlled by switch SW118, and the opening of switch SW117.

Up to this time one hundred units have been fed into the various inputs of the totalizer. The stepping switch SSW1 is on the No. 2 position; switch SSW2 is on the number 10 position, and switch SSW3 is on the number 1 position. Off-normal switches 401G, 402G and 403G are closed. The read-out indicator displays 100 units. The printing mechanism has 100 units placed in the stamping position. Relays K108 and K125 are operated.

100 DIGIT INPUT

Closure of switch SW104 or reception of a pulse transmitted from the document or currencies acceptance portion of the depositing banking machine, via line 301, energizes relay K104 and, thus, the sequence of events is the same as previously described with respect to events following the energization of relay K104, insofar as operations of the indicator and printer are concerned. That is, similar occurrences take place when the 100 digit input circuit is actuated by closure of switch SW104, as those which have occurred when the relay K104 was actuated during the carry over. Stepping switches SSW1 and SSW2 do remain in the same positions, as do also the units order and tens order stamping wheels. Only the switch wipers on stepping switches SSW3 have moved from contact 1 to contact 2 on their respective banks and the hundreds order stamping wheel has changed from 1 to 2.

The 2 digit lamp on the hundreds order read-out indicator now displays 2 and the read-out indicator displays 200 units.

The printing mechanism is now set up to stamp out 200 units.

500 DIGIT INPUT

Now, should the 500 digit input circuit be actuated, the following takes place:

DC negative potential is applied through closed contacts 1 and 2 of switch SW105 or via line 305 from the banking depositing machine to the negative terminal of relay K105 and operates relay K105. Relay K105 locks up through its own contacts 1 and 2, and contacts 1 and 2 of cam operated switch SW118. ACL1 potential is applied through contacts 10 and 11 of relay K105 to one of the terminals of motor M100, and starts motor M100.

DC negative potential, which is pulsed five times through contacts 2 and 3 of cam operated switch SW110 through closed contacts 5 and 4 of relay K105 to the negative terminal of coil 403 and armature on stepping switch SSW3, pulse switch SSW3 five times. This moves switch wipers 403A, 403B and 403C from contacts 2 to contacts 7 on switch banks 403D, 403E and 403F.

The read-out indicator, therefore, now displays 700 units.

At this same time, the DC negative potential through contacts 2 and 3 of cam operated switch SW111, also pulses five times, through closed contacts 8 and 7 of relay K105 to the negative terminal of print wheel drive control relay K113; and relay K113 operates and releases five times. This moves the hundreds order stamping wheel from the number 2 position to the number 7 position.

The stamping mechanism is now in position to stamp 700 units.

1000 AND 2000 DIGIT INPUT

The 1000 digit input functions primarily in a manner which is substantially the same as those stated for the other inputs. Operating switch SW106, or a pulse via line 310 from the banking or acceptance portion of the banking depositing machine, operates relay K106. A single pulse through cam operated switch SW120 and relay contacts 5 and 4 of relay K106 and applied to the negative terminal of coil 404 on stepping switch SSW4, pulses switch SSW4 one time. Switch wiper 404A and bank 404D have no function at this time.

Switch wiper 404C moves from contact 11 to contact 1 on contact bank 404F. This illuminates the 1 digit lamp on the thousands order indicator 404H. Through the functioning of cam C104, switch SW112, and contacts 8 and 7 of relay K106, relay K114 energizes with consequent operation of motor 520 and advancement of the thousand order printing wheel.

The two-thousand digit input circuit functions in a manner similar to the 1000 digit input.

A DC negative potential pulse is applied through contacts 1 and 2 of switch SW107 or via line 320 from the banking or acceptance portion of the banking depositing machine, to the negative terminal of relay K107, which operates relay K107. ACL1 potential from normally closed contacts 2 and 3 of relay K119, is applied through contacts 11 and 10 of relay K107 to one of the terminals of motor M100, which starts motor M100 and the associated cam assembly.

This DC negative potential through cam operated switches SW115 and SW116, and through contacts 5 and 4 of relay K107 to the negative coil terminal of the coil 404 and associated armature on stepping switch SSW4 pulses switch SSW4 two times.

This moves switch wipers 404A, 404B and 404C from contacts 1 to contacts 3 on switch banks 404D, 404E and 404F and closes normally open, off-normal switch 404G. Switch wiper 404C and contact 3 on bank 404F, which is connected to the 3 digit lamp on the thousands order read-out indicator 404H, closes the circuit to illuminate the 3 digit lamp. The printer motor 520 operates twice, since the line from contact 8 on relay K107 is connected to the paralleled pulsing switching SW113 and SW114, contact 7 of relay K107 being connected to relay K114. This operation of relay K114 allows the motor to be energized, twice, and advances the 1000 order printer wheel two steps.

On switch bank 404E contacts 1 through 9 and 11 are connected together. These contacts are connected to the zero lamp on the ten thousands order read-out indicator 405H. Contact 10 of switch bank 404E is connected to the 1 digit lamp on the ten thousands order read-out indicator 405H. Thus, when a value in excess of 9995 enters into the indicators, the wiper 404B advances to contact 10 on the switch bank 404E and the 1 digit lamp on the ten thousands order are illuminated. Simultaneously, a printer segment 530 advances from a zero to a one digit position as follows:

Connected in series relation with contact 10 on switch bank 404E and the voltage AC line Y is a coil 532, which when energized, causes its plunger 534 to pivot the segment 530 about a pivot shaft 1113, from a zero printing position to a unit digit printing position against the action of a biasing spring 536. As the wiper 404B moves away from contact 10, the spring restores the segment to zero printing position.

While the above system has been described in connection with the receipt of coins of the value of 5¢, 10¢, 25¢ and 50¢, it is obvious that pennies may also be accepted by the machine by a slight modification thereof. Thus, an additional switch, such as switch SW120, adapted to be closed by passage of a penny can be furnished and associated with a relay, such as K220. When switch SW120 is closed, if the penny operated switch has been operated and the corresponding relay energized and locked up, a corresponding indicator and print wheel mechanism can be operated, these being similar to the stepping switch indicator and printer mechanism shown.

Likewise, while only mechanisms responsive to the sensing of one, five, ten and twenty dollar bills and totalizing and recording thereof are illustrated, other denominations may likewise be totalized and recorded, in accordance with the teaching of this invention.

Thus, for example, the described repeat mechanism can be employed to indicate and record the insertion of a twenty-five cent piece can be employed to double the reading in the 100 unit indicator, when a two-dollar bill is sensed, and, thus, can operate a switch and associated relay, much like the relay K101 is twice operated. In this case the repeat operation relay mechanism operates to repeat the operation of relay K104. Also, it is apparent that higher denominations of currency than twenty dollars can be detected and otherwise sensed by suitable doubling or quintupling operations, which are or may be capable of previously described performances by cams as C104 and C105 and cams C102 and C103.

Now that the functionings of individual parts of the circuit have been described, and to demonstrate that coins and paper currencies of various denominations may be totalized by the machine, no matter what the order of insertion of them may be, let it be supposed that the following monies in the order named be deposited in the machine:

1 nickel
    1 $10 bill
    3 $20 bills
    2 quarters
    6 $1 bills
    1 $5 bill
    1 $10 bill
    5 dimes
    1 $20 bill
    1 half dollar When the nickel is inserted into the machine, the switch SW100, FIG. 14A, in the coin acceptance portion of the machine is momentarily closed and relay K100 is energized, closing the circuit to motor M100, FIG. 14B. The nickel input registers on the indicator and sets up on the printing wheel. How this is effected has already been described under the captions "5 Digit Input to Indicator" and "5 Digit Input to Printer."

When the $10 bill is inserted into the machine, due to operation of relay K23, FIG. 13C, a pulse is transmitted via line 310 to relay K106, FIG. 14A, assuming that the bill is genuine. This, upon closing its contacts also starts motor M100. The $10 indication is placed on the indicator and set up in the printer, as described under the caption "1000 and 2000 Digit Input." The indicator now reads $010.05 and the printer wheels are set up to read 010 05. Each time a genuine and correctly inserted $20 bill is accepted by the machine a $20 increment is added to the indicator and steps up the printer, as explained in the caption to which reference has just been made. After the insertion of the first $20 bill, the indicator now reads $030.05 and the printer mechanism steps to read 030 05. When three $20 bills have been inserted, the indicator will have moved successively by pairs of steps of 1000 units to $070.05 and the printer wheels will have moved to a position to imprint on the triplicate receipts the number 070 05.

The said insertion of each of the said two quarters momentarily closes the switch SW102 in the coin testing portion of the machine and energizes the relay K102. The totalizer operates, as described fully under the captions "25 Unit Input to Indicator and Printer," "Units Order Indicator and Printer Wheel Advance," "Tens Order Indicator and Printing Wheel Advance" and "Added Adjustment Step to Tens Order."

The insertion of the first quarter brings the dollar value readings on the indicator and printer wheels to $70.30. It should be noted that when the second quarter is inserted, wiper 401B is moved to an odd contact on contact bank 401E, and that the circuit, via contacts 4 and 5 of relay K129 to relay coil K130, is not completed; therefore, no adjusting step of stepping switch SSW2 is made. Wherefore, the dollar value reading on the indicator and on the printer wheels is $70.55.

As the six $1 bills are inserted in succession into the machine, six successive pulses from relay K21, FIG. 13C, are transmitted to relay K104, operating it six times. Each time it operates a $1 value increment is added to the indicator and printer wheel, as explained under the caption "100 Digit Input." The indicator after the six $1 bills have been inserted reads $076.55 and the printer wheels read 076 55.

As the $5 bill is inserted into the machine, relay K22 energizes, and a pulse is transmitted via line 305 to relay K105. Referring to the portions of the specification under the captions "500 Digit Input," "Carry Over for Indicator" and "Printing Carry Over," it will be understood how the dollar values on the indicator and printing wheels will be brought up to $81.55.

The addition of the next $10 bill causes the totalizer to operate, as explained heretofore, and the dollar value on the indicator, and printer are brought to $91.55.

As the five dimes are inserted in succession into the machine, switch SW101 is closed five successive times, actuating relay K101 five times. Each of the first four times the relay K101 operates, a ten cent increment is added to the indicator and printer wheels, as explained under the caption "10 Unit Input," bringing the dollar values on the indicator and printer wheels to $91.95. The insertion of the fifth dime causes the totalizer to operate as before. However, as switch wiper 402B steps from contact 9 to contact 10, a carry over operation is performed, as described under the captions "Carry Over for Indicator" and "Printing Carry Over," bringing the dollar values on the indicator and printing wheels to $92.05.

The insertion of the next $20 bill operates, as before, except that wiper 404B steps from contact 9 to contact 10, whereupon the circuit to the one unit on indicator 405H is established, the circuit to the zero indication thereon being disrupted and except that solenoid 532 is energized bringing the printing segment 530 from 0 to 1 printing position. After the insertion of the last $20 bill, the dollar value readings on the indicator and printer wheels are $112.05.

The insertion of the last money, namely, the half dollar, pulses switch SW103 and energizes relay K103 whereupon the sequence of events is as described under the caption "50 Unit Input to Indicator and Printer." The dollar value on the indicator and printer wheels now reads $112.55.

The above assumes that all of the monies inserted are genuine and accepted by the machine. If not, the non-accepted coins will have been shunted to the reject receptacle 36. Now, if the operator chooses, he can operate refund button 46 and have the monies returned to him, by reason of the escrow drum, or drums, 250 rotating in a direction to dump its or their contents into receptacle 36, the indicator and the printing wheels and all other parts of the machine being thereby automatically reset; or, he can operate the accept button 50, whereupon the escrow drum or drums rotates in the opposite direction and dumps its contents into drawer 24.

The machine automatically causes the printing mechanism to imprint on triple, or any similar desired number of receipt forms, the date and amount deposited in and accepted by the machine, and retains one of them, duplicate receipts being issued.

The operator retains one of these, writes his identification on the other and deposits the so written on receipt into the machine, in the preferred embodiment described and illustrated herein, through slot 52, whereupon it falls into drawer 24. In the meantime the indicator and printer mechanism, and all other parts of the machine, are automatically reset to zero position, and are ready to accept the next deposit.

PRINTING ON RECEIPT FORMS

This concludes the circuitry for the input circuits. The following is a description of what takes place when it is desired to provide a printed record of the amount totalized on the printing wheels and to issue receipts. For this purpose preprinted forms are provided. It is also possible, as heretofore described, to reset the totalizer indicator and printing mechanism back to zero without imprinting the forms and without issuing receipts, including refund of any monies, or the like.

An example of a stamped form of receipt or the like has already been described and been illustrated in FIG. 12.

As stated before, on the initial operation of an input circuit, and closure of switch contacts 2 and 3 of cam operated switch SW118, master accept relay K108 operates and remains operated through its holding contacts 1 and 2 and normally closed contacts 8 and 9 of resetting relay K123. ACL1 potential, applied through contacts 5 and 4 of relay K108 and through closed contacts 1 and 2 of manually operated normally open accept switch 50 to one of the terminals of relay K115, operates relay K115, the other terminal of relay K115 being connected to ACL2 potential. ACL1 potential through contacts 2 and 3 of stamp limit switch SLS1, and through contacts 1 and 2 of relay K115 to the negative terminal of relay K115 provides a locking path for relay K115. ACL1 potential applied through closed contacts 5 and 4 of relay K115 to the negative terminal of stamp solenoid SS1 operates solenoid SS1. Contacts 8 and 9 of relay K115 are thus open and have no function at this time.

When stamp solenoid SS1 operates fully, it operates stamp limit switch SLS1; contacts 2 and 3 of limit switch SLS1 open and release relay K115. ACL1 potential is applied through closed contacts 5 and 4 of limit switch SLS1 to one of the terminals of relay K116 and operates relay K116.

It is well to repeat at this time that there is preferably located externally of the totalizer the escrow device 250, FIG. 5 (which may be a drum), designated to temporarily retain pre-printed or pre-punched cards or documents or paper currencies or other tokens, such as coins, used to actuate the input circuits of the totalizer.

These tokens are held in this device until such time that a stamped total is desired. When such a stamped total is desired, switch 50, FIGS. 3 and 14B, can be closed by the operator. The tokens are then dumped in a certain direction. Should the stamped total not be desired and a refund of the tokens be desired, then, upon manual operation of another switch, switch 46, the tokens are dumped in an opposite direction. Motors 258 and 259, FIGS. 5A and 14B, drive the escrow drum and the cam 602 fixed for rotation therewith.

ACL1 potential is applied through closed contacts 2 and 3 of cam operated switch 603, movable by the cam 602, which is coupled with and operates with the escrow drum, through closed contacts 2 and 1 of relay K116 to one of the terminals of relay K116, providing a locking path for relay K116. ACL1 potential is applied through closed contacts 2 and 1 of stamp limit switch SLS1 to one of the terminals of relay K117 to operate relay K117.

Motor 610, a limit switch 611, motor 612, cam 613 and switch 614 are all preferably located in the printing mechanism.

RECEIPT FEED AND CUTTER

Motor 610, FIG. 14B, FIGS. 16 to 19 and FIG. 25, drives a sprocket mechanism and chains, which transport the superposed stamped form from the stamping location to a cutting location, at the same time placing superposed unstamped forms in the stamping location. The distance the forms travel is controlled by a limit switch 611, FIGS. 14B and 15, which is actuated by a pin 1058, extending laterally from one of the sprocket driven chains. Motor 612, FIGS. 14B and 24, drives crank drive disc 613, FIGS. 14B and 23, which in turn drives a cutter blade of a form cutter. The cutter operates essentially the same as an ordinary pivoted blade paper cutter. After the cutter mechanism has completed its operation the stamped forms can be withdrawn by the operator from the stamping mechanism.

Up to this stage in the stamping operation, accept relay K115, stamp solenoid SS1, FIGS. 14B and 20, and stamp limit switch SLS1 have operated and released. Relays K116 and K117 are energized. Contacts 5 and 6 of relay K116 are open, but have no function at this time. ACL1 potential is applied through normally closed contacts 2 and 3 of limit switch SLS1 and through closed contacts 7 and 8 of relay K116 to one of the terminals of accept motor 258, FIGS. 5A and 14B, and starts motor 258.

Motor 258 drives cam 602 and the escrow drum in an accept, clockwise direction. Contacts 11 and 12 of relay K116 are open; therefore, the operating circuit to return motor 259 is open. As escrow cam 602 operates switch 603, contacts 1 and 2 close and contacts 2 and 3 open. Contacts 2 and 3 of switch 603 open the locking path for relay K116, and relay K116 releases. ACL1 potential is applied through contacts 2 and 1 of cam switch 603, through normally closed contacts 11 and 12 of relay K120 to one of the terminals of motor 258, and continues to run motor 258 until the operating point on cam 602 passes beyond switch 603. Then contacts 1 and 2 of switch 603 will open in the described example, and motor 258 stops. This effects a 90 degree rotation of the escrow drum.

As relay K117 operates, ACL1 potential is applied through contacts 2 and 3 of the sprocket chain driving limit switch 611, and through contacts 2 and 1 of relay K117 to one of the terminals of relay K117, to provide a locking path for relay K117.

ACL1 potential is applied through contacts 2 and 3 of relay K119, through closed contacts 8 and 7 of relay K117 to one of the terminals of receipt feed motor 610 start motor 610. Motor 610 drives the sprocket chains until the sprocket rotation limit switch 611 operates. Contacts 2 and 3 of switch 611 open the locking path for relay K117 and relay K117 releases. ACL1 potential is applied through momentarily closed contacts 5 and 4 of switch 611 to one of the terminals of cutter control relay K118 and operates relay K118. ACL1 potential is applied through contacts 2 and 1 of switch 611 to one of the terminals of motor 610 and causes motor 610 to continue to operate until the sprocket chain pin 1058 travels beyond the operating point of switch 611. Switch 611 opens and motor 610 stops. ACL1 potential is applied through closed contacts 5 and 6 of switch 611, through closed contacts 4 and 5 of cutter control relay K118 to one of the terminals of cutter motor 612, FIGS. 14B and 24, and starts motor 612. ACL1 potential is applied through contacts 2 and 3 of switch 614 through closed contacts 1 and 2 of relay K118 to one of the terminals of relay K118 and provides a locking path for relay K118. As crank drive disc 613, driven by motor 612, operates switch 614, contacts 2 and 3 of switch 614 open the locking path for relay K118 and relay K118 releases. ACL1 potential is applied through closed contacts 1 and 2 of switch 614 to one of the terminals of motor 612, and causes motor 612 to continue to operate, driving discs 613 beyond the operating point of switch 614. Contacts 1 and 2 of switch 614 open and motor 612 stops.

RESETTING

As relay K117 operates, DC negative potential is applied through closed contacts 5 and 4 of relay K117 to the negative terminal of resetting control relays K121, K122, and K123 operates relays K121, K122 and K123. When relay K123 has operated, the holding path, via relay contacts 8 and 9 to relay K108, is broken, and relay K108 releases. With relay K108 released, the operation of neither accept switch 50 nor return switch 46 is effective, since the leads thereto are open at the relay K108 contacts 4, 5 and 7, 8 respectively.

Resetting control relays K121, K122 and K123 are operated at the same time. Contacts 1 and 2 of relay K122, connected to the negative terminals of relays K121, K122 and K123 provide the locking path for the forementioned relays. Relays K121, K122 and K123 are used for resetting of the totalizer stepping switches SSW1, SSW2, SSW3 and SSW4 and the stamping mechanism.

RESETTING THE PRINTER MECHANISM

Resetting the printer is accomplished in the following manner: assume, that in the stamping mechanism cam operated switches 506–507, 512–513, 518–519 and 524–525 are in their operated position; that is, contacts 1 and 2 of all switches are closed. Also, assume that stepping switches SSW1, SSW2, SSW3 and SSW4 ae in their off-normal position; that is, the switch wipers are on any contact from 1 to 9 except, switch SSW4, which could be on any contact from 1 to 10. Off-normal switches 401G, 402G, 403G and 404G are closed.

ACL1 potential is then applied through normally closed contacts 2 and 3 of relay K119 through the series of normally closed contacts of relay K107, and through contact 12 of relay K100 to contacts 2 and 5 of resetting control relay K121. Since relay K121 is energized, the ACL1 potential is applied through closed contacts 1 and 2 of cam operated switch 506 to one of the terminals of printer motor 500, starting motor 500.

Contacts No. 1 of cam operated switches 507, 513, 519 and 525 are connected together to contact 2 of relay K122. This forms a portion of the locking path for relays K121, K122 and K123. Contacts 2 of cam operated switches 507, 513, 519 and 525 are connected to the DC negative potential source. As cam 504 releases cam operated switch 506, movable with switch 507, contacts 1 and 2 of switch 506 open and motor 500 stops. Contacts 1 and 2 of switch 507 also open, opening one of several parallel locking paths for the three reset relays K121, K122, K123. ACL1 potential, through closed contacts 4 and 5 of relay K121, through closed contacts 2 and 2 of cam operated switch 512 to one of the terminals of motor 508, starts motor 508. As cam 510 releases, switches 512 and 513, and contacts 1 and 2 of switch 512 open, and motor 508 stops. Contacts 1 and 2 of switch 513 open, opening another parallel locking path for the reset relays.

ACL1 potential is applied through contacts 2 and 3 of relay K119, through contacts 2 and 1 of relay K123 and through closed contacts 1 and 2 of cam switch 518, to one of the terminals of motor 514, starting motor 514. As cam 516 releases switches 518 and 519, contacts 1 and 2 of switch 519 open, opening another parallel locking path for the reset relays. As cam 516 releases switches 518, 519, contacts 1 and 2 of switch 518 open and motor 514 stops. ACL1 potential is applied through contacts 4 and 5 of relay K123, through contacts 1 and 2 of cam switch 524 and to one of the terminals of motor 520, starting motor 520. As cam 522 releases switches 524, 525, contacts 1 and 2 of switch 524 open, and motor 520 stops. Contacts 1 and 2 of switch 525 open, opening still another parallel locking path for the reset relays. There are still four other locking paths in parallel with those just described, involving paralleled off-normal switches 401G, 402G, 403G and 404G, associated with the stepping switches.

SWITCH BANK AND INDICATOR RESETTING

DC negative poential is connected through closed contacts 1 and 2 of off-normal switches 401G, 402G, 403G and 404G, through normally closed contacts 8 and 9 of relay K119, through closed contacts 11 and 10 of relay K121 to contacts 1 through 9 on switch banks 401D, 402D, and 403D and to contacts 1 through 10 on bank 404D. The DC negative potential on bank 401D, through wiper 401A and through the interrupter switch associated with coil 401, to the negative terminal of coil 401, via its associated armature, operates and releases switch SSW1 until wiper 401A moves around to the No. 10 contact.

Off-normal switch 401G in parallel with the other switches 402G, 403G and 404G, as heretofore set forth, now opens through the action of the cam on the wiper shaft. DC negative potential on the common connected contacts of bank 402D, through wiper 402A and through closed contacts 7 and 8 of relay K121, as well as through the interrupter switch associated with coil 402, to the negative terminal of coil 402 via its associated armature, operates and releases the armature until wiper 402A moves to the 10 contact of bank 402D. Off-normal paralleled switch 402G opens.

DC negative potential is applied through common connected contacts of bank 403D and wiper 403A through closed contacts 10 and 11 of relay K122 and closed contacts of the interrupter switch associated with coil 403, to the negative terminal of coil 403, and operates and releases the armature associated with the coil until wiper 403A moves to contact 10 on bank 403D. Off-normal switch 403G is then open, since the cam on the wiper shaft is no longer holding it closed. As explained heretofore, the switches 401G, 402G, 403G and 404G are spring biased to open position and the cams on the wiper shafts thrust the switches to closed position, when the wipers are moved to off-normal position. Again, DC negative potential is applied through common connected contacts of bank 404D and wiper 404A, through closed contacts 7 and 8 of relay K122, and through closed contacts 1 and 2 of the interrupter switch associated with coil 404, to the negative terminal of coil 404 and operates and releases its associated armature until wiper 404A moves to contact 11 of bank 404D. Finally, the last of the paralleled switches, off-normal paralleled switch 404G, opens.

The read-out indicators will now display zeros, and a zero is in the stamping position on all stamping wheels in the stamping mechanism. All relays are released and the totalizer is ready for the next input or series of input operations. These inputs, as previously stated, can be, in any order desired and interspersed at will, and yet the totalizer mechanism and the printer wheels will make proper additions.

RETURN OF MONEY AND ZEROING

When a stamped total is not desired and one wishes to reset the totalizer and return or recover the items used to actuate the input circuits, the following takes place:

DC negative potential is applied through contacts 8 and 7 of relay K108 and contacts 1 and 2 of manually operated switch 46 to the negative terminal of relay K119 and operates relay K119. ACL1 potential is applied through closed contacts 1 and 2 of relay K119 to one of the terminals of relay K120 and operates relay K120.

ACL1 potential is applied through closed contacts 1 and 2 of cam switch 604. FIGS. 5A and 14B, through contacts 1 and 2 of relay K120 and to one of the terminals of relay K120 and provides a locking path for relay K120. DC negative potential is applied through closed contacts 4 and 5 of relay K120, through normally closed contacts 8 and 9 of relay K115 to the negative terminals of reset relays K121, K122, and K123, and operates the reset relays. The functions and operations of the reset relays in conjunction with the resetting of the printing mechanism and stepping switches have already been covered and are not repeated here.

ACL1 potential is applied through normaly closed contacts 2 and 3 of relay K119, through closed contacts 7 and 8 of relay K120, to one of the terminals of return motor 259, and starts motor 259, driving the escrow cam 602 and the escrow drum in a counterclockwise direction. Contacts 11 and 12 of relay K120 open the operating path to accept motor 258. Cam 602 drives in a counterclockwise direction, until switch 604 operates.

When cam operated switch 604 operates, contacts 1 and 2 of this switch open the locking path for return relay K120, and relay K120 releases. ACL1 potential is applied through closed contacts 2 and 3 of switch 604 and through normally closed contacts 11 and 12 of relay K116 to one of the terminals of motor 259, and continues the running of motor 259, until cam 602 passes beyond the operating point of switch 604. At that time contacts 2 and 3 of switch 604 open the ACL1 path to motor 259, and motor 259 stops.

As motor 259 turns in a counterclockwise direction, it also drives the escrow drum one quarter revolution in a counterclockwise direction, dumping or returning the item used for actuating the digit input circuits into the return receptacle. At this time all relays are released, the printing mechanism is returned to zero, the read-out indicator is returned to zero and the totalizer is in the stand-by state, ready for the next operation.

PRINTER—TRIPLICATE FORM FEED

The printer comprises, among other elements, a base plate 1010, see particularly FIG. 17, with two spaced apart parallel vertical support plates 1012 and 1014. A third parallel element, comprising a gantry 1016, is mounted at the left of plate 1012 on the base plate. Spacer rods 1018, 1020 and 1022, shown in FIG. 19, are provided with spacer tubings thereon near the upper ends of the plates and gantry to maintain the spacing between them.

A partition 1023, FIG. 17, is spaced by the spacer tubings between the upper ends of the plates 1012 and 1014. Transversely of the plates 1012 and 1014, and extending substantially the width of the plates, is a horizontal platform 1024, see particularly FIG. 20, across which the receipts in triplicate are fed, the plates 1012 and 1014 being provided with rectangular slots 1024 and 1026, FIGS. 16 and 20, to allow for the passage of the triplicate forms therethrough.

In the platform there is provided a rectangular opening 1028 for the accommodation of the platen 1030. The platen is mounted on a pair of arms 1032, pivotally mounted intermediate their ends, as by pivot shaft 1034. The rear ends of the arms are joined together, preferably by a tie rod 1036, said rod being pivotally connected to the plunger of stamp solenoid SS1, which, when energized, will pivot the platen, with carbon interleaved receipt forms interposed between the platen and printing wheels up towards the printing wheels. A stop 1037 limits the downward gravitational movement of the platen under the influence of gravity and of a spring 1038, which biases the platen to inoperative position against the stop.

Engaged by a part moving with the tie rod 1036 in its descending motion is a microswitch operating arm 1039 which operates limit switch SLS1, which, it will be remembered, controls the release of the holding circuit of accept relay K115, which, upon release, breaks the circuit to the stamp solenoid SS1.

Extending through a larger opening in the gantry 1016, FIG. 16, is a pair of plates 1040 supported by brackets on the plate 1012. These plates support a pair of cross shafts 1042 and 1044, FIGS. 17 and 19, mounting sprocket wheels 1046, about which are trained a pair of sprocket chains 1048. Interconnecting the plates is a form supporting platform 1050.

The shaft 1044 is extended toward the front of the machine and is provided with a knurled hand wheel 1052 used for, if desired, manually to advance the chains and the forms driven thereby. At the rear of the shaft 1044 is located the motor 610, geared to the shaft, and which, when energized, drives the shaft.

To guide the forms onto the sprockets, hinged plates 1054 are provided, one for each chain at the left-hand end of the platform 1050, these plates 1054 being spring held against the forms by springs 1056. The forms, of course, are provided with holes uniformally spaced along the longitudinal margins thereof to match with the spacing of the teeth 1057 on the chains 1048. On the front chain there is provided a laterally extending pin 1058, FIG. 16, which, at least once in the orbital revolution of the chain, engages the operating arm of microswitch 611. Microswitch 611, see FIG. 14B, normally has at this time closed contacts which provides the holding circuit for relay K117 controlling the running of motor 610 via its contacts 2 and 3. When operated, switch 611 breaks the holding circuit for the relay K117 so that the motor stops except, and if, pin 1058 maintains the switch 611 operated, so that a second motor drive circuit is established via contacts 2 and 1 of switch 611, the motor running until the pin has moved away from the switch operating arm.

FORM CUTTER

The desired number of forms or other receipts, according to which the machine has been programmed are, desirably, as explained, interleaved with carbon strips between each pair of forms, as is common in the art. Such forms are illustrated as being formed in standard, folded, zigzag fashion in bin 92, FIG. 4, and are fed over the platform 1050 by the sprocket chains. The forms feed across platform 1024, the underneath copy of the forms being bent downward, as it issues from the slot 1026 in the right-hand plate 1014 and being allowed to drop back into bin 92, wherein it automatically folds itself into a zig-zagged pile of forms.

The other two, or other, desired number of superposed forms feed through an opening 1059, FIGS. 23, 24 and 25, in a spacer plate 1060 extending parallel to the plate 1014, the spacer plate 1060 being spaced from the plate 1014 by vertical spacer blocks 1062, one near each end of the plate 1060.

A ledger blade 1064, fastened by screws 1065 to the plate 1060 near the upper edge of the plate and adjacent the opening 1059, cooperates with a cutter blade 1066, pivoted at the upper rear end thereof on a stub shaft 1068.

The cutter blade pivots about shaft 1068 and pulls up to cutting position by means of a pitman 1070 which pivots at its lower end to the cutter blade, and pivots at its upper end to the crank drive disc 613, geared to cutter motor 612.

This blade is spring loaded by spring 1072, so as to urge the cutting edge of the cutter against the ledger blade 1064, the mounting being such that the blade is initially inclined to be out of parallelism with the spacer plate. Continued rotation of the cutter motor is under control of a projection 1074 on disc 613, which operates switch 614, FIG. 23, to in turn control operation of relay K118. However, as the holding circuit on relay K118 is released, the motor 612 still drives via contacts 1 and 2 of switch 614, until the projection allows the circuit at contacts 1 and 2 of switch 614 to break, and the contacts 2 and 3 to make. The cutter blade thus has moved through a complete cycle to the lowered position of the blade. The motor 612 is energized by relay K118, since the feed limit switch 611 is released from the pin 1058; that is, the feed of forms has ceased, and the switch 611 has been permitted to close with contacts 5 and 6 engaged.

Mounted between the plates 1012 and 1014 is a pair of rotatable rolls 1080 and 1081, FIGS. 20, 21 and 22, supporting the printing ribbon 1082 for the original top copy of the triplicate forms. The roll 1081 is provided with a gear 1083 meshing with a gear 1084 operatively associated with driving ratchet 1085, which has an operating pawl 1086 pivotally mounted on a plate 1087, which in turn pivots on the shaft of gear 1084. A spring 1089 normally urges the pawl 1086 into engagement with the ratchet. The plate 1087 oscillates counterclockwise as viewed in FIGS. 21 and 22 each time the solenoid SS1 energizes, the pulling down of shaft 1036 straightening a toggle formed by a web plate 1090 and a link 1091. The plate 1090 pivots on a fixed shaft 1092.

The spring 1038 pulls back on the toggle when the solenoid is deenergized to cause clockwise rotation of the arms 1032 and to allow the plate 1087 to rotate clockwise a variable amount, as is explained, to thereby bring the pawl 1086 into position, whereby it can advance the ratchet 1085. The spring 1038 also operates to thrust the pivoted plate 1087 clockwise through a link 1094 pivoted to the plate 1087 and to an extension on the link 1091.

The function of the toggles 1090–1091 and the link 1094, connected to the plate 1087 by a lost motion connection, is to oscillate the plate 1087 counterclockwise. To effect movement of the plate clockwise, as the toggle is straightening, there is employed another plate 1095, pivotally mounted on shaft 1088 and in frictional engagement with plate 1087.

At the outer end of plate 1095 is a pin 1096, pivotally connected by a link 1097 to a U-shaped sensing finger 1098, shown best in FIG. 21, which operates to bear against the ribbon being wound up on the roll 1081 each time the solenoid is operated, so as to variably limit the clockwise motion of the ratcheting pawl 1086, so that the same amount of ribbon is advanced each time, regardless of the increasing diameter of the ribbon on the take up roll.

A pin and slot connection is provided at the outer end of link 1094 to provide full stroke operation of the solenoid, regardless of the limited rotation of plate 1087.

A spring 1100 pulls the link 1097 and friction plate 1095, so as to cause rotation of plate 1087 to ratchet the described pawl over ratchet wheel 1085 and to cause the sensing finger 1098 to move about its fixed pivot 1101 towards engagement with the ribbon on the take up roll 1081. Additionally, a holding pawl 1102 pivots coaxially with sensing finger 1098, and is positioned to engage the ratchet 1085, a spring 1103 being provided to urge the pawl into operative position.

The ribbon 1082 passes from the pay off roll 1080, see FIGS. 21 and 22, behind a guide plate 1104, thence beneath printing wheels to be described in detail and about a guide bar 1105 to the take up roll 1081. The platform 1024 is configurated at the left hand end as viewed in FIGS. 21 and 22, so as to facilitate easy movement of the ribbon.

PRINTING WHEELS

Cooperating with the platen, see FIG. 26, are the date printing wheels 1106 and 1107 and a year printing segment 1108, and money printing wheels 1109, 1110, 1111 and 1112, as well as a money printing segment 530, all such wheels being mounted for movement on a common shaft 1113 supported by plates 1012 and 1014. The printing wheels 1106 and 1107 can be hand set, wheel 1106 bearing designations of the month of the year, and printing wheel 1107 bearing ordinals corresponding to the days of the month. The segment 1108 bears on it designations of several desired years such as 1967, 1968 and 1969 and can be adjustably secured to shaft 1113.

Each of the wheels 1106 and 1107 carries a locking toothed wheel 1114 cooperating with a spring pawl 1115, FIGS. 15, 20 and 27, so as to maintain the wheels in adjusted position.

The money printing segmental unit 530 merely carries the indicia 0 and 1, indicative of zero hundreds of dollars, such as one hundred dollars or the like, either of which can be moved to printing position.

The money printing segment 530 operates via the solenoid 532, FIG. 21, as previously described. The segment 530 has an operating arm 1116 which connects by the pitman with the plunger 534 of the solenoid 532, so that when solenoid 532 operates the segment moves from the zero printing position to the digit 1 printing position. The spring 536, tensioned between the arm and the frame of the printer, restores the segment and the solenoid plunger to the zero position against an adjustable stop 1117, as the solenoid is de-energized. The wheels 1109, 1110 and 1111 bear indicia from 0 to 9, in two decades, to indicate, respectively, tens of dollars, units of dollars, and dimes. The last or unit wheel 1112 has the indicia 0 and 5 thereon in alternation, there being 10 zeros and, desirably the same number of 5's on the wheel.

UNITS ORDER PRINTING DEVICE

The units wheel 1112 is geared to a rotatable shaft 1120, FIGS. 15, 26, running transversely of the support plates, the right hand end finding bearing in plate 1014 and the left hand end in plate 1012. A motor mounting plate 1122, FIG. 15, is mounted finding bearing on the cross piece of the gantry and is spaced therefrom. Between this plate and the gantry the shaft 1120 has secured thereto a Geneva 1124, FIG. 26. This Geneva drives from the Geneva drive cam wheel 501, FIG. 18, these being six pins 1126 equally spaced thereabout. Continued movement of these pins to the left of the cam wheel 501 operates the switch 505. Mounted on the shaft 1120 to the right of the gantry cross piece is the cam wheel 504 which operates the dual switches 506 and 507. The Geneva drive cam wheel 501 is mounted on the output shaft of motor 500, which is supported from plate 1122.

TENS AND HIGHER ORDER PRINTING DEVICES

Similarly, the tens order printing wheel is gear driven from a shaft 1128, FIGS. 17 and 18, having bearing in the vertical plates and in the gantry. This shaft, likewise, has a Geneva 1124A thereon driven by drive cam 509, in turn which drives by a motor 508, the Geneva pins operating switch 511, a cam 510 on the shaft 1128, to the right of the gantry, cooperates with dual switches 512, 513, as shown in FIG. 19.

Mounted on the upper portion of a right-hand end plate 1014, see FIG. 15, is a motor support plate 1130, parallel to and spaced from plate 1014. On this plate are mounted motor 514 for driving the one dollar wheel, motor 520 for driving the ten dollar wheel and motor 612 for driving the cutter.

On the output shaft of motor 514 is mounted the Geneva drum cam wheel 515, FIG. 23, which carries the pins to control switch 517, a Geneva 1132 being located between the plates 1014 and 1130 and fixed on shaft 1134 driven by motor 519, the shaft being mounted for rotation in partition 1023 and plates 1014 and 1130. This shaft has a gear drive connection with the 100's order or with the one dollar wheel 1110. Also fixed on the shaft 1134 to the left of plate 1014, see FIG. 22, is the cam 516 which controls switches 518, 519, mounted on the plate 1014.

In similar fashion the ten dollar motor 520 drives a Geneva drive element 521, FIG. 23, and switch control for switch 523, this switch being mounted on the plate 1130 in the space between plates 1014 and 1130. The Geneva movement driven by the drive element 521 is fixed to a shaft 1136, also finding bearing in the partition 1023 and plates 1014 and 1130.

This shaft, see FIG. 22, is fixed to cam 522, coacting with switches 524 and 525, mounted on plate 1014 between this plate and the partition 1023.

Also fixed to the shaft, see FIG. 21, is the gear 1138 meshing with gear 1140, fixed to the 1000 order or $10.00 wheel 1109, this arrangement of gears being similar to the gear arrangement for the lower order printing wheels. How the segmental higher order printing device operates has already been described in conjunction with the description of the placing of the value 1 on the indicator 405H.

The cutter motor 612 is also shown as mounted on the plate 1130, its shaft finding bearing in this plate. The disc 613, FIG. 23, is fixed to this shaft and is positioned to the left of plate 1130. This disc carries the eccentric pin to which the pitman 1070 from the cutter blade is connected. Also, in FIG. 23, there is shown the mounting on plate 1130 of the switch 614, operated by projection 1074.

The Geneva couple has already been generally described. More specifically, a novel Geneva couple, such as couple 501, 1124 driven by motor 500 is herein described.

This Geneva couple comprises a driver cam, for short, hereinafter termed a driver, and generically indicated as 501 drives from its motor, in this case motor 500, by step down gearing within the motor casing. Each time the motor intermittently operates, as previously described, it causes the driver 501 to move through, preferably, one-sixth of its revolution.

This driver is, preferably, comprised of two spaced circular discs 1200 and 1202, see FIG. 17, wherein a scalloped edge of the spacer is shown as comprised of six equally spaced, and equal in arcuate length, circular portions 1206, concentric with the axis of the driver and alternating with six equally spaced, equal in arcuate length, recessed portions 1208. Midway of each recessed portion and extending perpendicularly to this driver are the pins 1126. The axis of each pin is in a circle of the same radius as the circular portions 1206.

Cooperating with the driver is the driven Geneva disc 1124. This disc has a number of radial slots 1210 therein. The ratio of the number of pins to the number of slots is incommensurable with the number of slots; and the number of slots is greater than the number of pins. In the specific application there is herein shown a driving member bearing wheel, having on its periphery two series of numbers, such as 0's alternating with the 5's, and able to repeat such ordinals ten times or, having alternatively, two series of numbers, such as 0 to 9, having, preferably, a 2 to 1 gear ratio between the shafts to which the disc and driving mechanism therefor are fixed. These are preferably fixed in operative association with the said disc, which is shown as having 10 slots. These slots are, preferably, equally spaced about the periphery of the Genevas. The Geneva driven disc further includes a scalloped periphery, the scallops 1212 conforming in curvature to the arcuate form of the portions 1206 of the driver 501 and having a chordal length substantially equal to the chordal length of a recess 1208 in the driver.

The thickness of the driven disc is shown as having a little less thickness than the spacing of the disc 1200 from 1202 in order to conserve space and provide a neat structure. Also, it will be noted that, where the pin 1126, whose diameter is slightly less than the width of radial slots 1210, first engages the wall of the slot, the point of juncture 1214 on the Geneva driven element 1124 of the slot 1210 and the recessed portion thereof 1212 is acute, whereas the other wall of the slot rounds off into the recessed portion, as indicated at 1216. Extensions 1218 of the pins form the means for operating a switch, as shown, for example, in FIG. 23 to switch 517.

In the operation of the Geneva couple, as the driver 501 rotates, such as is shown as being from the locked position shown in FIG. 30, the first effect, therefore, is to cause the pin 1126 to engage the edge of slot 1210 at the juncture 1214. As the pin enters the slot, the circular portion 1206 leaves the scallop 1212 and the Geneva driven element rotates as indicated in FIG. 28, until the pin 1126 leaves the slot 1210.

The rounded corner 1216 prevents binding of parts during the separation of the said pin from the driven element. At this time the next arcuate portion 1206 of the driver engages the next scalloped portion 1212 of the driven element of the couple and locks the driven element of the couple against further rotation. Before, the next rotative movement can be imparted to the driven element, the arcuate surface must slide along the scalloped edge 1212, when the next pin 1126 engages the following slot 1210.

Among other uses of the machine described hereinabove and claimed hereinbelow are: savings and loan deposits, institutional inmate deposits, money orders, travel checks, catalog merchandise sales, and transportation ticket sales including those issued by air lines, buses, railroads, etc. General admission ticket sales to places of entertainment, automatic vending of insurance policies or the like, paid receipt issuance of such standard, and generally automated, receipt forms, such as those issued for insurance premiums, gas bills, electric bills, water bills, minor traffic fines, fees and taxes and trade accounts, are capable of determination by the machine. The machine, as described and claimed is also capable of determining and issuing and/or recording sales by various local, state or federal agencies of bonds such as federal, municipal or the like, incorporation in the computation. The machine is also capable of totalization and issuance of valid cashable or non-cashable receipts or other tokens or items issued at legalized gambling establishments such as horse racing tracks, dog racing tracks and the like, issuance and sale of licenses prescribed by law, verification or initiation of credit card transactions, including automatic computation and issuance of the required receipts relative to loans and the like from such organizations as credit unions and the like, and also the issuance of foreign currency and or tokens, in exchange for the deposition of United States currency.

What is claimed is:

1. A banking machine comprising a cabinet, an indicator means on said cabinet to indicate the amount of currency deposited in the machine, a printing mechanism within the machine to imprint on a receipt form the amount of currency deposited in and accepted by the machine, means within the machine to issue a so-imprinted receipt, means within the machine for testing the genuineness of said paper currency, means responsive to the insertion of paper currency of various denominations into the machine and responsive to a satisfactory test for genuineness of totalizing the amount of said currency deposited into the machine and operating the indicator and printing mechanism to set up the amount thereon, and means operable at the will of an operator to have the currency refunded to him and concurrently zeroizing the totalizing mechanism, indicator and printer mechanism or to have the currency accepted by the machine, cause the printing mechanism to imprint a receipt and issue it and zeroize the totalizer, indicator and printing mechanism.

2. A machine as set forth in claim 1 in which there are provided openings in the cabinet into which coins and paper currency may be inserted, an escrow drum, a reject receptacle, an accept receptacle below the escrow drum, a paper currency test drum above the escrow drum and forming part of the testing means, a coin testing means also forming part of the testing means, means conducting coins from the coin receiving opening to the coin testing means, means for conducting coins rejected by the coin testing means to the reject receptacle, means conveying coins accepted by the coin testing means to the escrow drum, a guide for guiding paper currency rejected after tests performed with the aid of the paper currency test drum toward the reject receptacle and a deflecting plate beneath the test drum and movable to one position to direct rejected paper currency to the guide and to the reject receptacle and situated in another position to enable the paper currency, found acceptable by the tests performed thereon, to be dropped into the accept receptacle, the movement of said escrow drum being under control of the at will operator operated means.

3. The structure of claim 1 wherein the machine stores the receipt forms in triplicate, one of the triplicate forms after being imprinted by the printing mechanism being stored within the machine, the other two of the triplicate forms being issued from the machine.

4. The structure of claim 3 wherein the forms are stored as a tri-laminated continuous strip and the two duplicate forms issued are cut off from their respective strips.

5. A machine as set forth in claim 1 in which, additionally, means are provided for receiving coins and adding the value of genuine coins to the indicator and printing mechanism.

6. A machine as set forth in claim 1 in which there are provided openings in the cabinet into which coins and paper currency may be inserted, an escrow drum, a reject receptacle, an accept receptacle below the escrow drum, a paper currency test drum above the escrow drum and forming part of the testing means, a coin testing means also forming part of the testing means, means conducting coins from the coin receiving opening to the coin testing means, means for conducting coins rejected by the coin testing means to the reject receptacle, means conveying coins accepted by the coin testing means to the escrow drum, a guide for guiding paper currency rejected after tests performed with the aid of the paper currency test drum toward the reject receptacle and one or more deflecting plates beneath the test drum and movable to one or more positions to direct rejected paper currency to said reject guide means, and to the reject receptacle and having provided therein one or more other positions to enable the paper currency, found acceptable by the tests performed thereon, to be dropped into the accept receptacle, the movement of said escrow drum being under control of the at will operator operated means.

7. A machine comprising a transport mechanism for a document, clamping means on one side of the transport mechanism to hold the document to said transport mechanism, means to advance the transport mechanism to a test area with the document so held, mechanism operative to effect a dwell of the transport mechanism with the document at said test area, mechanism at said test area to test the document while the transport mechanism is stationary, means to automatically further advance said transport mechanism to a discharge position after the expiration of said dwell period, and means to release the clamping means during said further advance of said transport mechanism.

8. A machine as set forth in claim 7 in which the means to advance the transport mechanism includes a motor and in which the means for effecting a dwell of the transport mechanism comprises a number of cascaded relays energized seratim via contacts of a previously closed relay, the last relay, when de-energized, having contacts in series with the motor, each relay when de-energized by opening of the circuit to its coil being otherwise held closed by an RC circuit shunting the relay coil, said RC circuits and coils of the relays being of such character that the relays become de-energized in succession, whereby the last of the series of relays when completely de-energized will permit its contacts to close to effect resumption of the drive of the motor.

9. A machine as set forth in claim 7 in which, additionally, means are provided at the machine for stacking documents to be fed into the machine.

10. A machine as set forth in claim 7 in which means are provided for guiding a document to its proper implacement on the transport mechanism, said means comprising a slot in the machine in alinement with the clamping means, and a guideway leading to the slot, said guideway having side walls gradually increasing in depth as the guideway approaches the slot.

11. A machine as set forth in claim 10 in which a nosing is provided on the machine above the slot to assist in guiding a document to the slot.

12. A machine as set forth in claim 10 in which a fiducial line is placed across the guideway to indicate how far into the slot the document should be thrust by an operator.

13. A machine as set forth in claim 7 in which means are provided, sensitive to the feeding of a document to said transport mechanism, to operate the clamping means to its clamping position.

14. A machine as set forth in claim 9 in which further means are provided to stop the advance of said transport mechanism in the event that the document is not separated from the transport mechanism when the clamping means is released.

15. A machine as set forth in claim 13 in which still further means are provided to set an alarm into operation upon failure of the document to separate from the transport mechanism.

16. The machine of claim 13 wherein the transport mechanism is a drum.

17. The combination of claim 16, wherein means are provided after failure of the document to successfully pass the first one of any one of the general background color or darkness value or tone, magnetic properties, pre-designated, pre-selected coincidence areas and proper end to end positioning of the document tests, causes disarming and nonactuation of all of the further said enumerated tests.

18. A machine as set forth in claim 13 in which the means sensitive to the feeding of a document to the transport mechanism comprises a pair of light sources one on each end of a clamping bar forming part of the clamping means and a pair of cooperating photocells on the other side of the transport mechanism to sense the interposition of the document between the lamps and the photocells.

19. A machine as set forth in claim 18 in which the clamping bar comprises an elongated L-shaped bar pivoted to the transport mechanism close to the angle of the bar, one leg of the L-shaped member extending downwardly toward the transport mechanism and the other leg overlying the transport mechanism, and pins spaced along the length of the bar projected thru said other leg close to the downwardly extending leg and slightly below the level of said downwardly extending leg.

20. A machine as set forth in claim 13 in which the transport mechanism comprises an endless transport mechanism with a multiplicity of clamping means spaced apart on the transport mechanism so that while the transport mechanism is stationary with one document at a test area while held by one clamp, another document may be presented to another clamp for clamping the second document to the transport mechanism.

21. The machine of claim 20 wherein the transport mechanism is a drum.

22. A banking machine comprising a transport mechanism, means on said transport mechanism to clamp paper currency thereto, means for moving said transport mechanism to a test station, means at said test station to test the denomination of said paper currency, said test means comprising a multiplicity of lamps on one side of the transport mechanism and a corresponding number of photocells on the other side of the transport mechanism in registration with the lamps, said lamps and companion photocells being arranged in groups with the lamps and photocells of each group spaced apart and plural mechanisms controlled, respectively, by the photocells of a group, pulse transmitting means equal in number to the number of plural mechanisms responsive respectively to the energization of said plural mechanisms, and means preventing the energization of any of the pulse transmitting means when more than one of the plural mechanisms is simultaneously energized.

23. The banking machine of claim 22 wherein, additionally, means are provided to effect a rejection of said currency when none of said pulse transmitting means is operative.

24. A machine as set forth in claim 22 wherein the testing of the denomination of said currency is effected while the transport mechanism is stationary.

25. A printing mechanism comprising a series of number wheels of progressively higher denominations, each wheel being fixed to a shaft, each shaft being driven by an electric motor, a pair of cams rotatable with each shaft, a relay for each wheel with a holding circuit therefor and with contacts which when closed will energize the motor, means for initially energizing said relay, one of said cams controlling a switch in series in the holding circuit of said relay and operative to effect stoppage of the motor when the switch is opened by the cam, said motor drifting on to permit the switch to reclose after the relay has become de-energized, the other of said cams controlling a second switch in a circuit connected to the motor which when the circuit is closed will effect drive of the motor to zeroize the wheel.

26. A totalizer indicator comprising a number of value discriminative relays, means for energizing each relay, a cam driving motor set into operation thru closure of contacts of any of said relays by reason of energization of any said relay, a cam driven by said motor, a switch operated by said cam in a locking circuit to each of said relays to lock the energized relay for a revolution of the cam, a second switch controlled by said cam, a stepping switch mechanism and an indicator controlled thereby, and means under control of said second cam controlled switch and other contacts controlled by said energized relay for stepping said stepping switch.

27. A printing totalizer comprising a number of value discriminative relays, means for energizing each relay, a cam driving motor set into operation thru closure of contacts of any of said relays upon energization of any of said relays, a cam driven by said motor, a switch controlled by said cam, other contacts closed upon the energization of any selected relay of said relays, a second motor and a printing wheel driven thereby, and means under control of said switch and said other contacts of the energized relay for controlling the second motor.

28. A printing totalizer as set forth in claim 27 in which said means under control of the switch and other contacts of the energized relay includes a print wheel drive control relay having a coil whose energization is controlled by closure of said switch and having a locking circuit for the coil including a second switch, a cam driven by said second motor, said cam having circuit breaking control elements thereon, said control elements each operative to open the second switch to open the locking circuit to the print wheel drive control relay by the passage of a control element past the second switch to thereby stop the second motor after sufficient displacement of the printing wheel to effect the replacement of one indicium by the next in order on the wheel.

29. The printing totalizer of claim 28 in which means for zeroizing the printing wheel is provided, said means comprising a zeroizing cam fixed for rotation with the second motor, twin switches controlled by said zeroizing cam and opening at a single definite angular position of said zeroizing cam, a first switch of said twin switches closing the circuit to the second motor until the definite angular position is reached, a resetting control relay which when operated to reset the totalizer closes contacts in series with said first one of said twin switches, paralleled holding circuits for said resetting control relay, each including a respective zeroizing mechanism, the second of said twin switches being in series in one of the paralleled holding circuits, said resetting control relay releasing when all of the holding circuits have been opened upon zeroizing the respective mechanisms.

30. The printing totalizer of claim 29 in which additional holding circuits for said resetting control relay comprise paralleled off-normal switches, each of said off-normal switches being a part of a stepping switch operative to totalize inputs into the totalizer and indicate the total on an indicator, all of said off-normal switches opening when all of the indicators have been reset or zero.

31. Means within a register for adding a 25 unit input to other inputs therein, wherein said register is equipped to receive increments of 5 and 10 unit inputs and to register these inputs in a first and second order storage means, said register including first, second and third unit discriminative relays the first of which responds to a 5 unit input, the second to a 10 unit input and the third to a 25 unit input, a fourth relay operated concomitantly with said third relay, means for locking up said third and fourth relays upon energization of said third relay, a motor set into operation upon energization of any of said discriminative relays, a cam driven by said motor, a normally closed switch under control of said cam in series with contacts of said third discriminative relay which contacts when closed transmit a pulse to advance the first order storage means one step, a second cam driven by said motor, two switches in parallel with one another and operated in sequence during one revolution of said second cam, means including contacts controlled by said fourth relay in series with said two switches for advancing the second order storage means one step for each operation of each of said switches, and a carry over fifth relay, energized only when the first unit order of the register has progressed to any one of the units 2, 4, 6, 8 or 10 and contacts closed by energization of said fifth relay, said contacts of said fifth relay being in a circuit to effect energization of said second relay to thereby control the advance of the second order of the register one additional step.

32. The structure of claim 31 in which the storage means is an indicator and an additional cam driven by said motor is provided, a second pair of paralleled switches cooperating with said additional cam to be operated in sequence, conductors connecting said second pair of switches via contacts of said third discriminative relay, when energized to a print wheel drive control relay, a print wheel drive motor operative to advance the print wheels one step each time the print wheel motor is energized, said last motor being energized via repeated closing of contacts of said print wheel drive control relay under control of the second pair of paralleled switches, said last motor being energized one more time in response to the energization of said second discriminative relay via the energization of the fifth relay.

33. A printing totalizer including an indicator and a record form printing mechanism, both advancing synchronously, to indicate and prepare for printing successively higher denominational values and means for optionally causing the reset of the indicator and printing mechanism without a printing operation of the printing mechanism or a reset of the indicator and printing mechanism after the printing mechanism has functioned to cause the record form to be imprinted.

34. A printing totalizer as set forth in claim 33 in which further means are provided to feed a record form from the machine, the record form being fed from the machine only when the printing mechanism has functioned to imprint the form.

35. A printing totalizer as set forth in claim 34 in which the record form is part of a strip stored in the machine and means are provided for cutting off the record form from the remainder of the strip after it has been fed out of the machine.

36. In a totalizer indicator a stepping switch arrangement comprising two banks of switch contacts at least eleven in number, a switch wiper for each bank movable in unison over each bank of contacts, contacts 1 to 9 of one bank of contacts being connected respectively to digital indicators 1 to 9 of a lower order of indicators, contacts 10 and 11 of the said one bank of contacts being connected together and to a zero digit indicator of said lower indications, the contacts 1 to 9 and 11 of the second bank being connected to a zero digit indicator of a higher order indication, the contact 10 on said second bank being connected to a unit digit indicator of said higher order indication and electrical connections to the wipers and the indicators to energize the indicators as the wipers are stepped across the contacts.

37. A Geneva movement comprising a circular rotatable driving disc, a series of driving pins equally spaced about the disc on a circle concentric with the axis of rotation of the disc, arcuate cam surfaces alternating with recessed areas, said cam surfaces being on the circle passing thru the axis of the pins, a circular rotatable driven disc having equally spaced radial slots extending from its periphery and recessed portions on its periphery between the slots, the recessed portions having a curvature to conform with the radius of curvature of the arcuate cam surfaces on the driving disc and of an arcuate length greater than the arcuate length of the arcuate cam surfaces, whereby driving of the driven disc entails sliding action of the arcuate surfaces on the driving disc with respect to the recessed portions in the driven disc as well as engagement of the pins in the slots.

38. A Geneva movement as set forth in claim 37 including, in addition, extensions on the pins adapted to engage a switch to operate the same.

39. A Geneva movement as defined in claim 37 wherein there are a plural number of pins on the driving disc and a larger number of slots in the driven disc, the ratio of slots to pins being other than a whole number.

40. A hold down bar for clamping a document to a transport mechanism comprising an elongated L-shaped bar pivoted to the transport mechanism close to the angle of the bar, one leg of the L-shaped member extending downwardly toward the transport mechanism and the other leg overlying the transport mechanism, and pins spaced along the length of the bar projected thru said other leg close to the downwardly extending leg and slightly below the level of said downwardly extending leg.

41. A hold down bar as set forth in claim 40 in which the upper surface is provided with a cam transverse to the length of the bar.

42. A structure as set forth in claim 40 in which the bar cooperates with a transport mechanism, said bar being pivoted at the angle of the L-shaped bar to the transport mechanism, and the transport mechanism being provided with openings to accommodate the lower ends of the pins.

43. A hold down bar as set forth in claim 40 in which the underside of the leg overlying the transport mechanism has a roughened surface.

44. A machine comprising a cabinet, means in said cabinet for testing tokens, one or more accept bins and one or more reject bins, an escrow compartmented drum above the bins initially receiving the tested tokens in one of said compartments, means to rotate the drum a fraction of a revolution in either of two opposite directions in accordance with the results of the tests in one of which directions the tokens would be dumped into an accept bin and in the other direction of rotation in a reject bin, each concomitant with a new compartment being placed in position to receive additional tested tokens, said rotating means incrementally driving the escrow drum as often as necessary in one direction as may be necessary to effect proper disposition of the tokens in the drum.

45. A printing mechanism comprising a series of number wheels of progressively higher denominations, an individual motor for driving each wheel means responsive to the respective denominational inputs to the printing machine for driving a motor in accordance with the denomination of the input, one denominational input for each motor, and means to carry over a magnitude from one denominational order to the next by energizing the motor of the next higher denominational order.

46. In a web feeding mechanism a take-up roll on which the web is incrementally rolled up, a sensing finger bearing against the web material on the roll and sensing the increase of diameter of the material on the roll, a full stroke mechanism for driving the take-up roll and means coupled to the sensing finger to disconnect the drive between the full stroke mechanism and the take-up roll at a variable position of the position of the full stroke mechanism in accordance with the diameter of the roll as sensed by the finger.

47. A document verification machine, including, in combination, means to transport a document, a plurality of accept or reject test means to sequentially test the document for one or all of its known characteristics, said test means including tests including: a magnetic test, a test of general transmission characteristics quality of the document, transmission characteristics of pre-designated area markings on said document, and initial orientation of said document on said transport means.

48. The combination of claim 47, wherein all but one of said tests are performed while said transport mechanism is positioned in one or more pre-selected, stationary positions.

49. The combination of claim 47, wherein an acceptance depository is provide for all documents which all of said test stations have designated as genuine.

50. The combination of claim 47, wherein a plurality of depositories are selectively provided for documents successfully passing all of said test.

51. The combination of claim 47, wherein there is provided a further test station to determine the presence of said document, said further test station being positioned sequentially beyond the said recited testing means.

52. The combination of claim 51, wherein said further test stations comprises electrically coacting contacts.

53. The combination of claim 47, wherein additional means are provided to disable all of the remaining test means in the absence of an accept signal produced by the first sequentially actuated of the said test means.

54. The combination of claim 47, wherein means are provided, operatively associated in said machine in such fashion that all of said accept or reject means coincide to accept the document as geniune, and wherein actuation of any of the said test means to reject said document actuates further means to reject the currency, or other document, as spurious.

55. The combination of claim 47, wherein a reject mechanism is cooperatively connected, both mechanically and electrically, to the said accept or reject test means and third means actuatable to operate said reject mechanism.

56. A machine comprising a transport mechanism for a document having magnetizable ink imprinted thereon, means to hold the document to said transport mechanism, means on the machine in the path of movement of said document to magnetize the ink on said document, means to sense the magnetic characteristic of the so magnetized ink, means to reject a document not imprinted with ink of proper magnetic characteristic, means to perform a subsequent test on said document and to reject the document if the subsequent test fails, and means to disable the taking of said second test should the document fail to pass the first test, in which the transport mechanism passes beneath a plate spring pressed toward the transport mechanism, said means to sense the magnetic characteristics being a magnetic sensing head, said plate at its forward end being provided with said magnetic sensing head, and provided rearwardly of said sensing head but laterally displaced therefrom with a groove extending from close to the forward edge of the plate to the rear edge thereof, said means to hold the document to said transport mechanism being a clamp bar, said clamp bar having a cam on the upper surface thereof in alignment with the groove in the plate, the cam functioning to lift the plate and sensing head above the bar during passage of the bar beneath the sensing head and permitting the plate and sensing head to engage a document under test on said transport mechanism by cam engagement in the groove after the bar has passed the magnetic head.

57. The structure of claim 56 in which the transport mechanism is a rotatable drum and a groove is located in the drum, circumferentially thereof, in alignment with the magnetic sensing head to accommodate the lower end of said sensing head in said groove during the rotation of the drum after the document under test has passed out from beneath the testing head.

58. A machine comprising a transport mechanism for a document having magnetizable ink imprinted thereon, means to hold the document to said transport mechanism, means on the machine in the path of movement of said document to magnetize the ink on said document, means to sense the magnetic characteristic of the so magnetized ink, means to reject a document not imprinted with ink of proper magnetic characteristic, means to perform a subsequent test on said document and to reject the document if the subsequent test fails, and means to disable the taking of said second test should the document fail to pass the first test, in which the subsequent test is of the flood light transmission characteristic of the document and in which further means are provided to perform a further light transmission test on the document, a test to determine the proper orientation of the document with respect to the transport mechanism, a test to discriminate between various acceptable documents and a test to determine the shedding of the document from the transport mechanism after the transport mechanism has travelled beyond a point wherein the document should have been released from the transport mechanism.

59. A machine for verifying the genuineness of documents, including currency or the like, wherein detecting station means are provided for a multiplicity of tests to be performed on the selected document to determine the characteristics thereof, further means comprising a transport mechanism for carrying the selected document to said station means, which station means coact to perform certain preselected tests on said documents, means to release the said document from the said transport mechanism, and further contact means to detect the presence or absence of the said document, after the said document, on said transport mechanism, has passed said release means, in which the detecting stations determine each of the following characteristics of the document: general background color or darkness value or tone, magnetic properties, pre-designated, pre-selected coincidence areas and proper end to end positioning of the document.

60. A machine as set forth in claim 59 in which the test to determine shedding of the document comprises an aperture in the test drum, a contact finger movable into the aperture, which when blocked by a document across the aperture will indicate that fact, and which when movable further into the aperture due to the absence of a document at the aperture will not afford such an indication.

References Cited
UNITED STATES PATENTS

| | | | |
|---|---|---|---|
| 2,598,448 | 5/1952 | Schultz | 74—436 |
| 2,922,893 | 1/1960 | Ett. | |
| 2,941,187 | 6/1960 | Simjian. | |
| 2,950,799 | 8/1960 | Timms. | |
| 3,020,994 | 2/1962 | Kirk | 194—10 |
| 3,072,237 | 1/1963 | Simjian. | |
| 3,090,485 | 5/1963 | Moore | 209—75 |
| 3,108,680 | 10/1963 | Ellis et al. | |
| 3,133,641 | 5/1964 | Patzer. | |
| 3,265,205 | 8/1966 | Chumley. | |
| 3,275,138 | 9/1966 | Cahill | 209—111.8 |

ALLEN N. KNOWLES, Primary Examiner

U.S. Cl. X.R.

74—436; 194—10; 209—73, 75, 111.6, 111.8; 235—61.9, 151.22; 346—22; 356—72